United States Patent
van Raak et al.

(10) Patent No.: US 12,365,838 B2
(45) Date of Patent: Jul. 22, 2025

(54) METHOD FOR PREPARING A LIQUID CRYSTAL-BASED SWITCHING ELEMENT

(71) Applicant: Merck Patent GmbH, Darmstadt (DE)

(72) Inventors: Roel van Raak, Tilburg (NL); Paul Verbunt, Roermond (NL)

(73) Assignee: Merck Patent GmbH (DE)

( * ) Notice: Subject to any disclaimer, the term of this patent is extended or adjusted under 35 U.S.C. 154(b) by 750 days.

(21) Appl. No.: 17/610,812

(22) PCT Filed: May 12, 2020

(86) PCT No.: PCT/EP2020/063106
§ 371 (c)(1),
(2) Date: Nov. 12, 2021

(87) PCT Pub. No.: WO2020/229434
PCT Pub. Date: Nov. 19, 2020

(65) Prior Publication Data
US 2022/0220383 A1    Jul. 14, 2022

(30) Foreign Application Priority Data
May 15, 2019 (EP) ................................ 19174718

(51) Int. Cl.
| G02F 1/139 | (2006.01) |
| C09K 19/30 | (2006.01) |
| C09K 19/54 | (2006.01) |
| C09K 19/58 | (2006.01) |
| G02F 1/1337 | (2006.01) |

(52) U.S. Cl.
CPC ........ *C09K 19/3003* (2013.01); *C09K 19/542* (2013.01); *C09K 19/586* (2013.01); *G02F 1/133742* (2021.01); *G02F 1/139* (2013.01); *C09K 2019/3009* (2013.01); *C09K 2019/3016* (2013.01); *C09K 2019/3019* (2013.01); *C09K 2019/3021* (2013.01); *C09K 2019/548* (2013.01)

(58) Field of Classification Search
CPC ............... C09K 19/586; C09K 19/542; C09K 19/3003; C09K 2019/548; G02F 1/133742; G02F 1/139
USPC ......................................................... 428/1.1
See application file for complete search history.

(56) References Cited

U.S. PATENT DOCUMENTS

| 4,826,620 A | 5/1989 | Heppke et al. |
| 4,988,458 A | 1/1991 | Heppke et al. |
| 5,043,095 A | 8/1991 | Bahr et al. |
| 5,236,618 A | 8/1993 | Heppke et al. |
| 5,788,880 A | 8/1998 | Schierlinger et al. |
| 5,886,242 A | 3/1999 | Etzbach et al. |
| 6,468,444 B1 | 10/2002 | Meyer et al. |
| 7,864,287 B2 | 1/2011 | Niiyama et al. |
| 10,202,508 B2 | 2/2019 | Tong et al. |
| 10,344,217 B2 | 7/2019 | Kirsch et al. |
| 10,585,316 B2 | 3/2020 | Junge et al. |
| 2004/0201816 A1 | 10/2004 | Chen et al. |
| 2017/0029702 A1 | 2/2017 | Junge et al. |
| 2018/0201837 A1* | 7/2018 | Weegels ............... C09K 19/542 |
| 2018/0244999 A1* | 8/2018 | Chen ...................... C09K 19/12 |

FOREIGN PATENT DOCUMENTS

| DE | 3523185 A1 | 1/1986 |
| DE | 3534777 A1 | 4/1987 |
| DE | 3534778 A1 | 4/1987 |
| DE | 3534780 A1 | 4/1987 |
| DE | 3617826 A1 | 4/1987 |
| DE | 4342280 A1 | 6/1995 |
| DE | 19541820 A1 | 5/1997 |
| EP | 1038941 A1 | 9/2000 |
| GB | 2328207 A | 2/1999 |
| TW | 200420985 A | 10/2004 |
| TW | 201718835 A | 6/2017 |
| WO | 9800428 A1 | 1/1998 |
| WO | 0060407 A1 | 10/2000 |
| WO | 0206195 A1 | 1/2002 |
| WO | 0206196 A1 | 1/2002 |
| WO | 0206265 A1 | 1/2002 |
| WO | 0234739 A1 | 5/2002 |
| WO | 02094805 A1 | 11/2002 |
| WO | 2008/001817 A1 | 1/2008 |

(Continued)

OTHER PUBLICATIONS

English translation of the Office Action issued Dec. 20, 2023, by the Taiwan Intellectual Property Office in corresponding Taiwanese Patent Application No. 109115969. (8 pages).

(Continued)

*Primary Examiner* — Ruiyun Zhang
(74) *Attorney, Agent, or Firm* — Buchanan Ingersoll & Rooney PC

(57) ABSTRACT

A method for preparing a switching element which is operable in and electrically switchable between an optically clear state and a scattering state, wherein one or more polymerisable mesogenic compounds provided in a layer containing a liquid-crystalline medium which comprises one or more mesogenic compounds, one or more chiral compounds and the one or more polymerisable mesogenic compounds are subjected to polymerisation in the presence of a direct current (DC) electric field in the layer. Also, a switching element obtained or respectively obtainable by carrying out the method and to the use of the switching element in a window.

13 Claims, No Drawings

(56) References Cited

FOREIGN PATENT DOCUMENTS

| WO | 2009151716 A1 | 12/2009 |
| WO | 2012052100 A1 | 4/2012 |
| WO | 2014090373 A1 | 6/2014 |
| WO | 2014187529 A1 | 11/2014 |
| WO | 2015090497 A1 | 6/2015 |
| WO | 2016173693 A1 | 11/2016 |
| WO | 2017041872 A1 | 3/2017 |
| WO | 2018189068 A1 | 10/2018 |

OTHER PUBLICATIONS

Office Action (Notice of Reasons for Refusal) issued Apr. 23, 2024, by the Japan Patent Office in corresponding Japanese Patent Application No. 2021-568091 and an English translation of the Office Action. (8 pages).

International Search Report and Written Opinion for International Application No. PCT/EP2020/063106, dated Jun. 24, 2020, 13 pages.

Yang et al., "Cholesteric liquid crystal/polymer dispersion for haze-free light shutters", Appl. Phys. Lett. 60 (25), Jun. 22, 1992, pp. 3102-3104.

* cited by examiner

METHOD FOR PREPARING A LIQUID CRYSTAL-BASED SWITCHING ELEMENT

CROSS-REFERENCE TO RELATED APPLICATIONS

This application is a U.S. national stage application filed and claiming priority under 35 U.S.C. §§ 120 and 365 (a) of International Application No. PCT/EP2020/063106, filed May 12, 2020, which claims priority under 35 U.S.C. § 119 of European Patent Application No. 19174718.7, filed May 15, 2019, each of which applications is incorporated herein by reference in its entirety and for all purposes.

BACKGROUND

The present invention relates to a method for preparing a switching element which is operable in and electrically switchable between an optically clear state and a scattering state, wherein one or more polymerisable mesogenic compounds provided in a layer containing a liquid-crystalline medium which comprises one or more mesogenic compounds, one or more chiral compounds and the one or more polymerisable mesogenic compounds are subjected to polymerisation in the presence of a direct current (DC) electric field in the layer. The present invention further relates to a switching element obtained or respectively obtainable by carrying out the method and to the use of the switching element in a window.

Optical intensity modulators such as light shutters can be based on liquid crystals (LCs). In principle, such light shutters may rely on the scattering of light or the absorption of light. LC-based light shutters using light scattering include so-called polymer dispersed liquid crystal (PDLC), polymer network liquid crystal (PNLC) and cholesteric liquid crystal (CLC) devices. These scattering-type devices can be switched between an optically clear or transparent state and a translucent or opaque state.

LC-based light shutters or modulators can be used in switchable windows for e.g. architectural, automotive, avionic and nautical applications. A device operating in the scattering mode can in particular be used as a privacy window. This way a privacy mode can be provided when desired by switching the device, in particular the window element, from a clear state with possible viewing contact to a scattering state giving a visual barrier.

Light scattering or diffusion may also be useful for reducing glare or dazzling from direct sunlight irradiation.

Switching between states may e.g. be thermally controlled. However, in many cases it can be suitable and even advantageous to use electrical switching. When a device is switched from a non-scattering state, i.e. an optically clear state, to a scattering state, the transmission of light is changed such that a translucent appearance is produced, which may also be perceived as cloudy, turbid, diffuse, hazy or opaque.

D.-K. Yang et al. in "Cholesteric liquid crystal/polymer dispersion for haze-free light shutters", Applied Physics Letters, 60 (1992) on pages 3102-3104 describe a dispersion of a polymer in low concentration with a cholesteric liquid crystal and the use of this material in light modulators which can be switched between an opaque light scattering state and a transparent state.

In WO 00/60407 A1 electro-optical glazing structures are described which have scattering and transparent modes of operation.

WO 2009/151716 A2 describes a switchable liquid crystal window based on a bistable dual frequency polymer stabilized cholesteric liquid crystal material, wherein the liquid crystal material is switched from an optically clear state to a light scattering state upon application of a voltage pulse having a first frequency and from a light scattering state to a transparent state upon application of a voltage pulse having a second frequency.

WO 2016/173693 A1 describes a switching layer comprising a liquid-crystalline medium for use in a switching element which has forward-scattering properties in at least one of the switching states and which facilitates switching from a transparent state into a translucent or opaque state.

SUMMARY

There is a need in the art for switchable elements which are particularly suitable for use in privacy windows which have a favourable performance, which can be operated at suitably low voltages and with low energy consumption, and which can have suitable reliability and stability, e.g. with respect to electrical breakdown and light stability. There is also a need in the art for a suitable process to produce such switchable devices.

An object of the present invention is therefore to provide a facile, efficient and robust method to prepare switching elements which are operable in and electrically switchable between an optically clear state and a scattering state, which have an improved optical and electro-optical performance and which are particularly suitable for use in privacy windows. It is a further object of the present invention to provide improved switching elements which are obtainable by carrying out the method and which are particularly useful in switching devices, especially switchable window elements having a scattering mode. Further objects of the present invention are immediately evident to the person skilled in the art from the following detailed description.

The objects are solved by the subject-matter defined in the independent claims, while preferred embodiments are set forth in the respective dependent claims and are further described below.

The present invention in particular provides the following items including main aspects, preferred embodiments and particular features, which respectively alone and in combination contribute to solving the above objects and eventually provide additional advantages.

A first aspect of the present invention provides a method for the preparation of a switching element which is operable in and electrically switchable between an optically clear state and a scattering state, comprising the steps of (i) providing a liquid-crystalline medium which comprises one or more mesogenic compounds, one or more chiral compounds and one or more polymerisable mesogenic compounds as a layer interposed between two opposing transparent substrates which are each provided with an electrode,
wherein the liquid-crystalline medium has a clearing point of 70° C. or more, and
wherein the one or more polymerisable mesogenic compounds are contained in the medium in an amount, based on the overall contents of the medium, of 4% by weight or less, and (ii) polymerising the one or more polymerisable mesogenic compounds in the presence of an applied DC (direct current) electric field in the layer.

A direct current (DC) electric field herein means that the electric field does not change its polarity, at least for the given time period under consideration. This means a direct current (DC) electric field refers to a constant or static electric field emission which has a frequency of 0 Hz. However, it is understood that a substantially constant electric field and electric field emission at substantially 0 Hz, which may occur when the magnitude of the electric field varies over time or when the polarity of the electric field is reversed after a considerable time period, for example after several minutes, also fall within the present meaning.

Typically DC voltages in the range from just above 0 V up to 220 V may be applied, wherein the upper limit is chosen such that dielectric breakdown is avoided.

According to the present method it is preferred that the applied DC electric field induces a homeotropic alignment in the layer comprising the liquid-crystalline medium. This means that the polymerisation of the one or more polymerisable mesogenic compounds occurs while the medium exhibits a homeotropic alignment and furthermore a DC electric field is applied.

In the present invention it was recognized that it is desirable that the switching element shows has a favourable performance and appearance not only in the scattering state but also in the optically clear state. For the scattering state, in the finally obtained switching layer one or more chiral compounds and a polymeric component comprising one or more polymeric structures obtained by or respectively obtainable from polymerisation of the one or more polymerisable mesogenic compounds are used in order to ensure a favourable scattering efficiency and thus a proper privacy mode. In addition, a homogeneous and colour-neutral appearance can thus be attained in the scattering state.

However, it is furthermore desirable to provide a favourable clear state, i.e. a favourably homogeneous low haze and optically transparent state. In this respect, it was recognized that the use of the chiral compound(s) and the polymeric component may lead to a residual haze in the optically clear or low-haze state, noticeable e.g. as a white foggy appearance, which in most cases and especially when the switching element is used in windows is undesirable.

It has surprisingly been found that significant improvements can be obtained when a DC electric field is applied during polymerisation. In particular, an optically clear state can be obtained which has a significantly reduced residual haze or which even has no discernible haze at all. In addition, it has been found that by using a DC electric field according to the present method an unwanted change and in particular an unwanted drop of the voltage in the layer containing the medium during the polymerisation may be minimized or avoided such that different substrate sizes and different substrate shapes, e.g. triangular, rectangular or polygonal, can be used at ease. Thus, the process provides benefits in terms of the obtained product as well as in terms of the process itself, e.g. by improving the setting of a reliable and predictable effective voltage during the polymerisation over the entire substrate areas. Furthermore, it has surprisingly been found that using the process according to the invention can advantageously lead to a reduced pressure sensitivity, for example for pressure from touch or mechanical load. This in turn can beneficially contribute to avoiding or minimizing defects and in particular so-called mura defects.

Using the method switching elements can be prepared which exhibit good reliability, durability and stability, e.g. with respect to electrical breakdown and light stability, in particular UV light stability. This is surprising considering that the medium is exposed to a DC electric field during the polymerisation, especially because in principle an application of a DC voltage to the dielectric material may potentially be detrimental in that electrochemical degradation through ionization and even electrolysis, generation of unwanted impurities and especially charged impurities, and permanent separation and locally uneven accumulation of ions may occur. This in turn could lead to a decrease in reliability and of the voltage holding ratio (VHR) and thus to diminished device performance and lifetime.

Therefore, in comparable processes, if an electric field was applied at all during polymerisation, so far only the use of alternating current (AC) electric fields was considered, wherein AC refers to the change, in particular the periodic change, of the polarity.

Typical AC frequencies have a higher frequency of $\geq 20$ Hz, e.g. 50 Hz or 60 Hz and up to several kHz. Herein AC frequencies however also refer to lower frequencies in the range closer to 1 Hz or even slightly below 1 Hz, e.g. 0.2 Hz.

Surprisingly, in the present invention it was found that DC voltage can be used as described in the present method, which even more leads to the beneficial effects and properties as described herein above and below. In particular, polymerisation and polymerisation stabilization as described herein can provide benefits for the scattering performance and efficiency in the scattering state, while furthermore allowing to achieve favourable clarity in the transparent state.

It has surprisingly been found that the voltage holding ratio (VHR) for the switching elements prepared using the DC polymerisation according to the invention is not lowered compared to cases which use AC polymerisation instead. This means that unwanted charge generation and material degradation can be favourably avoided or minimized despite using DC polymerisation and that thus further product benefits in terms of switching voltage and switching performance as well as reliability and lifetime are suitably obtainable.

Another aspect of the invention relates to a switching element which is operable in and electrically switchable between an optically clear state and a scattering state, wherein the switching element is obtained by or respectively obtainable from carrying out the method according to the invention.

According to the invention advantageous switching elements are provided which can be used in switchable windows for automotive and other transport applications, such as in trains, airplanes and boats, and for architectural applications. The switching elements are particularly useful and efficient in providing a privacy mode when desired, i.e. they offer switchability between a state with viewing contact and a private state giving a visual barrier. The devices can be conveniently switched between the states by applying an electrical voltage. Furthermore, the switching can be fast, in particular in the order of a few seconds and even down to a second or even less.

When used as a component of a window, the element may be installed with minimum space requirement, which can offer significant advantages, e.g. in comparison to traditional awnings or blinds.

The switching element and in particular the window element according to the invention is useful for regulating or modulating the passage of light, in particular the passage of sunlight but also of light from artificial light sources like lamps and light fixtures.

The switching element, in particular the window element, according to the invention may advantageously be employed in a window of an external facade, but also in the inside of rooms, for example in dividing walls between rooms and in elements for separating individual compartments of rooms or spaces. In this case the privacy which is achieved by switching the window element from clear to scattering can produce a visual barrier between the different parts of the room. Besides in building windows, the present devices may also be used for cars, commercial vehicles, trains, airplanes, ships, etc.

In particular, the switching elements according to the invention exhibit advantageously reduced residual haze or even no discernible residual haze in the optically clear state, which is particularly desirable when the elements form a part of windows.

Therefore, in another aspect of the invention a switching element is provided which is operable in and electrically switchable between an optically clear state and a scattering state, comprising a switching layer containing a material which comprises
- a liquid-crystalline medium comprising one or more mesogenic compounds and one or more chiral compounds, wherein the liquid-crystalline medium has a clearing point of 70° C. or more, and
- a polymeric component comprising one or more polymeric structures obtained by or respectively obtainable from polymerisation of one or more polymerisable mesogenic compounds, wherein the polymeric component is contained in the material in an amount, based on the overall contents of the material, of 4% by weight or less, wherein the switching element in the optically clear state has a haze, preferably determined according to ASTM D 1003, of less than 6%, more preferably less than 5%, even more preferably less than 3.5% and in particular less than 2.5%.

Preferably, the liquid-crystalline medium exhibits a pitch of 0.55 μm or more in the scattering state.

It has surprisingly been found that an improved switching element, in particular window element, can be obtained by including a switching layer in the element which contains a material which comprises the liquid-crystalline medium and the polymeric component as set forth above and below. In particular, providing the cholesteric or chiral nematic medium having a high clearing point, and preferably a long pitch, as presently defined in combination with a relatively small amount of a polymeric component which includes polymeric structures obtainable from polymerisation of at least one polymerisable mesogenic compound can surprisingly give a device which has a favourable clear state, i.e. a favourably homogeneous low haze and optically transparent state, as well as a scattering state having an enhanced scattering efficiency together with a homogeneous and colour-neutral appearance.

In particular, the combination of a cholesteric medium, preferably a long pitch cholesteric medium, with the presence of the polymeric component as herein described can give unexpectedly strong scattering with a suitably broad angular scattering distribution. This is beneficial in that already the provision of only a single switching layer in the element can result in a suitable privacy mode. In addition, the thickness of the switching layer may be comparatively low, in particular substantially below 40 μm, which thus reduces the operating voltage and power consumption but also the use of material.

Therefore, according to the invention a switching element for privacy applications can be obtained which has both an advantageous low haze clear state and an advantageous opaque state with sufficiently uniform scattering wherein unwanted colour effects are favourably avoided or minimized.

The switching element according to the invention is preferably used in devices for regulating the passage of electromagnetic radiation, preferably light, and in particular sunlight but also light from artificial light sources.

It has presently also been recognized that particular benefits, e.g. in terms of scattering efficiency or uniformity and appearance of the scattering effect, can be obtained when the material in the switching layer contains the chiral nematic or cholesteric liquid-crystalline medium which preferably has a relatively long pitch and a favourably high clearing point in combination with the polymeric component as presently defined, and in particular when a so-called polymer stabilized cholesteric texture (PSCT) is provided.

In this respect, in accordance with the present method a liquid-crystalline medium with improved properties is provided, in particular having a suitably high clearing point and also preferably a suitably long pitch. This medium is particularly useful for preparing the modulation material in the switching layer of the switching element. This can favourably contribute to obtaining a switching element having good stability, e.g. against electrical breakdown, and a favourably low operating voltage or low energy consumption and which can show adequately efficient and sufficiently uniform scattering. In addition, the media can provide further benefits such as a suitably high optical anisotropy together with a favourably high voltage holding ratio (VHR) and good light stability, good low-temperature stability and suitable stability for storage.

According to the invention the liquid-crystalline medium and the modulation material as described herein are arranged and used in a switching layer. The switching layer thus comprises, preferably consists of, the medium or respectively the material. The switching layer is arranged between two substrates such as to give a switching element which is electrically switchable and operable in an optically transparent state and a scattering state. Preferably, electrodes are arranged as conductive layers on or respectively above the inner surface of each substrate.

In another aspect of the invention a window is provided which comprises the switching element according to the invention.

DETAILED DESCRIPTION

Without limiting the present invention thereby, in the following the invention is illustrated by the detailed description of the aspects, embodiments and particular features, and particular embodiments are described in more detail.

The term "liquid crystal" (LC) herein preferably relates to materials or media having liquid-crystalline mesophases in some temperature ranges (thermotropic LCs). They contain mesogenic compounds.

The terms "mesogenic compound" and "liquid crystal compound" mean a compound comprising one or more calamitic (rod- or board/lath-shaped) or discotic (disc-shaped) mesogenic groups, i.e. groups with the ability to induce liquid-crystalline phase or mesophase behaviour.

The LC compounds or materials and the mesogenic compounds or materials comprising mesogenic groups do not necessarily have to exhibit a liquid-crystalline phase themselves. It is also possible that they show liquid-crystalline phase behaviour only in mixtures with other compounds. This includes low-molecular-weight non-reactive liquid-crystalline compounds, reactive or polymerisable liquid-crystalline compounds, and liquid-crystalline polymers.

A calamitic mesogenic compound is usually comprising a mesogenic core consisting of one or more aromatic or non-aromatic cyclic groups connected to each other directly or via linkage groups, optionally comprising terminal groups attached to the ends of the mesogenic core, and optionally comprising one or more lateral groups attached to the long side of the mesogenic core, wherein these terminal and lateral groups are usually selected e.g. from carbyl or hydrocarbyl groups, polar groups like halogen, nitro, hydroxy, etc., or polymerisable groups.

For the sake of simplicity, the term "liquid crystal" or "liquid-crystalline" material or medium is used for both liquid crystal materials or media and mesogenic materials or media, and vice versa, and the term "mesogen" is used for the mesogenic groups of the material.

The term "non-mesogenic compound or material" means a compound or material that does not contain a mesogenic group as defined above.

As used herein, the term "polymer" will be understood to mean a molecule that encompasses a backbone of one or more distinct types of repeating units (the smallest constitutional unit of the molecule) and is inclusive of the commonly known terms "oligomer", "copolymer", "homopolymer" and the like. Further, it will be understood that the term polymer is inclusive of, in addition to the polymer itself, residues from initiators, catalysts, and other elements attendant to the synthesis of such a polymer, where such residues are understood as not being covalently incorporated thereto. Further, such residues and other elements, while normally removed during post-polymerisation purification processes, are typically mixed or co-mingled with the polymer such that they generally remain with the polymer when it is transferred between vessels or between solvents or dispersion media.

The term "polymerisation" means the chemical process to form a polymer by bonding together multiple polymerisable groups or polymer precursors (polymerisable compounds) containing such polymerisable groups.

Polymerisable compounds with one polymerisable group are also referred to as "monoreactive" compounds, compounds with two polymerisable groups as "direactive" compounds, and compounds with more than two polymerisable groups as "multireactive" compounds. Compounds without a polymerisable group are also referred to as "non-reactive" or "non-polymerisable" compounds.

The terms "film" and "layer" include rigid or flexible, self-supporting or freestanding films or layers with more or less pronounced mechanical stability, as well as coatings or layers on a supporting substrate or between two substrates.

The term "chiral" in general is used to describe an object that is non-superimposable on its mirror image. By contrast, "achiral" (non-chiral) objects are objects that are identical to their mirror image. The medium according to the invention exhibits chirality. This can be achieved by providing cholesteric liquid crystals, which are also known as chiral nematic liquid crystals. The terms chiral nematic and cholesteric are used synonymously herein, unless explicitly stated otherwise.

Herein

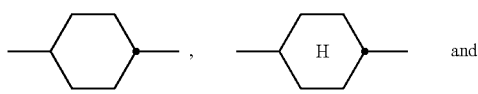, and

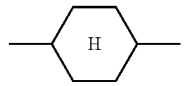

denote trans-1,4-cyclohexylene.

Herein, unless explicitly stated otherwise, all concentrations are given in weight percent and relate to the respective complete mixture.

All temperatures are given in degrees centigrade (Celsius, ° C.) and all differences of temperatures in degrees centigrade. All physical properties and physicochemical or electro-optical parameters are determined and given for a temperature of 20° C., unless explicitly stated otherwise.

Transmission and scattering of light preferably refers to the transmission and scattering of electromagnetic radiation in the spectral range from 380 nm to 780 nm.

Switching preferably refers to the switching between binary states, wherein preferably one state is non-scattering and appears substantially transparent or clear to the human eye and another state is scattering or has diffusive transmission and appears translucent or opaque to the human eye. However, it is also possible for the switching layer according to the invention to have further switching states, in particular intermediate states.

Therefore, according to the invention preferably and favourably switching between a completely private state and a state with viewing contact to the exterior or a neighbouring space is obtainable.

In the optically transparent state according to the invention the switching element preferably has a haze, determined according to ASTM D 1003, of less than 10%, more preferably less than 7%, even more preferably less than 5%, still more preferably less than 3.5% and in particular less than 2.5%.

In the scattering state according to the invention the switching element preferably has a haze, determined according to ASTM D 1003, of more than 75%, more preferably more than 85%, even more preferably more than 90%. It is particularly preferred that in the scattering state the switching element according to the invention has a haze, determined according to ASTM D 1003, of 95% or more.

For the measurement of haze hazemeters made by BYK-Gardner may be used. It is also possible to use spectrophotometers, in particular a spectrophotometer and an Ulbricht's sphere.

Switching according to the invention preferably means electrical switching. Electrical switching can typically be achieved by providing substrates, e.g. glass substrates or plastic substrates, with electrodes. In an embodiment electrically conductive layers are provided on the substrates, wherein the conductive layers comprise or are formed of a transparent conductive material, e.g. a transparent conductive oxide, preferably indium tin oxide (ITO) or $SnO_2$:F, in particular ITO, or a conductive polymer, or a thin transparent metal and/or metal oxide layer, for example silver. The electrically conductive layers are preferably provided with electrical connections. The voltage is preferably supplied by a battery, a rechargeable battery, a supercapacitor or an external current source, more preferably by an external current source.

In an embodiment there are provided orientation layers, e.g. made of polyimide (PI), on the substrate. It is particularly preferred that electrically conductive layers and orientation layers are provided together on the substrates. In this case the orientation layer or alignment layer is provided on top of the conductive layer such that the orientation layer is contacting the LC medium. The orientation layers, preferably polyimide layers, may be arranged such that they provide, in particular at the interface, homogeneous or planar orientation or alternatively homeotropic orientation of the molecules of the liquid-crystalline medium. In a particular embodiment rubbed polyimide is used on both substrates having a difference in direction of 90° as used in the so-called twisted nematic (TN) geometry.

In a particular embodiment alignment layers with pre-tilt angles are used, e.g. having pre-tilt angles ranging from 0° to 20° for the TN geometry or from 80° to 90° for the vertically aligned (VA) geometry.

Alternatively and according to another preferred embodiment, substrates without orientation layers are used. It has surprisingly been found that the provision of orientation layers, e.g. polyimide layers, as additional layers may beneficially be avoided, while effective and efficient switching behaviour may still be realized.

It is also possible to provide passivation or barrier layers on the substrates, alternatively but also in addition to orientation layers, e.g. passivation layers comprising silicon oxide or silicon nitride, preferably consisting of silicon oxide or silicon nitride. In case both a passivation layer and an orientation layer are provided on a substrate they are arranged such that the orientation layer is topmost, i.e. is contacting the LC medium.

In a preferred embodiment the electrodes are arranged as transparent conductive layers supported on the substrates and facing the liquid-crystalline medium, wherein preferably the transparent conductive layers are respectively embedded between two transparent dielectric layers, and wherein optionally alignment layers are further provided which are in direct contact with the liquid-crystalline medium.

The method according to the invention provides a switching element and in particular a window element, which is operable in and electrically switchable between an optically transparent state and a scattering state and which comprises a switching layer. The switching layer obtainable by carrying out the method contains a material which comprises a liquid-crystalline medium comprising one or more mesogenic compounds and one or more chiral compounds, and a polymeric component comprising one or more polymeric structures obtained by or respectively obtainable from the polymerisation of the one or more polymerisable mesogenic compounds.

According to the invention the polymeric component is contained in the material in an amount, based on the overall contents of the material, of 4% by weight or less, preferably 3% by weight or less, more preferably 2% by weight or less, and in particular 1% by weight or less. In a preferred embodiment the polymeric component is contained in the material in an amount, based on the overall contents of the material, in the range from 0.5% by weight to 1.5% by weight.

The polymeric component comprises one or more polymeric structures obtained by or respectively obtainable from polymerisation of one or more polymerisable mesogenic compounds. It is preferred that the polymeric component is obtained from polymerising exclusively one or more polymerisable mesogenic compounds, i.e. that the polymeric component consists of one or more polymeric structures which are only based on or respectively only derived from one or more polymerisable mesogenic compounds as the precursors.

In accordance with the present method the polymeric component is preferably prepared in situ, in particular in the switching layer, by polymerising one, two or three polymerisable mesogenic compounds, even more preferably one or two polymerisable mesogenic compounds.

Polymerisable mesogenic compounds according to the invention contain a mesogenic group and one or more polymerisable groups, i.e. functional groups which are suitable for polymerisation. These compounds are also known as reactive mesogens (RMs) or mesogenic monomers. The RMs can be monoreactive and/or di- or multireactive.

While it is preferred that the polymerisable compound(s) as used according to the invention include(s) only reactive mesogen(s), i.e. all the reactive monomers are mesogens, in an alternative embodiment it is also possible to use one or more RMs in combination with one or more non-mesogenic polymerisable compounds.

The polymerisable compounds and the mesogenic compounds may be chosen in view of matching the refractive indices of the obtained polymeric component and the LC medium in the modulation material, which can favourably contribute to improving the clear state.

According to the invention the liquid-crystalline medium, in particular as used in the method and as provided in the switching element, has a clearing point of 70° C. or more, more preferably 80° C. or more, even more preferably 90° C. or more, yet even more preferably 98° C. or more, still even more preferably 102° C. or more, and in particular 115° C. or more. It is preferred that the medium has a clearing point in the range from 90° C. to 160° C. and more preferably from 100° C. to 150° C.

All physical properties and physicochemical or electrooptical parameters are determined by generally known methods, in particular according to "Merck Liquid Crystals, Physical Properties of Liquid Crystals", Status November 1997, Merck KGaA, Germany.

The clearing point, in particular the phase transition temperature between the chiral nematic or cholesteric phase and the isotropic phase, can be measured and determined by commonly known methods, e.g. using a Mettler oven, a hot-stage under a polarizing microscope, or differential scanning calorimetry (DSC) analysis. According to the invention the clearing point is preferably determined using a Mettler oven.

The liquid-crystalline medium, in particular as used in the method and as provided in the switching layer of the switching element, preferably exhibits a pitch of 0.55 μm or more in the scattering state.

The cholesteric or chiral nematic medium as presently provided preferably has a relatively long pitch, and in particular a pitch which preferably gives Bragg-type reflection of greater than 780 nm. In this case also the planar texture may give favourable transmission over the visible light spectrum.

The pitch herein means the pitch p of the cholesteric helix, wherein the pitch p is the distance for the orientational axis (director) of the CLC to undergo a $2\pi$ rotation. In a preferred embodiment the medium exhibits a pitch of 0.75 μm or more, even more preferably of 1.00 μm or more and in particular of 1.50 μm or more.

Preferably the concentration of the one or more chiral dopants is set such that the resulting chiral pitch is in the range of 0.55 μm to 10 μm.

According to the invention the pitch is determined from NIR spectroscopic measurement, in particular at 20° C., of the wavelength of the selective reflection maximum $\lambda_{max}$.

The pitch p is determined from the measured value of $\lambda_{max}$ using the equation $\lambda_{max}=n(\lambda_{max})*p$, wherein $n(\lambda_{max})$ is the refractive index at $\lambda_{max}$.

It is also possible to use the wedge cell method which is known in the art to measure, in particular at 20° C., the helical twisting power HTP and to confirm the determined the pitch.

Surprisingly the switching element according to the invention can be switched to and operated in a scattering state which gives efficient and sufficiently strong scattering, in particular diffuse transmittance, with a homogeneous appearance to the eye, in particular over large areas as is desirable for larger windows. This uniform appearance advantageously includes a colour-neutral appearance, which means that undesirable colour effects or respectively colour artefacts can be minimized or even avoided.

It was recognized that in a layer containing a cholesteric material colour effects may occur due to the inherent chiral periodicity, e.g. different colours may be transmitted under different angles when the material is illuminated with direct, non-diffuse light. In such a case the transmitted light is coloured when observed off-axis and a window element and the window may appear coloured when observed off-axis, wherein the observed colour depends on the angle of observation. This effect may give a resemblance to a rainbow-like appearance. It was further recognized that in many applications such colour effects are undesirable.

It is believed that the material as provided in the switching layer according to the invention can give sufficient scattering with the desired haze, e.g. by scattering from the material domains, in particular from boundaries, defects or random structures, whereas diffraction of incident light as caused by periodic structures may be substantially suppressed or avoided by sufficiently perturbing or disrupting the periodicity on the relevant length scales, in particular by the introduction of the polymeric component, which surprisingly may be effective in this regard even when contained in only small amounts.

In addition, by using the method according to the invention it is possible to obtain switching elements which furthermore advantageously have an optically clear state with a significantly reduced residual haze or even no discernible haze at all.

The switching element according to the invention allows light to pass through it. It can be favourably used and included in windows, glazing units, including insulating glazing units, facade elements, room dividers, separating walls and the like and it can be used therein as the element which provides a switchable privacy mode on demand, which can alternatively or in addition also provide anti-glare control.

The switching element as a switchable scattering cell or device can be used to regulate or modulate the passage of light from an exterior space into an interior space, e.g. into the interior of a building such as a residential building, an office building or a building used for commercial purposes, or vehicles. The window element can also be used to regulate or modulate the passage of light from an interior space into another interior space, in particular in structural elements which separate different functional areas or rooms, where in at least one of the spaces a privacy mode which blocks direct viewing from the other space is desired temporarily, i.e. only for given periods of time but not for others.

In an aspect of the invention a window is provided which comprises the switching element according to the invention, preferably for interior applications. The switching element may suitably be integrated into the window, for example by lamination or gluing, preferably lamination to panes or glazing units.

The switching elements and also the windows as a whole which include the switching element preferably do not comprise any light sources. Thus, any light transmitted through the window stems from an external light source such as the sun or a home lighting apparatus.

The switching element preferably has a size of greater than 0.1 m², more preferably greater than 0.5 m², even more preferably greater than 1 m², and still more preferably greater than 3 m². In an embodiment the switching element has an area in the range of 0.25 m² to 15 m², and more preferably in the range of 0.5 m² to 10 m².

The switching element and in particular the window element may have different shapes, e.g. square, rectangular, triangular or polygonal.

Preferably the switching element and the window contain no polarizer.

According to the invention the state of the switching layer and the window element is controlled using an electric field which is applied by means of electrodes. The electrodes are preferably transparent electrodes which are arranged on the substrates in the form of a coating. The coating is commonly applied to the substrate side or surface which is facing the switching layer.

Preferably, the electrodes are not patterned and/or structured so that they are contiguous. Thus, the entire switchable area is addressed and switched at the same time by applying an electric field. In alternative embodiments the electrodes may be patterned to form individually addressable areas which may be switched independently from other areas by applying an electric field. In this case, the electrodes are preferably patterned such that 2 to 10 independently addressable areas are present.

As described herein the liquid-crystalline medium is used in the method and provided in the obtained switching layers and window elements, in particular in the scattering-type switching elements and devices.

In a preferred embodiment the LC medium as used according to the invention has a positive dielectric anisotropy. In this case preference is given to liquid-crystalline mixtures having a dielectric anisotropy Δε in the range from 3 to 45, more preferably in the range from 5 to 30.

Δε denotes the dielectric anisotropy, wherein $\Delta\varepsilon=\varepsilon_\parallel-\varepsilon_\perp$. The dielectric anisotropy Δε is determined at 20° C. and 1 kHz.

In an alternative embodiment it is however also possible to provide an LC medium having a negative dielectric anisotropy. In this case preference is given to liquid-crystalline mixtures having a dielectric anisotropy Δε in the range from −6 to −3.

It is particularly preferred that the medium as used according to the invention contains, based on the overall contents of the medium, at least 15% by weight of one or more mesogenic compounds of formula I

I

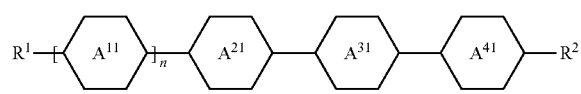

wherein $R^1$ and $R^2$ denote, independently of one another, a group selected from F, Cl, $CF_3$, $OCF_3$, and straight-chain or branched alkyl or alkoxy having 1 to 15 carbon atoms or straight-chain or branched alkenyl having 2 to 15 carbon atoms which is unsubstituted, monosubstituted by CN or $CF_3$ or mono- or polysubstituted by halogen and wherein one or more $CH_2$ groups may be, in each case independently of one another, replaced by —O—, —S—, —CO—, —COO—, —OCO—, —OCOO— or —C≡C— in such a manner that oxygen atoms are not linked directly to one another, $A^{11}$ denotes

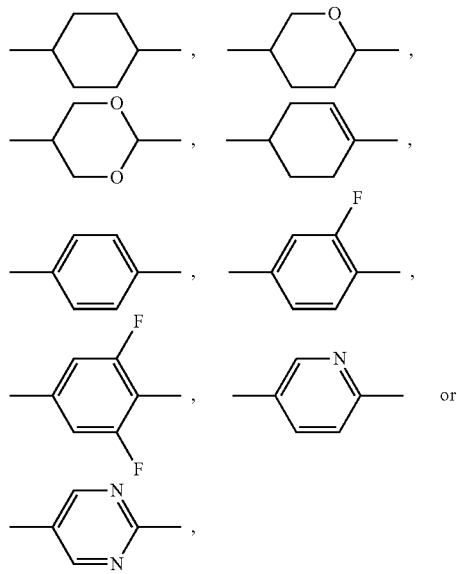

n denotes 0 or 1, and
$A^{21}$, $A^{31}$ and $A^{41}$ denote, independently of one another,

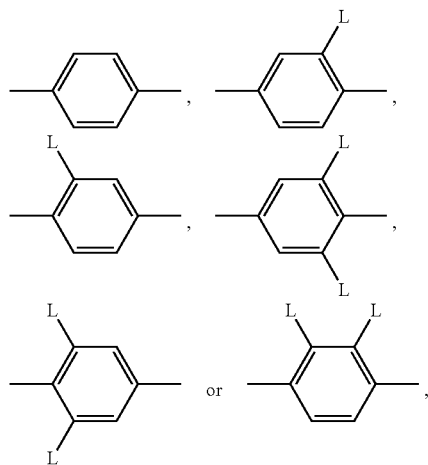

wherein L is on each occurrence, identically or differently, halogen selected from F, Cl and Br.

Favourably the medium according to the invention can have a suitably high optical anisotropy Δn, which is also known as the birefringence. The medium as described herein and as used in the switching layer and the window element according to the invention preferably exhibits an optical anisotropy Δn, determined at 20° C. and 589 nm, of 0.13 or more, more preferably of 0.16 or more and even more preferably of 0.20 or more.

Above and below, Δn denotes the optical anisotropy, wherein $Δn=n_e-n_o$, and the optical anisotropy Δn is determined at 20° C. and a wavelength of 589.3 nm.

In addition to a suitably high optical anisotropy, the medium according to the invention can advantageously exhibit a favourably high voltage holding ratio (VHR) in combination with good light stability and a suitably high clearing point.

Using reactive mesogens, in particular at the low amounts as specified, and preferably using chiral dopant having a high HTP, which can allow the use in low concentrations, can advantageously contribute to maintaining a favourably high clearing point.

The medium is a cholesteric or chiral nematic medium. Cholesteric liquid crystals (CLCs) usually contain a medium which has, for example, in the initial state a planar structure which reflects light having a certain wavelength, and which can be switched into a focal conic, light-scattering structure by application of an electrical alternating-voltage pulse, or vice versa. On application of a stronger voltage, in particular a stronger voltage pulse, the CLC medium can be switched into a homeotropic, transparent state, from which it relaxes into the planar state after rapid switching-off of the voltage or into the focal conic state after slow switching-off.

In the planar texture Bragg reflection occurs, where the reflected light has the same handedness as the cholesteric helix.

In the focal conic state, the helical axes are randomly arranged and the texture shows light scattering because of the discontinuous spatial variations of the refractive indices at the domain boundaries.

Both planar and focal conic configurations are typically stable in the absence of an external electric field. The effect of electric-field-driven textural transitions between planar and focal conic states forms the basis of operation of CLC displays, wherein when the texture of the CLC is switched from the planar to the focal conic texture, the Bragg reflection disappears and the CLC scatters the incident light due to the helical axes being randomly distributed However, the switching between the states is typically achieved only through the homeotropic state, where the cholesteric helix is completely unwound by a dielectric coupling between LC molecules with positive dielectric anisotropy (Δε>0) and a vertical electric field.

In an embodiment according to the invention the scattering state of the switching layer can be the focal conic state described above.

Alternatively, and according to a preferred embodiment, in the present invention the scattering state is formed by a polydomain structure. Preferably this polydomain structure can produce sufficiently strong scattering, while at the same time Bragg-type reflection behaviour still remains observable, at least to some extent. In this phase which comprises, preferably consists of, polydomains the orientation of the helical axis typically varies from domain to domain, and domain boundaries typically occur. In this respect, the polymeric component is believed to sufficiently perturb or disrupt the material order such that the domains form or respectively are maintained. Macroscopically however the phase can appear homogeneous, in particular homogeneously opaque or hazy to the human eye, and be free from visible defects over the entire layer area.

The polydomain structure is obtainable, for example, using conventional orientation layers oriented in a planar or homeotropic manner and advantageously switching to the polydomain state may be achievable at a comparatively low voltage. The polydomain structure is however also obtainable when orientation layers are not present.

In addition, the presence of the polymeric component in the modulation material and the switching layer can favourably influence and stabilize the scattering performance.

In a preferred embodiment the non-scattering or clear state can be formed by the homeotropic state described above. Using this clear state may for example be favourable when an element with a large area is used. In this respect the advantageously high VHR that is presently obtainable can be useful in stabilizing the element in this state against self-discharging behaviour and thus allowing to sustain the state even with significantly lower refresh rates and/or lower power consumption.

Alternatively, the non-scattering or clear state can be formed by the planar texture described above.

Using the chiral nematic or cholesteric medium can be beneficial in that relatively stable states, and even bistability, can be provided such that devices comprising the medium may consume less energy. In particular, a respective state may be retained, at least for a considerable time, after the electric field has been switched off, and less frequent addressing or refreshing of voltage may be possible.

In a preferred embodiment the switching element is switchable into an optically transparent state by applying an AC voltage V1 and is switchable into a scattering state by applying an AC voltage V2, wherein V1>V2.

In an embodiment the switched clear state, in particular a state having a homeotropic alignment, of the obtained switching layer in the switching element is maintained by applying a voltage in the range of 15 V to 100 V, more preferably 20 V to 80 V, and in particular 25 V to 50 V, while the switched privacy or scattering state may be stable, at least for some time, even at 0 V.

Preferably the switching element according to the invention does not use dual frequency addressing, which can simplify the required electronics.

As described above, the medium preferably exhibits a selective reflection with a wavelength of greater than 780 nm. Accordingly the medium preferably reflects in the near infrared (NIR) spectral region.

Chiral dopants and their concentrations can be provided such that the cholesteric pitch of the medium is suitably set or adjusted. A CLC medium can be prepared, for example, by doping a nematic LC medium with a chiral dopant having a high twisting power. The pitch p of the induced cholesteric helix is then given by the concentration c and the helical twisting power HTP of the chiral dopant in accordance with equation (1):

$$p = (\text{HTP } c)^{-1} \quad (1)$$

It is also possible to use two or more dopants, for example in order to compensate for the temperature dependence of the HTP of the individual dopants and thus to achieve small temperature dependence of the helix pitch and the reflection wavelength of the CLC medium. For the total HTP ($HTP_{total}$) then approximately equation (2) holds:

$$HTP_{total} = \Sigma_i c_i HTP_i \quad (2)$$

wherein $c_i$ is the concentration of each individual dopant and $HTP_i$ is the helical twisting power of each individual dopant.

The liquid-crystalline medium contains one or more chiral dopants. The chiral dopants preferably have a high absolute value of the HTP and can generally be added in relatively low concentrations to mesogenic base mixtures and have good solubility in the achiral component. If two or more chiral compounds are employed, they may have the same or opposite direction of rotation and the same or opposite temperature dependence of the twist.

Preferably, the one or more chiral compounds according to the invention have an absolute value of the helical twisting power of 5 $\mu m^{-1}$ or more, more preferably of 10 $\mu m^{-1}$ or more and even more preferably of 15 $\mu m^{-1}$ or more, preferably in the commercial liquid-crystal mixture MLC-6828 from Merck KGaA. Particular preference is given to chiral compounds having an absolute value of the helical twisting power (HTP) of 20 $\mu m^{-1}$ or more, more preferably of 40 $\mu m^{-1}$ or more, even more preferably of 60 $\mu m^{-1}$ or more, and most preferably in the range of 80 $\mu m^{-1}$ or more to 260 $\mu m^{-1}$ or less, preferably in the commercial liquid-crystal mixture MLC-6828 from Merck KGaA.

Preferably the one or more chiral compounds are contained in the liquid-crystalline medium in an amount, based on the overall contents of the medium, of 2% by weight or less, more preferably 1% by weight or less.

In a preferred embodiment of the present invention, the chiral component consists of two or more chiral compounds which all have the same sign of the HTP. The temperature dependence of the HTP of the individual compounds may be high or low. The temperature dependence of the pitch of the medium can be compensated by mixing compounds having different temperature dependence of the HTP in corresponding ratios.

Suitable chiral dopants are known in the art, some of which are commercially available, such as, for example, cholesteryl nonanoate, R/S-811, R/S-1011, R/S-2011, R/S-3011, R/S-4011, R/S-5011, in particular R-5011, B(OC) 2C*H—C-3 or CB15 (all Merck KGaA, Darmstadt, Germany).

Particularly suitable chiral dopants are compounds which contain one or more chiral radicals and one or more mesogenic groups, or one or more aromatic or alicyclic groups which form a mesogenic group with the chiral radical.

Suitable chiral radicals are, for example, chiral branched hydrocarbon radicals, chiral ethanediols, binaphthols or dioxolanes, furthermore mono- or polyvalent chiral radicals selected from the group consisting of sugar derivatives, sugar alcohols, sugar acids, lactic acids, chiral substituted glycols, steroid derivatives, terpene derivatives, amino acids or sequences of a few, preferably 1-5, amino acids.

Preferred chiral radicals are sugar derivatives, such as glucose, mannose, galactose, fructose, arabinose and dextrose; sugar alcohols, such as, for example, sorbitol, mannitol, iditol, galactitol or anhydro derivatives thereof, in particular dianhydrohexitols, such as dianhydrosorbide (1,4: 3,6-dianhydro-D-sorbide, isosorbide), dianhydromannitol (isosorbitol) or dianhydroiditol (isoiditol); sugar acids, such as, for example, gluconic acid, gulonic acid and ketogulonic acid; chiral substituted glycol radicals, such as, for example, mono- or oligoethylene or propylene glycols, wherein one or more $CH_2$ groups are substituted by alkyl or alkoxy; amino acids, such as, for example, alanine, valine, phenylglycine or phenylalanine, or sequences of from 2 to 5 of these amino acids; steroid derivatives, such as, for example, cholesteryl or cholic acid radicals; terpene derivatives, such as, for example, menthyl, neomenthyl, campheyl, pineyl, terpineyl, isolongifolyl, fenchyl, carreyl, myrthenyl, nopyl, geraniyl, linaloyl, neryl, citronellyl or dihydrocitronellyl.

Suitable chiral radicals and mesogenic chiral compounds are described, for example, in DE 35 23 185 (internal priority DE 34 25 503), DE 35 34 777, DE 35 34 778, DE 36 17 826 (internal priority DE 35 34 779) and DE 35 34 780, DE 43 42 280, EP 01 038 941 and DE 195 41 820.

Preferable chiral compounds used according to the present invention are selected from the following groups of compounds.

In an embodiment preference is given to dopants selected from the group consisting of compounds of the following formulae A-I to A-III:

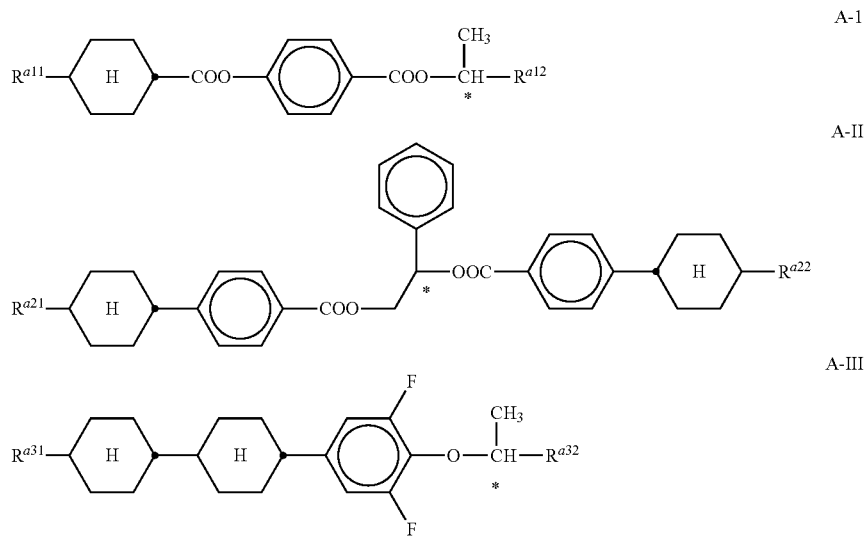

A-I

A-II

A-III in which

- $R^{a11}$ and $R^{a12}$, independently of one another, are alkyl, oxaalkyl or alkenyl having from 2 to 9, preferably up to 7, carbon atoms, and $R^{a11}$ is alternatively methyl or alkoxy having from 1 to 9 carbon atoms, preferably both are alkyl, preferably n-alkyl,
- $R^{a21}$ and $R^{a22}$, independently of one another, are alkyl or alkoxy having from 1 to 9, preferably up to 7, carbon atoms, oxaalkyl, alkenyl or alkenyloxy having from 2 to 9, preferably up to 7, carbon atoms, preferably both are alkyl, preferably n-alkyl,
- $R^{a31}$ and $R^{a32}$, independently of one another, are alkyl, oxaalkyl or alkenyl having from 2 to 9, preferably up to 7, carbon atoms, and $R^{a11}$ is alternatively methyl or alkoxy having from 1 to 9 carbon atoms, preferably both are alkyl, preferably n-alkyl.

Particular preference is given to chiral dopants selected from the group consisting of the compounds of the following formulae:

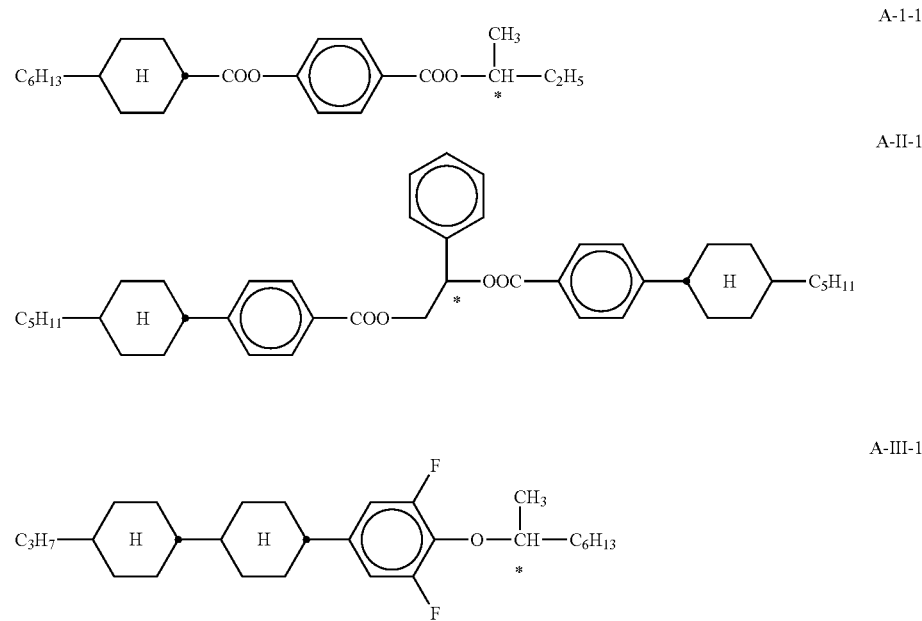

A-I-1

A-II-1

A-III-1

Further preferred dopants are derivatives of isosorbide, isomannitol or isoiditol of the following formula A-IV

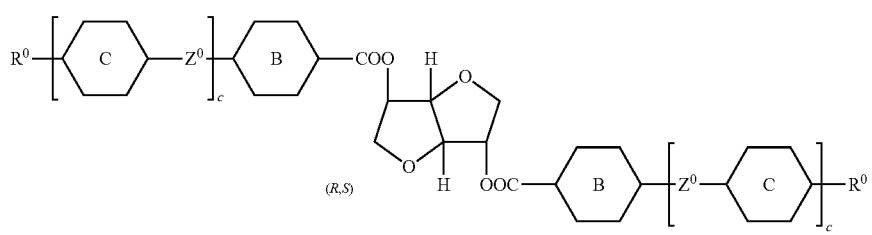

A-IV in which the group

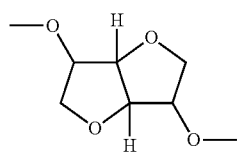
(dianhydrosorbitol)

is

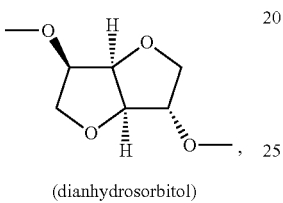
(dianhydrosorbitol)

, or

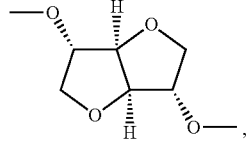
(dianhydromannitol)

,

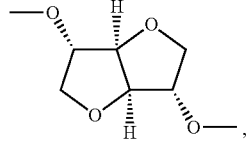
(dianhydroiditol)

, preferably dianhydrosorbitol,
and chiral ethanediols, such as, for example, diphenylethanediol (hydrobenzoin), in particular mesogenic hydrobenzoin derivatives of the following formula A-V including the (R,S), (S,R), (R,R) and (S,S) enantiomers, which are not shown,
in which —B— and —C— are each, independently of one another, 1,4-phenylene, which may also be mono-, di- or trisubstituted by L, or 1,4-cyclohexylene, L is H, F, Cl, CN or optionally halogenated alkyl, alkoxy, alkylcarbonyl, alkoxycarbonyl or alkoxycarbonyloxy having 1-7 carbon atoms, c is 0 or 1, $Z^0$ is —COO—, —OCO—, —CH$_2$CH$_2$— or a single bond, and $R^0$ is alkyl, alkoxy, alkylcarbonyl, alkoxycarbonyl or alkylcarbonyloxy having 1-12 carbon atoms.

Compounds of formula A-IV are described in WO 98/00428. Compounds of the formula A-V are described in GB-A-2,328,207.

In another embodiment particularly preferred chiral dopants are chiral binaphthyl derivatives, as described in WO 02/94805, chiral binaphthol acetal derivatives, as described in WO 02/34739, chiral TADDOL derivatives, as described in WO 02/06265, and chiral dopants having at least one fluorinated bridging group and a terminal or central chiral group, as described in WO 02/06196 and WO 02/06195.

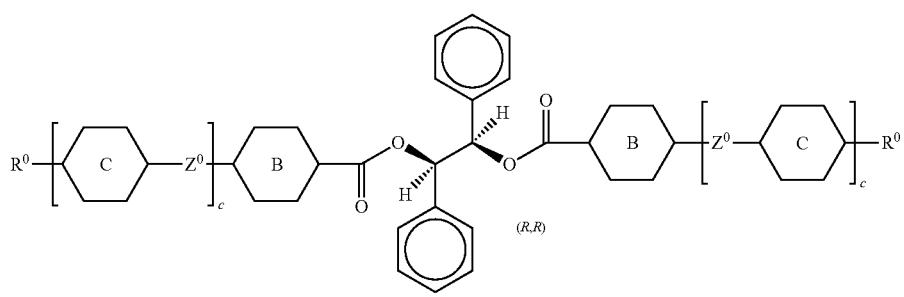

A-V

Particular preference is given to chiral compounds of formula A-VI

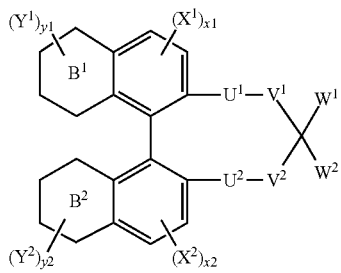

A-VI in which
X$^1$, X$^2$, Y$^1$ and Y$^2$ are each, independently of one another, F, Cl, Br, I, CN, SCN, SF$_5$, straight-chain or branched alkyl having from 1 to 25 carbon atoms, which may be monosubstituted or polysubstituted by F, Cl, Br, I or CN and in which, in addition, one or more non-adjacent CH$_2$ groups may each, independently of one another, be replaced by —O—, —S—, —NH—, NR$^0$—, —CO—, —COO—, —OCO—, —OCOO—, —S—CO—, —CO—S—, —CH=CH— or —C≡C— in such a way that O and/or S atoms are not bonded directly to one another, a polymerisable group or cycloalkyl or aryl having up to 20 carbon atoms, which may optionally be monosubstituted or polysubstituted by halogen, preferably F, or by a polymerisable group,
x$^1$ and x$^2$ are each, independently of one another, 0, 1 or 2,
y$^1$ and y$^2$ are each, independently of one another, 0, 1, 2, 3 or 4,
B$^1$ and B$^2$ are each, independently of one another, an aromatic or partially or fully saturated aliphatic six-membered ring in which one or more CH groups may be replaced by N atoms and one or more non-adjacent CH$_2$ groups may be replaced by O and/or S,
W$^1$ and W$^2$ are each, independently of one another, —Z$^1$-A$^1$-(Z$^2$-A$^2$)$_m$-R, and one of the two is alternatively R$^1$ or A$^3$, but both are not simultaneously H, or

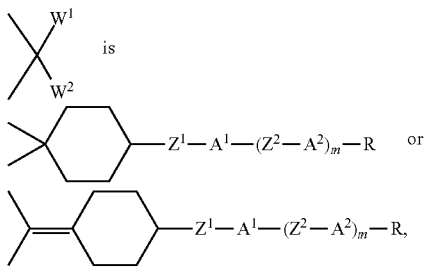

U$^1$ and U$^2$ are each, independently of one another, CH$_2$, O, S, CO or CS,
V$^1$ and V$^2$ are each, independently of one another, (CH$_2$)$_n$, in which from one to four non-adjacent CH$_2$ groups may be replaced by O and/or S, and one of V$^1$ and V$^2$ and, in the case where

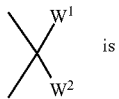

is

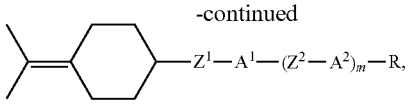

both are a single bond,
Z$^1$ and Z$^2$ are each, independently of one another, —O—, —S—, —CO—, —COO—, —OCO—, —O—COO—, —CO—NR$^0$—, —NR$^0$—CO—, —O—CH$_2$—, —CH$_2$—O—, —S—CH$_2$—, —CH$_2$—S—, —CF$_2$—O—, —O—CF$_2$—, —CF$_2$—S—, —S—CF$_2$—, —CH$_2$—CH$_2$—, —CF$_2$—CH$_2$—, —CH$_2$—CF$_2$—, —CF$_2$—CF$_2$—, —CH=N—, —N=CH—, —N=N—, —CH=CH—, —CF=CH—, —CH=CF—, —CF=CF—, —C≡C—, a combination of two of these groups, where no two O and/or S and/or N atoms are bonded directly to one another, preferably —CH=CH—COO—, or —COO—CH=CH—, or a single bond,
A$^1$, A$^2$ and A$^3$ are each, independently of one another, 1,4-phenylene, in which one or two non-adjacent CH groups may be replaced by N, 1,4-cyclohexylene, in which one or two non-adjacent CH$_2$ groups may be replaced by O and/or S, 1,3-dioxolane-4,5-diyl, 1,4-cyclohexenylene, 1,4-bicyclo[2.2.2]octylene, piperidine-1,4-diyl, naphthalene-2,6-diyl, decahydronaphthalene-2,6-diyl or 1,2,3,4-tetrahydronaphthalene-2,6-diyl, where each of these groups may be monosubstituted or polysubstituted by L, and in addition A$^1$ is a single bond,
L is a halogen atom, preferably F, CN, NO$_2$, alkyl, alkoxy, alkylcarbonyl, alkoxycarbonyl or alkoxycarbonyloxy having 1-7 carbon atoms, in which one or more H atoms may be replaced by F or Cl,
m is in each case, independently, 0, 1, 2 or 3, and
R and R$^1$ are each, independently of one another, H, F, Cl, Br, I, CN, SCN, SF$_5$, straight-chain or branched alkyl having from 1 or 3 to 25 carbon atoms respectively, which may optionally be monosubstituted or polysubstituted by F, Cl, Br, I or CN, and in which one or more non-adjacent CH$_2$ groups may be replaced by —O—, —S—, —NH—, —NR$^0$—, —CO—, —COO—, —OCO—, —O—COO—, —S—CO—, —CO—S—, —CH=CH— or —C≡C—, where no two O and/or S atoms are bonded directly to one another, or a polymerisable group.

Particular preference is given to chiral binaphthyl derivatives of the formula A-VI-1

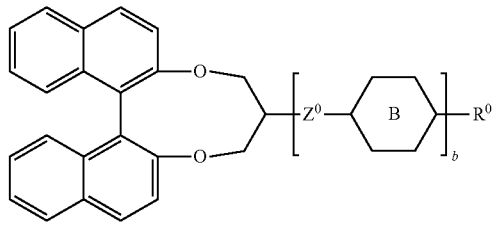

A-VI-1 in particular those selected from the following formulae A-VI-1a to A-VI-1c:

A-VI-1a

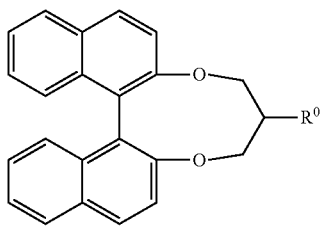

A-VI-1b

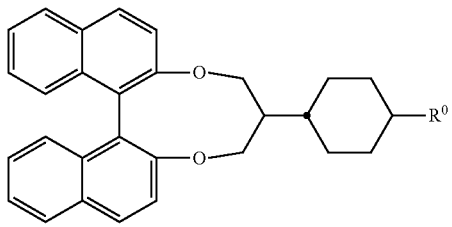

A-VI-1c

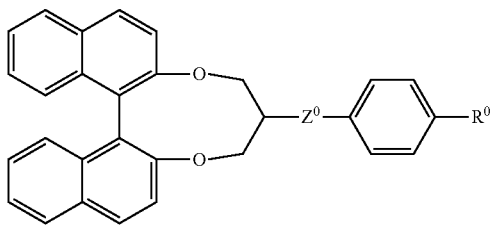

in which B and $Z^0$ are as defined for formula A-IV, and $Z^0$ more preferably is —OCO— or a single bond, $R^0$ is as defined for formula A-IV or H or alkyl having from 1 to 4 carbon atoms, and b is 0, 1 or 2.

Particular preference is furthermore given to chiral binaphthyl derivatives of the formula A-VI-2

A-VI-2

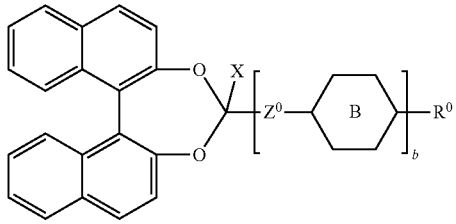

in particular to those selected from the following formulae A-VI-2a to A-VI-2f:

A-VI-2a

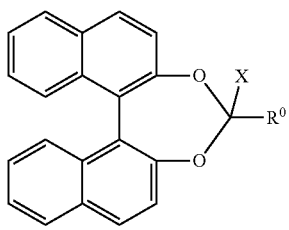

A-VI-2b

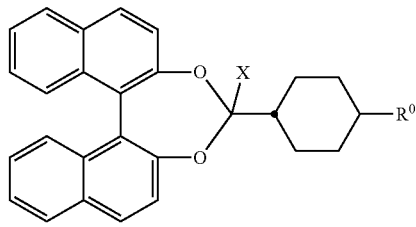

A-VI-2c

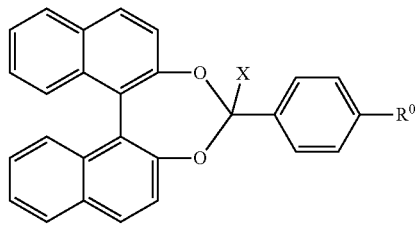

A-VI-2d

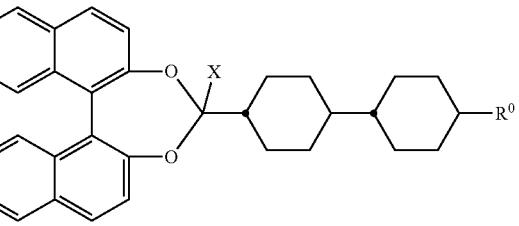

A-VI-2e

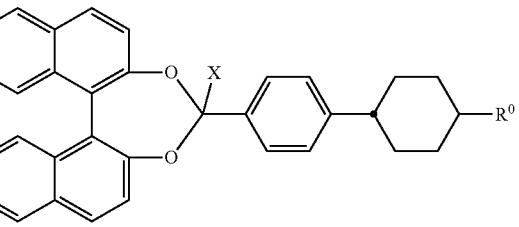

A-VI-2f

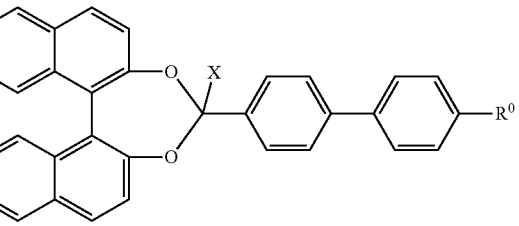

in which $R^0$ is as defined for formula A-VI, and X is H, F, Cl, CN or $R^0$, preferably F.

In a particularly preferred embodiment, the chiral medium according to the invention comprises one or more compounds of formula R-5011 and S-5011 which are shown in Table F below. In an embodiment the medium contains R-5011. In another embodiment the medium contains S-5011.

The LC medium according to the present invention preferably and favourably exhibits a high reliability and a high electric resistivity. The LC medium according to the present invention also preferably and favourably exhibits a high voltage holding ratio (VHR), see S. Matsumoto et al., Liquid Crystals 5, 1320 (1989); K. Niwa et al., Proc. SID Conference, San Francisco, June 1984, p. 304 (1984); T. Jacob and U. Finkenzeller in "Merck Liquid Crystals—Physical Properties of Liquid Crystals", 1997. The VHR of an LC medium according to the invention is preferably ≥85%, more preferably ≥90%, even more preferably ≥95% and particularly preferably ≥98%. Unless described otherwise, the measurement of the VHR is carried out as described in T. Jacob, U. Finkenzeller in "Merck Liquid Crystals—Physical Properties of Liquid Crystals", 1997.

According to the invention in the method a liquid-crystalline medium is provided which comprises one or more polymerisable mesogenic compounds in an amount, based on the overall contents of the medium, of 4% by weight or less.

Preferably, the one or more polymerisable mesogenic compounds are contained in the medium in an amount, based on the overall contents of the medium, in an amount of 3% by weight or less, even more preferably in an amount of 2% by weight or less and particularly preferably in an amount of 1.25% by weight or less.

Preferably, one or more of the one or more polymerisable mesogenic compounds comprise one, two or more acrylate and/or methacrylate groups.

In the medium as used in the method according to the invention preferably one or more polymerisable, curable or hardenable compounds are provided, preferably one or more photocurable monomers, which can favourably serve as the precursors for the polymeric component in the modulation material and the switching layer.

The reactive mesogens (RMs) or mesogenic monomers used contain a mesogenic group and one or more polymerisable groups, i.e. functional groups which are suitable for polymerisation.

In a particularly preferred embodiment the polymerisable compound(s) used include(s) only reactive mesogen(s), i.e. all the reactive monomers are mesogens. Alternatively, RMs can be provided in combination with one or more non-mesogenic polymerisable compounds. The RMs can be monoreactive and/or di- or multireactive.

In a preferred embodiment of the invention one or more of the one or more polymerisable mesogenic compounds are selected from the compounds of the formula M

$$R^{Ma}\text{-}A^{M1}\text{-}(Z^{M1}\text{-}A^{M2})_{m1}\text{-}R^{Mb} \qquad M$$

in which the individual radicals are defined as follows:
$R^{Ma}$ and $R^{Mb}$ are each independently P, P-Sp-, H, F, Cl, Br, I, —CN, —NO$_2$, —NCO, —NCS, —OCN, —SCN, SF$_5$ or straight-chain or branched alkyl having 1 to 25 carbon atoms, in which one or more non-adjacent CH$_2$ groups may each independently also be replaced by —C(R$^0$)=C(R$^{00}$)—, —C≡C—, —N(R$^{00}$)—, —O—, —S—, —CO—, —CO—O—, —O—CO—, —O—CO—O—, in such a way that no oxygen and/or sulphur atoms are joined directly to one another, and in which one or more hydrogen atoms may also be replaced by F, Cl, Br, I, CN, P or P-Sp-, where preferably at least one of the $R^{Ma}$ and $R^{Mb}$ radicals is or contains a P or P-Sp- group,
preferably
$R^{Ma}$ and $R^{Mb}$ are each independently P, P-Sp-, H, halogen, SF$_5$, NO$_2$, an alkyl, alkenyl or alkynyl group, where preferably at least one of the $R^{Ma}$ and $R^{Mb}$ radicals is or contains a P or P-Sp- group,
P is a polymerisable group,
Sp is a spacer group or a single bond,
$A^{M1}$ and $A^{M2}$ are each independently an aromatic, heteroaromatic, alicyclic or heterocyclic group, preferably having 4 to 25 ring atoms, preferably carbon atoms, which also comprises or may contain fused rings, and which may optionally be mono- or polysubstituted by L,
L is P, P-Sp-, OH, CH$_2$OH, F, Cl, Br, I, —CN, —NO$_2$, —NCO, —NCS, —OCN, —SCN, —C(=O)N(R$^x$)$_2$, —C(=O)Y$^1$, —C(=O)R$^x$, —N(R$^x$)$_2$, optionally substituted silyl, optionally substituted aryl having 6 to 20 carbon atoms, or straight-chain or branched alkyl, alkoxy, alkylcarbonyl, alkoxycarbonyl, alkylcarbonyloxy or alkoxycarbonyloxy having 1 to 25 carbon atoms or alkenyl or alkynyl having 2 to 25 carbon atoms, in which one or more hydrogen atoms may also be replaced by F, Cl, P or P-Sp-, preferably P, P-Sp-, H, OH, CH$_2$OH, halogen, SF$_5$, NO$_2$, an alkyl, alkenyl or alkynyl group,
$Y^1$ is halogen, preferably F,
$Z^{M1}$ is —O—, —S—, —CO—, —CO—O—, —OCO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_{n1}$—, —CF$_2$CH$_2$—, —CH$_2$CF$_2$—, —(CF$_2$)$_{n1}$—, —CH=CH—, —CF=CF—, —C≡C—, —CH=CH—, —COO—, —OCO—CH=CH—, CR$^0$R$^{00}$ or a single bond,
$R^0$ and $R^{00}$ are each independently H or alkyl having 1 to 12 carbon atoms,
$R^x$ is P, P-Sp-, H, halogen, straight-chain, branched or cyclic alkyl having 1 to 25 carbon atoms, in which one or more non-adjacent CH$_2$ groups may also be replaced by —O—, —S—, —CO—, —CO—O—, —O—CO—, —O—CO—O—, in such a way that no oxygen and/or sulphur atoms are joined directly to one another, and in which one or more hydrogen atoms may also be replaced by F, Cl, P or P-Sp-, an optionally substituted aryl or aryloxy group having 6 to 40 carbon atoms, or an optionally substituted heteroaryl or heteroaryloxy group having 2 to 40 carbon atoms,
m1 is 0, 1, 2, 3 or 4, and
n1 is 1, 2, 3 or 4,
where at least one substituent, preferably one, two or three substituents and more preferably one or two substituents from the group of $R^{Ma}$, $R^{Mb}$ and the substituent L present is a P or P-Sp- group or contains at least one P or P-Sp- group.

Particular preference is given to compounds of the formula M in which one of $R^{ma}$ and $R^{mb}$ or both are P or P-Sp-.

Suitable and preferred RMs for use in the liquid crystalline media according to the invention are, for example, selected from the following formulae:

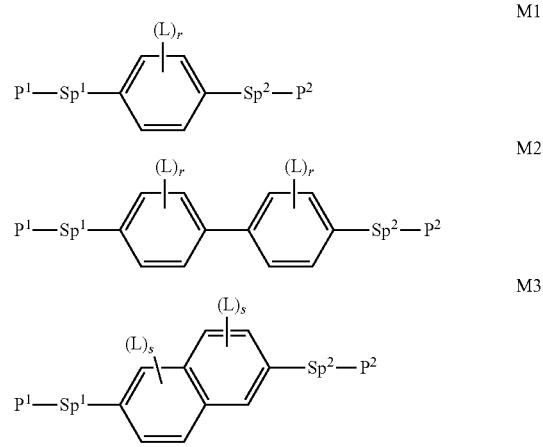

M4
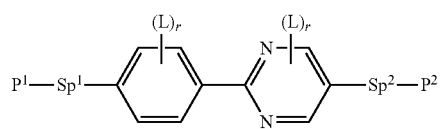
M5
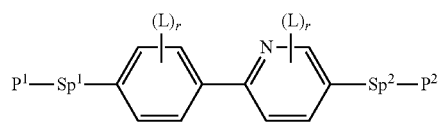
M6
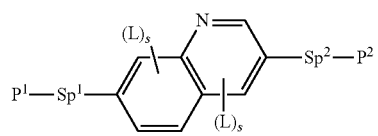
M7
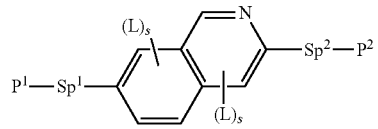
M8
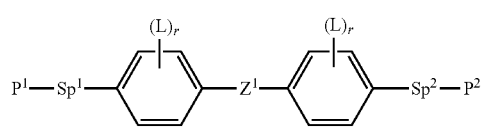
M9
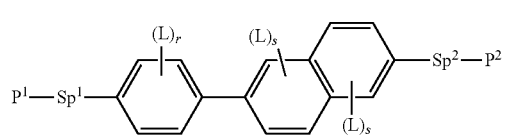
M10
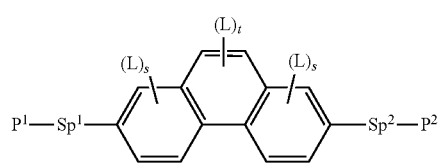
M11
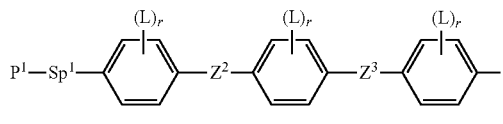
M12
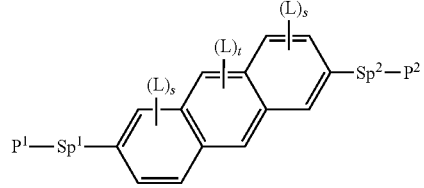
M13
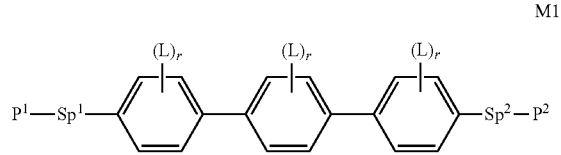
M14
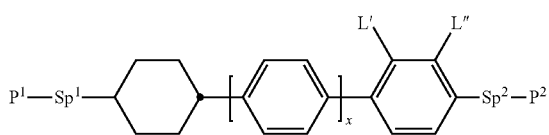
M15
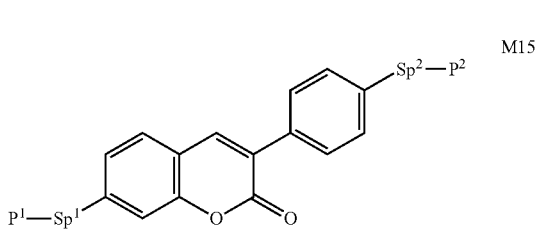
M16
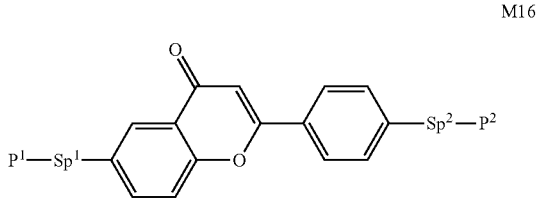
M17
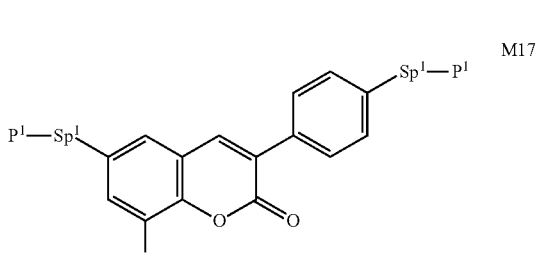
M18
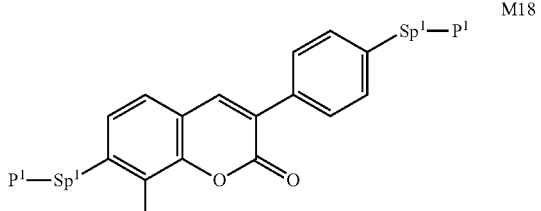
M19
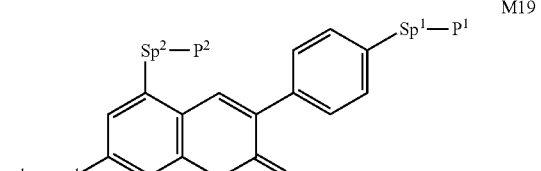
M20
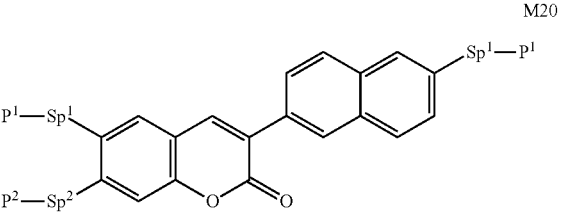

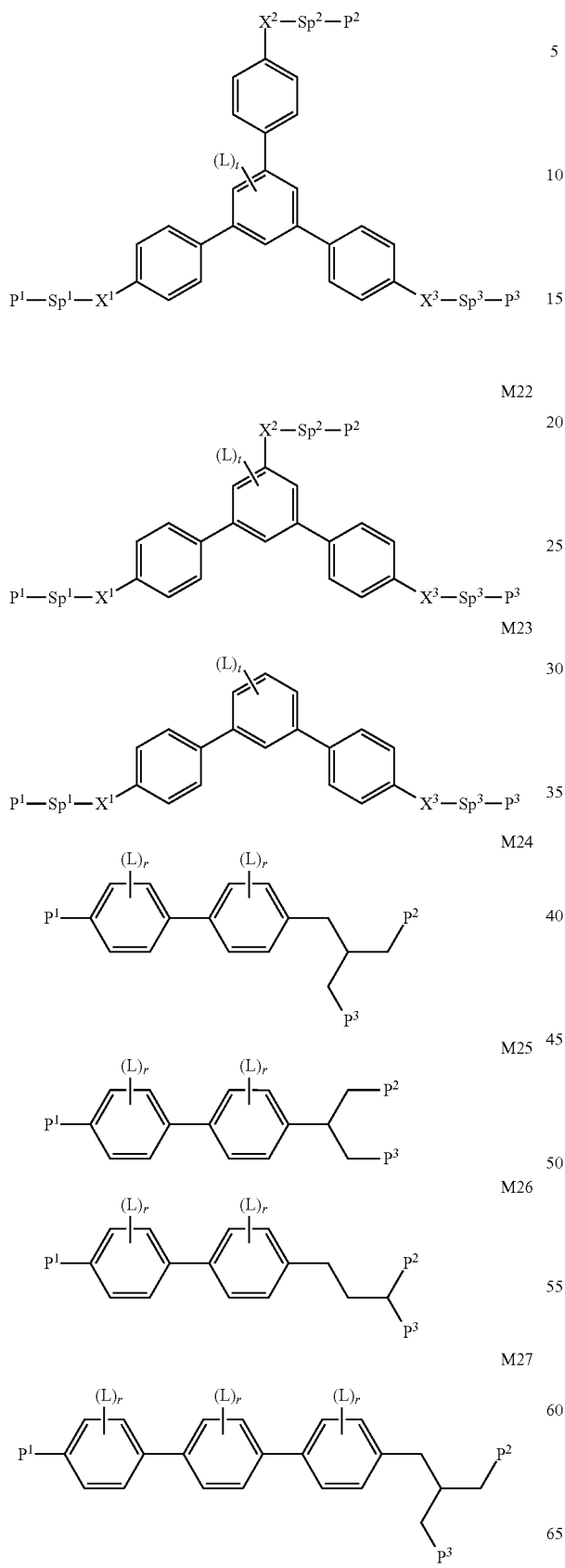

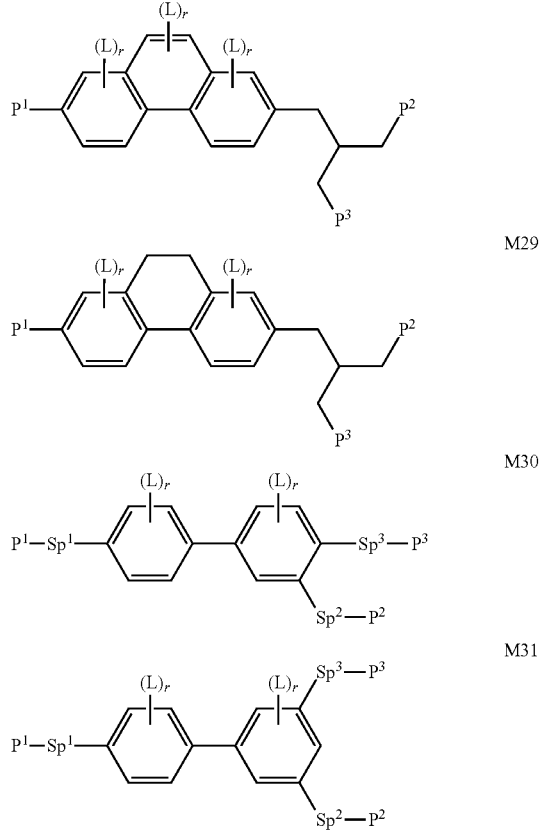

in which the individual radicals are defined as follows:

$P^1$ to $P^3$ are each independently a polymerisable group, preferably having one of the definitions specified above and below for P, more preferably an acrylate, methacrylate, fluoroacrylate, oxetane, vinyloxy or epoxy group, $Sp^1$ to $Sp^3$ are each independently a single bond or a spacer group, preferably having one of the definitions of Sp given above and below, and more preferably —$(CH_2)_{p1}$—, —$(CH_2)_{p1}$—O—, —$(CH_2)_{p1}$—CO—O— or —$(CH_2)_{p1}$—O—CO—O—, in which p1 is an integer from 1 to 12, and where the bond to the adjacent ring in the latter groups is via the oxygen atom, where one of the $P^1$-$Sp^1$-, $P^2$-$Sp^2$- and $P^3$-$Sp^3$- radicals may also be $R^{aa}$, $R^{aa}$ is H, F, Cl, CN or straight-chain or branched alkyl having 1 to 25 carbon atoms, in which one or more non-adjacent $CH_2$ groups may each independently also be replaced by $C(R^0)$=$C(R^{00})$—, —C≡C—, —$N(R^0)$—, —O—, —S—, —CO—, —CO—O—, —O—CO—, —O—CO—O—, in such a way that no oxygen and/or sulphur atoms are joined directly to one another, and in which one or more hydrogen atoms may also be replaced by F, Cl, CN or $P^1$-$Sp^1$-, more preferably straight-chain or branched, optionally mono- or polyfluorinated alkyl, alkoxy, alkenyl, alkynyl, alkylcarbonyl, alkoxycarbonyl, or alkylcarbonyloxy having 1 to 12 carbon atoms (where the alkenyl and alkynyl radicals have at least two and the branched radicals at least three carbon atoms), $R^0$ and $R^{00}$ are the same or different at each instance and are each independently H or alkyl having 1 to 12 carbon atoms, $R^y$ and $R^z$ are each independently H, F, $CH_3$ or $CF_3$, $Z^1$ is —O—, —CO—, —C($R^yR^z$)— or —$CF_2CF_2$—, $Z^2$ and $Z^3$ are each independently —CO—O—, —O—CO—, —$CH_2O$—, —$OCH_2$—, —$CF_2O$—, —$OCF_2$— or —$(CH_2)_n$—, where n is 2, 3 or 4, L is the same or different at each instance and has the meaning given under formula M above, preferably is F, Cl, CN, or straight-chain or branched, optionally mono- or polyfluorinated alkyl, alkoxy, alkenyl, alkynyl, alkylcarbonyl, alkoxycarbonyl or alkylcarbonyloxy having 1 to 12 carbon atoms, preferably F, L' and L" are each independently H, F or Cl, $X^1$ to $X^3$ are independently of one another —CO—O—, —O—CO— or a single bond, r is 0, 1, 2, 3 or 4, s is 0, 1 or 3, t is 0, 1 or 2, and x is 0 or 1.

Suitable polymerisable compounds are listed, for example, in Table G. Particularly preferred reactive mesogens are compounds of formulae RM-A, RM-B and RM-C as shown respectively in Examples 1 and 5.

The polymerisable compounds have at least one polymerisable group. The polymerisable group is preferably selected from $CH_2$=$CW^1$—COO—,

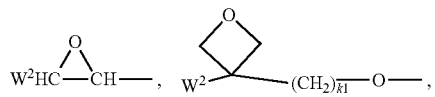

$CH_2$=$CW^2$—$(O)_{k1}$—, $CH_3$—CH=CH—O—, $(CH_2$=$CH)_2CH$—OCO—, $(CH_2$=CH—$CH_2)_2CH$—OCO—, $(CH_2$=$CH)_2CH$—O—, $(CH_2$=CH—$CH_2)_2N$—, HO—$CW^2W^3$—, HS—$CW^2W^3$—, H$W^2$N—, HO—$CW^2W^3$—NH—, $CH_2$=$CW^1$—CO—NH—, $CH_2$=CH—$(COO)_{k1}$-Phe-$(O)_{k2}$—, Phe-CH=CH—, HOOC—, OCN—, with $W^1$ being H, Cl, CN, phenyl or alkyl with 1 to 5 C atoms, in particular H, Cl or $CH_3$, $W^2$ and $W^3$ being independently of each other H or alkyl with 1 to 5 C atoms, in particular H, methyl, ethyl or n-propyl, Phe being 1,4-phenylene and $k_1$ and $k_2$ being independently of each other 0 or 1. The polymerisable or reactive group is preferably selected from a vinyl group, an acrylate group, a methacrylate group, a fluoroacrylate group, an oxetane group or an epoxy group, especially preferably an acrylate group or a methacrylate group.

In an embodiment, non-mesogenic monomers are included in the medium in addition to the one or more RMs. Preferably, one or more polymerisable compounds, either the non-mesogenic monomers or the RMs or both, are selected from acrylates, methacrylates, fluoroacrylates and vinyl acetate, wherein the composition more preferably further comprises one or more direactive and/or trireactive polymerisable compounds, preferably selected from diacrylates, dimethacrylates, triacrylates and trimethacrylates.

In a preferred embodiment the medium according to the invention comprises one or more non-mesogenic monoacrylates, particularly preferably one or more compounds selected from methyl acrylate, ethyl acrylate, propyl acrylate, isopropyl acrylate, butyl acrylate, t-butyl acrylate, pentyl acrylate, hexyl acrylate, nonyl acrylate, 2-ethylhexyl acrylate, 2-hydroxyethyl acrylate, 2-hydroxy-butyl acrylate and isobornyl acrylate.

Additionally or alternatively the medium according to the invention preferably comprises one or more non-mesogenic monomethacrylates, particularly preferably one or more compounds selected from methyl methacrylate, ethyl methacrylate, propyl methacrylate, isopropyl methacrylate, butyl methacrylate, t-butyl methacrylate, pentyl methacrylate, hexyl methacrylate, nonyl methacrylate, dodecyl methacrylate, 2-ethyl-hexyl methacrylate, 2-hydroxy-ethyl methacrylate, 2-hydroxy-butyl methacrylate, isobornyl methacrylate and 1-adamantyl methacrylate.

It is particularly preferred that at least one crosslinking agent is added to the medium, i.e. a polymerisable compound containing two or more polymerisable groups, wherein preferably di- or multireactive RMs are used.

In this respect direactive and multireactive compounds can serve to form polymer networks of their own and/or to crosslink polymer chains formed substantially from polymerising monoreactive compounds.

Alternatively or additionally, conventional crosslinkers known in the art can be used. It is particularly preferred to additionally provide direactive or multireactive acrylates and/or methacrylates. Particularly preferred compounds are selected from ethylene diacrylate, propylene diacrylate, butylene diacrylate, pentylene diacrylate, hexylene diacrylate, glycol diacrylate, glycerol diacrylate, pentaerythritol tetraacrylate, ethylene dimethacrylate, also known as ethyleneglycol dimethacrylate, propylene dimethacrylate, butylene dimethacrylate, pentylene dimethacrylate, hexylene dimethacrylate, tripropylene glycol diacrylate, glycol dimethacrylate, glycerol dimethacrylate, trimethylpropane trimethacrylate and pentaerythritol triacrylate.

The ratio of monoreactive monomers and di- or multireactive monomers can be favourably set and adjusted to influence the properties of the polymeric component to be formed.

Suitable and conventionally used thermal initiators or photoinitiators can be added to the medium to facilitate the reaction, for example azo compounds or organic peroxides such as Luperox type initiators. Moreover, suitable conditions for the polymerisation and suitable types and amounts of initiators are known in the art and are described in the literature. In case a polymerisation initiator is included in the medium, the use of a photoinitiator is preferred.

For example, when polymerising by means of UV light, a photoinitiator can be used that decomposes under UV irradiation to produce free radicals or ions that start the polymerisation reaction. For polymerising acrylate or methacrylate groups preferably a radical photoinitiator is used. For polymerising vinyl, epoxide or oxetane groups preferably a cationic photoinitiator is used. It is also possible to use a thermal polymerisation initiator that decomposes when heated to produce free radicals or ions that start the polymerisation. Typical radical photoinitiators are for example the commercially available Irgacure®, e.g. Irgacure 651 (available from BASF, containing 2,2-dimethoxy-1,2-diphenyl ethan-1-one), or Darocure® (Ciba Geigy AG, Basel, Switzerland). A typical cationic photoinitiator is for example UVI 6974 (Union Carbide). Further useful photoinitiators include α-aminoketones, e.g. Irgacure 907, coumarins, phosphine oxides, e.g. Irgacure 2100, acyl phosphines, e.g. Irgacure 819.

In a particular embodiment the added polymerisation initiator, preferably photoinitiator, comprises, preferably consists of, one or more mesogenic polymerisation initiators, preferably one or more mesogenic photoinitiators, i.e. one or more reactive compounds which can initiate polymerisation and which themselves have anisotropic and mesogenic properties.

However, according to a particularly preferred embodiment no polymerisation initiator is used, and in particular no photoinitiator is used. In certain cases this may improve the VHR and reduce the tendency to produce ions in the switching layer. Considering that in the present method a DC electric voltage is applied during the polymerisation, it is thus particularly beneficial and preferable when no initiator is added to the medium.

In order to maintain and achieve a good VHR, preferably impurities in the reaction products of the polymerisation are kept at a minimum or are substantially avoided. In particular, residual reactive species and charged contaminants are suitably and preferably kept at a minimum. For example, in case UV polymerisation is carried out, in a preferred embodiment light with a comparatively long wavelength which is approaching the visible spectrum is used, preferably UV light in the range from 340 nm to 380 nm, and even more preferably from 360 nm to 380 nm is advantageously used. This way unwanted photodegradation or decomposition of components of the LC medium may be avoided or at least minimized. In case a photoinitiator is used, the irradiation wavelength and the photoinitiator can be suitably matched or adjusted.

In an alternative case where no photoinitiator is used, which in some embodiments is preferable, the wavelength range may be set such that at least some of the polymerisable compounds can undergo a photoreaction and initiate the polymerisation reaction by themselves, while furthermore degradation or decomposition of non-reactive components of the LC medium may be avoided or at least minimized. Obtaining and setting of the desired wavelength range can be achieved by conventional methods known in the art, e.g. by using optical filters, in particular edge filters.

For photopolymerisation the use of UV light is preferred. It is also possible to use UV light together with visible light, in particular violet or blue light. For example, light in the spectral range from 340 nm to 420 nm, preferably from 360 nm to 405 nm may be used. In an alternative embodiment it is also possible to only use visible light, in particular in the range from 380 nm to 415 nm, for example using visible light from a laser source.

It has surprisingly been found that the method according to the invention can be favourably used to produce polymeric structures in situ by providing in the liquid-crystalline medium the one or more polymerisable mesogenic compounds as set forth above and below.

The polymerisable compounds in the medium may be chosen such that after the polymerisation a stable system is obtained, which e.g. can be stable in further processing steps such as thermal heating steps, wherein a good VHR may be maintained.

Furthermore, according to the invention only a relatively small amount of (a) polymerisable mesogenic compound(s) is used which can favourably influence the stability and minimize unwanted degradation.

According to the invention the medium is used to prepare a modulation material which comprises a polymeric component, in particular a polymeric network, wherein the polymeric component is obtained by or respectively obtainable from polymerising the polymerisable compound(s) as set forth above and below.

The provision of the polymeric component may be useful in stabilizing one or more states or phases of the LC medium.

Preferably, in the switching layer of the produced device the polymeric component is contained in the medium in an amount, based on the overall contents of the medium, in the range from 0.1% by weight to 4% by weight, more preferably in the range from 0.5% by weight to 1.5% by weight.

The polymeric component can contribute to the advantageous properties of the obtainable material. For example, the polymeric component may contribute to a significantly more stable scattering state, in particular the polydomain state, such that this scattering state may be maintained for more extended periods of time, in particular up to days, without refreshing or reapplying voltage.

Furthermore, the polymeric component as provided in the material which contains the CLC medium according to the invention can favourably influence the scattering efficiency and appearance, e.g. in terms of uniformity and viewing angle dependence. Thereby colour effects which may arise under oblique viewing angles can be significantly reduced.

By carrying out the method according to the invention, in particular by performing the polymerisation in the presence of an applied DC electric field, it is furthermore possible to obtain a significantly improved low-haze clear state.

In a preferred embodiment the modulation material comprises the liquid-crystalline medium and the polymeric component, where the polymeric component comprises a polymer network which is obtained by polymerisation of reactive mesogens, where the reactive mesogens preferably contain at least one group selected from acrylate groups, particularly preferably from monoacrylate groups, diacrylate groups or triacrylate groups, vinyl ether groups and epoxide groups. Compounds containing acrylate group(s) as used herein comprise acrylic monomers, methacrylic monomers, and mixtures of such monomers.

Polymerisation can be carried out using conventional methods. The polymerisation can be carried out in one or more steps. In particular, polymerisation of the polymerisable compound(s) is preferably achieved by exposure to heat or to actinic radiation, wherein exposure to actinic radiation means irradiation with light, like UV light, visible light or IR light, irradiation with X-rays or gamma rays, or irradiation with high-energy particles, such as ions or electrons. In a preferred embodiment free radical polymerisation is carried out.

Polymerisation can be carried out at a suitable temperature. In an embodiment polymerisation is performed at a temperature below the clearing point of the mesogenic mixture. In an alternative embodiment it is however also possible to carry out the polymerisation at or above the clearing point.

In a preferred embodiment polymerisation is carried out by photopolymerisation, preferably using UV light.

In this case the liquid-crystalline medium provided as a layer and in particular the polymerisable compounds are subjected to photoirradiation, i.e. with light, preferably UV light. For the photopolymerisation of the material in the layer preferably an exposure time from 30 s to 300 min, more preferably from 1 min to 240 min is used, preferably using irradiation intensities in the range from 0.01 mW/cm$^2$ to 100 mW/cm$^2$, more preferably from 0.1 mW/cm$^2$ to 100 mW/cm$^2$, and even more preferably from 0.5 mW/cm$^2$ to 75 mW/cm$^2$. In a particular embodiment preferred time periods for photopolymerisation and in particular preferred UV exposure times are in the range from 1 minute to 120 minutes, more preferably from 5 minutes to 60 minutes and in particular from 10 minutes to 30 minutes, wherein the UV light intensities are preferably in the range from 1 mW/cm$^2$ to 50 mW/cm$^2$.

Photopolymerisation may be carried out at room temperature, but in an alternative embodiment it is preferred to perform photopolymerisation at elevated temperatures.

Therefore, in an embodiment a thermal pre-heating step is carried out before the photopolymerisation to raise the temperature above ambient room temperature. In this case it is preferred to set and maintain a temperature below the clearing point. This way polymerisation can be performed at a higher temperature with the medium however having a nematic or respectively chiral nematic phase.

As a source for actinic radiation, for example a single UV lamp or a set of UV lamps can be used. When using a high lamp power the curing time can be reduced. Another possible source for photoradiation is a laser, like e.g. a UV laser, a visible laser or an IR laser.

In an embodiment, polymerisation is carried out by adding to the chiral liquid crystalline host mixture one or more polymerisable compounds, preferably comprising a di-reactive compound and optionally a suitable photoinitiator, and polymerising the polymerisable compounds by exposure to UV irradiation.

In the method according to the invention the liquid-crystalline medium is interposed as a layer between two opposing transparent substrates, in particular forming a layer in an electro-optical cell, and the polymerisation is carried out in the presence of a DC electric field. This way the cell and the medium and especially the chiral liquid crystalline host mixture can be maintained in a pre-determined state. In particular, it can thus be achieved that polymerisation, preferably polymerisation using UV light, is carried out when the medium is in the homeotropic state.

Typically DC voltages in the range from just above 0 V up to 220 V may be applied, wherein the upper limit is chosen such that electrical breakdown is avoided. It is preferred to carry out polymerisation using a DC voltage in the range from 30 V to 150 V and more preferably from 60 V to 120 V.

The liquid-crystalline medium as provided in the method and as used in the switching element may contain additional compounds such as one or more pleochroic dyes, in particular one or more dichroic dyes, and/or other customary and suitable additives, preferably in an amount from 0.01% by weight to 25% by weight, more preferably from 0.1% by weight to 5% by weight.

Pleochroic dyes preferably are dichroic dyes and can be selected from for example azo dyes, anthraquinones, methine compounds, azomethine compounds, merocyanine compounds, naphthoquinones, tetrazines, pyrromethene dyes, malononitrile dyes, rylenes, in particular perylenes and terylenes, thiadiazole dyes, thienothiadiazole dyes, benzothiadiazoles, pyrromethenes and diketopyrrolopyrroles. Particular preference is given to azo compounds, anthraquinones, benzothiadiazoles, in particular as described in WO 2014/187529, diketopyrrolopyrroles, in particular as described in WO 2015/090497, and rylenes, in particular as described in WO 2014/090373.

However, preferably the switching layer does not comprise any dyes, which can provide higher transmission in the clear state and give an uncoloured or respectively white appearance.

It is particularly preferred that the switching element, more preferably the window including the switching element according to the invention contains only one switching layer.

In an alternative embodiment it is however also possible to provide more than one switching layer, in particular two switching layers, in the window element, for example two layers which both provide switchable scattering modes or one layer providing switchable scattering and another layer providing switchable dimming or attenuation of light.

In a particular embodiment the switching layer according to the invention is combined with another switching layer which comprises a guest-host LC medium in a window element to control and regulate the passage of light. The respective switching layers may be suitably separated by using for example one or more interjacent substrates or sheets, panes or panels, wherein optionally panes may be further separated by a vacuum or a gas filled space.

In a preferred embodiment of the invention the present liquid-crystalline medium contains the one or more compounds of formula I as set forth above and below in an amount, based on the overall contents of the medium, of at least 15% by weight, preferably at least 20% by weight, more preferably at least 25% by weight, even more preferably at least 30% by weight and in particular at least 35% by weight.

In an embodiment the one or more compounds of formula I are contained in the medium in an amount, based on the overall contents of the medium, in the range from 15% by weight to 75% by weight, more preferably from 20% by weight to 65% by weight, even more preferably from 20% by weight to 55% by weight and in particular from 25% by weight to 50% by weight.

The medium according to the invention thus preferably comprises at least one compound of formula I. In many cases it can however be beneficial and preferred that two, three or more compounds of formula I are contained in the medium.

Preferably the group $A^{11}$ as defined in formula I denotes

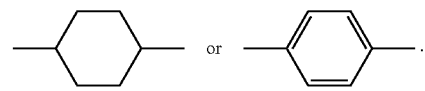

In another embodiment n as defined in formula I denotes 0.

In a preferred embodiment the one or more compounds of formula I are selected from compounds of formulae Ia, Ib and Ic, more preferably from compounds of formulae Ia and Ib

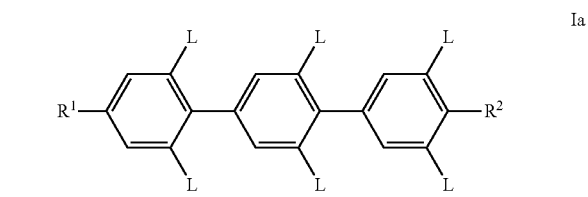

Ia

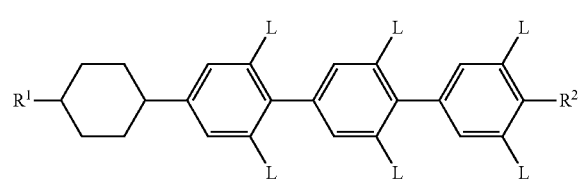

Ib

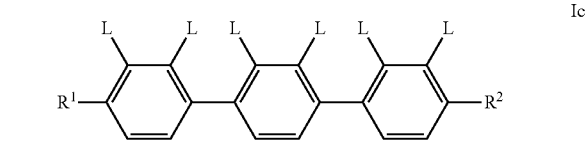

Ic wherein

R$^1$ and R$^2$ denote, independently of one another, a group selected from F, Cl, CF$_3$, OCF$_3$, and straight-chain or branched alkyl or alkoxy having 1 to 15 carbon atoms or straight-chain or branched alkenyl having 2 to 15 carbon atoms which is unsubstituted, monosubstituted by CN or CF$_3$ or mono- or polysubstituted by halogen and wherein one or more CH$_2$ groups may be, in each case independently of one another, replaced by —O—, —S—, —CO—, —COO—, —OCO—, —OCOO— or —C≡C— in such a manner that oxygen atoms are not linked directly to one another, preferably from F, CF$_3$, OCF$_3$, straight-chain alkyl or alkoxy having 1 to 9 carbon atoms or alkenyl having 2 to 9 carbon atoms, and L is on each occurrence, identically or differently, H or halogen selected from F, Cl and Br, preferably from F and Cl, and more preferably is on each occurrence, identically or differently, H or F.

It is particularly preferred that in case the phenylene rings of the compounds of formula I are substituted that the substituent(s) is (are) F, and furthermore that the terminal groups R$^1$ and R$^2$ do not contain Cl.

In a preferred embodiment the amount of Cl-containing compounds included in the medium is limited, preferably is limited to 55% by weight or less, based on the overall contents of the medium, more preferably to 40% by weight or less, and even more preferably to 25% by weight or less. In a particularly preferred embodiment the liquid-crystalline medium contains no Cl-containing compounds.

Accordingly it is also preferred to limit the amount of Cl-containing compounds in the component of the LC medium which consists of the compounds of formula I as set forth above and below, preferably to 55% by weight or less, based on the overall contents of compounds of formula I which are comprised in the medium, more preferably to 40% by weight or less, and even more preferably to 25% by weight or less. In a particularly preferred embodiment the one or more compounds of formula I are selected from compounds which do not contain Cl.

It is furthermore particularly preferred that at least one of the rings A$^{21}$, A$^{31}$ and A$^{41}$ according to formula I has at least one F substituent. It is furthermore particularly preferred that the rings A$^{21}$, A$^{31}$ and A$^{41}$ according to formula I together have at least two F substituents.

In the medium according to the invention the use of compounds containing CN is preferably and favourably limited, preferably to 75% by weight or below, more preferably to 50% by weight or below, even more preferably to 25% by weight or below and in particular to 15% by weight or below, and in a particularly preferred embodiment is completely avoided.

In addition to the one or more compounds of formula I the liquid-crystalline medium according to the invention preferably contains one or more further mesogenic compounds. It is preferred that these additional compounds are also added in view of contributing to or maintaining the favourable properties of the medium, e.g. a good VHR and a favourable stability.

In an embodiment the liquid-crystalline medium according to the invention further comprises one or more compounds of formula II

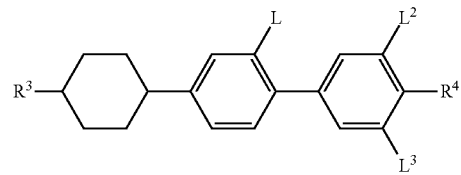

wherein

R$^3$ and R$^4$ denote, independently of one another, a group selected from F, CF$_3$, OCF$_3$, CN, and straight-chain or branched alkyl or alkoxy having 1 to 15 carbon atoms or straight-chain or branched alkenyl having 2 to 15 carbon atoms which is unsubstituted, monosubstituted by CN or CF$_3$ or mono- or polysubstituted by halogen and wherein one or more CH$_2$ groups may be, in each case independently of one another, replaced by —O—, —S—, —CO—, —COO—, —OCO—, —OCOO— or —C≡C— in such a manner that oxygen atoms are not linked directly to one another, preferably from F, CF$_3$, OCF$_3$, CN, straight-chain alkyl or alkoxy having 1 to 9 carbon atoms or alkenyl having 2 to 9 carbon atoms, and L$^1$, L$^2$ and L$^3$ denote, independently of one another, H or F.

In a further embodiment the liquid-crystalline medium according to the invention further comprises one or more compounds of formula III

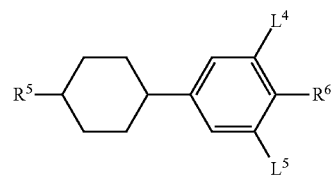

wherein R$^5$ and R$^6$ are defined as R$^3$ and L$^4$ and L$^5$ are defined as L$^1$ for formula II above.

Therefore, it is preferred that the medium contains, based on the overall contents of the medium, at least 15% by weight of one or more mesogenic compounds of formula I, optionally one or more photoinitiators, and one or more mesogenic compounds selected from the group of compounds of formulae II and III.

It is particularly preferred that the medium comprises one or more compounds of formula I, one or more compounds of formula II and one or more compounds of formula III as set forth above.

Preferably the liquid-crystalline medium according to the invention further comprises one or more compounds of formula IV

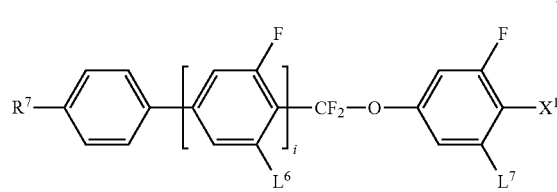

wherein

R$^7$ denotes straight-chain or branched alkyl or alkoxy having 1 to 15 carbon atoms, preferably 1 to 7 carbon atoms, or straight-chain or branched alkenyl having 2 to 15 carbon atoms which is unsubstituted, monosubstituted by CN or CF$_3$ or mono- or polysubstituted by halogen and wherein one or more CH$_2$ groups may be, in each case independently of one another, replaced by —O—, —S—, —CO—, —COO—, —OCO—, —OCOO— or —C≡C— in such a manner that oxygen atoms are not linked directly to one another, i is 0, 1 or 2, L$^6$ and L$^7$ are, independently of one another, H or F, and X$^1$ denotes F, CF$_3$, OCF$_3$ or CN.

Compounds of formula II preferably are used in the medium in a total concentration from 1% by weight to 45% by weight, more preferably from 5% by weight to 25% by weight.

Compounds of formula III preferably are used in the medium in a total concentration from 1% by weight to 45% by weight, more preferably from 5% by weight to 25% by weight.

Compounds of formula IV preferably are used in the medium in a total concentration from 1% by weight to 45% by weight, more preferably from 5% by weight to 25% by weight.

It is particularly preferred that the medium comprises one or more compounds of formula I as set forth above and below, one or more compounds of formula II, one or more compounds of formula III and one or more compounds of formula IV.

In a particularly preferred embodiment one or more of the one or more compounds of formula I are selected from compounds of formulae I-1 and I-2

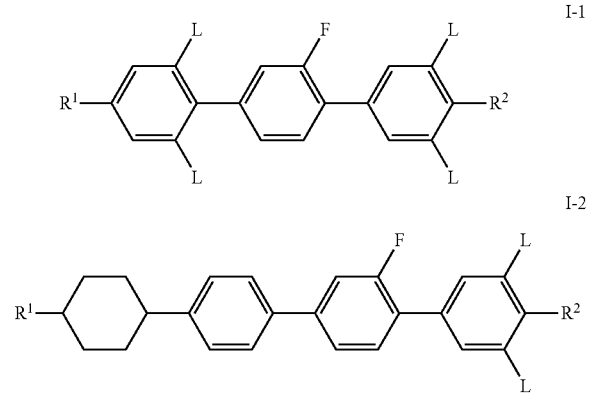

wherein

R$^1$ and R$^2$ are as defined for formula Ia above, and

L is on each occurrence, identically or differently, H or F.

Optionally the media according to the present invention may comprise further liquid crystal compounds in order to adjust the physical properties. Such compounds are known in the field. The concentration of these optionally further included liquid crystal compounds in the media according to the present invention is preferably from 0% by weight to 30% by weight, more preferably from 0.1% by weight to 20% by weight and most preferably from 1% by weight to 15% by weight.

Preferably the medium according to the present invention comprises one or more compounds of PGP-n-m, PGP-n-mV, PGU-n-F, PGIGI-n-F, GGP-n-F, GGP-n-Cl, in particular GGP-5-Cl, CPGP-n-m, CPGP-n-OT, CPGU-n-OT, DPGU-n-F, and/or CPP-n-m, CPG-n-F, CGU-n-F, BCH.n.F.F.F., in particular BCH.7.F.F.F, and/or CP-n-m, CP-n-N, and/or a compound of formula R-5011 or S-5011, and/or one or more reactive polymerisable compounds, and/or one or more polymerisation initiators, wherein the meanings and structures of the respective abbreviations or acronyms are explained and illustrated in the Tables below.

It is particularly preferred that the medium as set forth above and below comprises one or more compounds designated as BCH-7F.F.F and CPU-5-F as well as compounds designated as PCH-n as shown in Table D, in particular selected from PCH-3, PCH-5, PCH-7, PCH-8 and PCH-9.

The liquid-crystalline media according to the present invention may contain further additives in usual concentrations. The total concentration of these further constituents is in the range of 0% to 10%, preferably 0.1% to 6%, based on the total mixture. The concentrations of the individual compounds used each are preferably in the range of 0.01% to 3%. The concentration of these and of similar additives is herein not taken into consideration for the values and ranges of the concentrations of the liquid crystal components and compounds of the liquid crystal media. This also holds for the concentration of dichroic dyes optionally used in the mixtures, which are not counted when the concentrations of the compounds respectively the components of the host mixture are specified. The concentration of the respective additives is always given relative to the final doped mixture.

Herein, unless explicitly stated otherwise, all concentrations are given in weight percent.

The liquid-crystalline media according to the present invention consist of several compounds, preferably of 3 to 30, more preferably of 4 to 20, and most preferably of 4 to 16 compounds. These compounds are mixed in a conventional way. As a rule, the required amount of the compound used in the smaller amount is dissolved in the compound used in the greater amount. In case the temperature is above the clearing point of the compound used in the higher concentration, it is particularly easy to observe completion of the process of dissolution. It is, however, also possible to prepare the media by other conventional ways, e.g. using so called pre-mixtures, which can be e.g. homologous or eutectic mixtures of compounds or using so called multi-bottle systems, the constituents of which are ready to use mixtures themselves.

Many of the mesogenic compounds or mixtures thereof described above and below are commercially available. These compounds are either known or can be prepared by methods which are known per se, as described in the literature (for example in the standard works such as Houben-Weyl, Methoden der Organischen Chemie [Methods of Organic Chemistry], Georg-Thieme-Verlag, Stuttgart), to be precise under reaction conditions which are known and suitable for said reactions. Use may also be made here of variants which are known per se, but are not mentioned here in greater detail. The media according to the invention are prepared in a manner conventional per se. In general, the components are dissolved in one another, preferably at elevated temperature. Suitable additives or substances can be added to modify the dielectric anisotropy, the viscosity and/or the alignment of the liquid-crystalline phases.

The medium may further comprise customary additives such as stabilizers, antioxidants, free radical scavengers, chain transfer agents, e.g. thioethers, and/or plasticizers.

Stabilizers may be useful to further stabilize the modulation material against degradation or oxidation, e.g. due to thermal stress or UV radiation.

The term "alkyl" according to the present invention preferably encompasses straight-chain and branched alkyl groups having 1 to 7 carbon atoms, particularly the straight-chain groups methyl, ethyl, propyl, butyl, pentyl, hexyl and heptyl. Groups having 2 to 5 carbon atoms are generally preferred.

An alkoxy can be straight-chain or branched, and it preferably is straight-chain and has 1, 2, 3, 4, 5, 6 or 7 carbon atoms, and accordingly is preferably methoxy, ethoxy, propoxy, butoxy, pentoxy, hexoxy or heptoxy.

The term "alkenyl" according to the present invention preferably encompasses straight-chain and branched alkenyl groups having 2-7 carbon atoms, in particular the straight-chain groups. Particularly preferred alkenyl groups are $C_2$-$C_7$-1E-alkenyl, $C_4$-$C_7$-3E-alkenyl, $C_5$-$C_7$-4E-alkenyl, $C_6$-$C_7$-5E-alkenyl and $C_7$-6E-alkenyl, in particular $C_2$-$C_7$-1E-alkenyl, $C_4$-$C_7$-3E-alkenyl and $C_5$-$C_7$-4E-alkenyl. Examples of preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl and 6-heptenyl. Groups having up to 5 carbon atoms are generally preferred.

Fluorinated alkyl or alkoxy preferably comprises $CF_3$, $OCF_3$, $CFH_2$, $OCFH_2$, $CF_2H$, $OCF_2H$, $C_2F_5$, $OC_2F_5$, $CFHCF_3$, $CFHCF_2H$, $CFHCFH_2$, $CH_2CF_3$, $CH_2CF_2H$, $CH_2CFH_2$, $CF_2CF_2H$, $CF_2CFH_2$, $OCFHCF_3$, $OCFHCF_2H$, $OCFHCFH_2$, $OCH_2CF_3$, $OCH_2CF_2H$, $OCH_2CFH_2$, $OCF_2CF_2H$, $OCF_2CFH_2$, $C_3F_7$ or $OC_3F_7$, in particular $CF_3$, $OCF_3$, $CF_2H$, $OCF_2H$, $C_2F_5$, $OC_2F_5$, $CFHCF_3$, $CFHCF_2H$, $CFHCFH_2$, $CF_2CF_2H$, $CF_2CFH_2$, $OCFHCF_3$, $OCFHCF_2H$, $OCFHCFH_2$, $OCF_2CF_2H$, $OCF_2CFH_2$, $C_3F_7$ or $OC_3F_7$, particularly preferably $OCF_3$ or $OCF_2H$. Fluoroalkyl in a preferred embodiment encompasses straight-chain groups with terminal fluorine, i.e. fluoromethyl, 2-fluoroethyl, 3-fluoropropyl, 4-fluorobutyl, 5-fluoropentyl, 6-fluorohexyl and 7-fluoroheptyl. Other positions of fluorine are not precluded, however.

Oxaalkyl preferably encompasses straight-chain groups of the formula $C_nH_{2n+1}$—O—$(CH_2)_m$, where n and m are each, independently of one another, from 1 to 6. Preferably, n=1 and m is 1 to 6.

Oxaalkyl is preferably straight-chain 2-oxapropyl (=methoxymethyl), 2-(=ethoxymethyl) or 3-oxabutyl (=2-methoxyethyl), 2-, 3- or 4-oxapentyl, 2-, 3-, 4- or 5-oxahexyl, 2-, 3-, 4-, 5- or 6-oxaheptyl, 2-, 3-, 4-, 5-, 6- or 7-oxaoctyl, 2-, 3-, 4-, 5-, 6-, 7- or 8-oxanonyl, or 2-, 3-, 4-, 5-, 6-, 7-, 8- or 9-oxadecyl.

Halogen is preferably F or Cl, in particular F.

If one of the above mentioned groups is an alkyl group in which one $CH_2$ group has been replaced by —CH=CH—, this can be straight-chain or branched. It is preferably straight-chain and has 2 to 10 carbon atoms.

Accordingly, it is in particular vinyl, prop-1- or prop-2-enyl, but-1-, -2- or but-3-enyl, pent-1-, -2-, -3- or pent-4-enyl, hex-1-, -2-, -3-, -4- or hex-5-enyl, hept-1-, -2-, -3-, -4-, -5- or hept-6-enyl, oct-1-, -2-, -3-, -4-, -5-, -6- or oct-7-enyl, non-1-, -2-, -3-, -4-, -5-, -6-, -7- or non-8-enyl, dec-1-, -2-, -3-, -4-, -5-, -6-, -7-, -8- or dec-9-enyl.

If one of the above mentioned groups is an alkyl group in which one $CH_2$ group has been replaced by —O— and one has been replaced by —CO—, these are preferably adjacent. These thus contain an acyloxy group —CO—O— or an oxycarbonyl group —O—CO—. These are preferably straight-chain and have 2 to 6 carbon atoms.

They are accordingly in particular acetyloxy, propionyloxy, butyryloxy, pentanoyloxy, hexanoyloxy, acetyloxymethyl, propionyloxymethyl, butyryloxymethyl, pentanoyloxymethyl, 2-acetyloxyethyl, 2-propionyloxy-ethyl, 2-butyryloxyethyl, 3-acetyloxypropyl, 3-propionyloxypropyl, 4-acetyloxybutyl, methoxycarbonyl, ethoxycarbonyl, propoxycarbonyl, butoxycarbonyl, pentoxycarbonyl, methoxycarbonylmethyl, ethoxycarbonyl-methyl, propoxycarbonylmethyl, butoxycarbonylmethyl, 2-(meth-oxycarbonyl)ethyl, 2-(ethoxycarbonyl)ethyl, 2-(propoxycarbonyl)ethyl, 3-(methoxycarbonyl)propyl, 3-(ethoxycarbonyl)propyl or 4-(methoxy-carbonyl)butyl.

If one of the above mentioned groups is an alkyl group in which one $CH_2$ group has been replaced by unsubstituted or substituted —CH=CH— and an adjacent $CH_2$ group has been replaced by CO, CO—O or O—CO, this can be straight-chain or branched. It is preferably straight-chain and has 4 to 13 carbon atoms. Accordingly, it is in particular acryloyloxymethyl, 2-acryloyloxyethyl, 3-acryloyloxypropyl, 4-acryloyloxybutyl, 5-acryloyloxypentyl, 6-acryloyloxyhexyl, 7-acryloyloxyheptyl, 8-acryloyloxy-octyl, 9-acryloyloxynonyl, 10-acryloyloxydecyl, methacryloyloxymethyl, 2-methacryloyloxyethyl, 3-methacryloyloxypropyl, 4-methacryloyloxybutyl, 5-methacryloyloxypentyl, 6-methacryloyloxyhexyl, 7-methacryloyloxyheptyl, 8-methacryloyloxyoctyl or 9-methacryloyloxynonyl.

If one of the above mentioned groups is an alkyl or alkenyl group which is monosubstituted by CN or $CF_3$, this group is preferably straight-chain. The substitution by CN or $CF_3$ is in any position.

If one of the above mentioned groups is an alkyl or alkenyl group which is at least monosubstituted by halogen, this group is preferably straight-chain and halogen is preferably F or Cl, more preferably F. In the case of polysubstitution, halogen is preferably F. The resulting groups also include perfluorinated groups. In the case of monosubstitution, the fluoro or chloro substituent can be in any desired position, but is preferably in the ω-position.

Compounds containing branched groups may occasionally be of importance owing to better solubility in some conventional liquid-crystalline base materials. However, they are particularly suitable as chiral dopants if they are optically active.

Branched groups of this type generally contain not more than one chain branch. Preferred branched groups are isopropyl, 2-butyl (=1-methylpropyl), isobutyl (=2-methylpropyl), 2-methylbutyl, isopentyl (=3-methylbutyl), 2-methylpentyl, 3-methylpentyl, 2-ethylhexyl, 2-propylpentyl, isopropoxy, 2-methylpropoxy, 2-methylbutoxy, 3-methylbutoxy, 2-methylpentoxy, 3-methylpentoxy, 2-ethylhexoxy, 1-methylhexoxy or 1-methylheptoxy.

If one of the above mentioned groups is an alkyl group in which two or more $CH_2$ groups have been replaced by —O— and/or —CO—O—, this can be straight-chain or branched. It is preferably branched and has 3 to 12 carbon atoms. Accordingly, it is in particular biscarboxymethyl, 2,2-biscarboxyethyl, 3,3-biscarboxypropyl, 4,4-biscarboxybutyl, 5,5-biscarboxypentyl, 6,6-biscarboxyhexyl, 7,7-biscarboxyheptyl, 8,8-biscarboxyoctyl, 9,9-bis-carboxynonyl, 10,10-biscarboxydecyl, bis(methoxycarbonyl)methyl, 2,2-bis-(methoxycarbonyl)ethyl, 3,3-bis(methoxycarbonyl)propyl, 4,4-bis(methoxy-carbonyl)butyl, 5,5-bis(methoxycarbonyl)pentyl, 6,6-bis(methoxycarbonyl)-hexyl, 7,7-bis (methoxycarbonyl)heptyl, 8,8-bis(methoxycarbonyl)octyl, bis-(ethoxycarbonyl)methyl, 2,2-bis(ethoxycarbonyl)ethyl, 3,3-bis(ethoxy-carbonyl)propyl, 4,4-bis(ethoxycarbonyl)butyl or 5,5-bis(ethoxycarbonyl)-pentyl.

In the method according to the invention the liquid-crystalline medium is provided as a layer and in the prepared switching element the medium is contained in the resultant switching layer.

The layer as provided in the method and the switching layer as used in the switching element according to the invention preferably have a thickness in the range from 1 µm to 100 µm, more preferably from 2 µm to 50 µm, even more preferably from 4 µm to 40 µm and in particular from 10 µm to 25 µm.

To maintain a proper thickness of the switching layer, spacers may be included within the cell gap of the switching layer. Typically, the spacers have a spherical shape with a diameter in the range of the cell gap. For example, non-conductive spacers having a spherical shape with a predetermined diameter made of polymer or glass may be used. In some embodiments it may be useful to provide sticky spacers, i.e. spacers which have some intrinsic adhesive characteristic to better adhere to the surface. It may also be useful to use black spacers, e.g. to avoid or minimize undesired light leakage. It can be especially beneficial to use spacers which are black and sticky. Alternatively, the cell thickness may be set or maintained by other suitable means, e.g. by using column spacers. The column spacers may also be formed to give compartments, thus optionally allowing for free-cuttable structures.

It is also possible to provide two or more layers in combination, for example in a window element, where the layers are separated by substrates or suitable sheets, panes or panels.

According to the invention a switching element and in particular a window element comprising the switching layer is provided, wherein the switching layer is arranged between two substrates, in particular two transparent substrates.

The substrates may comprise, preferably consist of, glass or a polymer, in particular glass, polyethylene terephthalate (PET), polyethylene naphthalate (PEN), polyvinylbutyral (PVB), polymethyl methacrylate (PMMA), polycarbonate (PC), polyimide (PI), COP (cyclic olefin polymers) or TAC (triacetylcellulose).

In a particularly preferred embodiment glass substrates are used.

The switching element can influence the passage of light, in particular by electrically switching the switching layer between an optically transparent or clear state and a scattering state.

The finally assembled switching device or the window in which the switching element can be integrated preferably comprises one or more layers which block UV light. In particular, the switching device or respectively the window preferably comprises one or more layers which do not allow, or only do so to a very small proportion, the passage of light having a wavelength of less than 350 nm, preferably extending to less than 360 nm, particularly preferably even extending to less than 380 nm.

The switching element and in particular the window element can be useful in several window applications, e.g. for providing privacy or anti-glare. The window element may for example be arranged as a switchable glazing unit. Preferably, the switching element may be incorporated in an insulated glazing unit.

Advantageously the switching element can be produced by the facile and efficient process described herein.

In the preparation method the liquid-crystalline medium which comprises the one or more polymerisable mesogenic compounds is provided as a layer between two opposing transparent substrates which are each provided with an electrode. In this respect, for example vacuum filling or one drop filling may be used.

Preferably the electrodes are arranged as conductive layers above the inner surface of each substrate, wherein more preferably the conductive layers are respectively arranged on a passivation layer, even more preferably arranged between passivation layers, and wherein optionally alignment layers are further provided which are in direct contact with the liquid-crystalline medium.

Subsequently the one or more polymerisable mesogenic compounds are polymerised, wherein the polymerisation is carried out in the presence of an applied electric field in the layer and wherein this electric field is generated using a DC electric voltage.

It is preferred that polymerising is carried out by photopolymerisation, preferably using UV light.

During the polymerisation a DC electric field is applied to induce an alignment of the medium, preferably a homeotropic alignment. The electric field is applied at least temporarily, preferably for a majority of the time and in particular over the whole time that the polymerisation is taking place.

The application of the DC voltage is useful set a predetermined orientation during polymerisation and it can favourably influence the product properties of the switching layer and the switching element. For example, inducing a homeotropic alignment during polymerisation by the DC electric field can contribute to achieving a homogeneous low haze clear state, while furthermore a homogeneous and suitably strong haze can be obtained in the scattering state.

It is possible to control the temperature during photopolymerisation, for example in a range from 20° C. to 100° C., preferably below the clearing point.

In a preferred embodiment the reactive mesogens are self-starting, while in another embodiment a photoinitiator is used to trigger the polymerisation.

For the photopolymerisation of the material in the switching layer preferably an exposure time from 30 s to 240 min, more preferably from 1 min to 120 min is used, preferably using irradiation intensities in the range from 0.01 mW/cm$^2$ to 100 mW/cm$^2$, more preferably from 0.1 mW/cm$^2$ to 50 mW/cm$^2$, even more preferably from 1 mW/cm$^2$ to 50 mW/cm$^2$ and in particular from 2 mW/cm$^2$ to 20 mW/cm$^2$.

For the polymerisation several parameters may be suitably set or varied, e.g. the irradiation dose, the magnitude of the applied DC voltage and respectively the electric field strength, and the amount of chiral dopant in the medium.

Following the polymerisation, in particular the photopolymerisation step, further treatments may be carried out. Preferably, a thermal treatment is carried out after the polymerisation step, preferably in the presence of an electric field, more preferably in the presence of a DC electric field.

In principle, the subsequent thermal treatment may be carried out either in the presence or absence of an electric field. However, it has been found that further improvements in the product, especially with respect to achieving a superior low-haze clear state, can be obtained when also during the thermal treatment an electric field and in particular a DC electric field is applied.

The thermal treatment, i.e. an exposure to an increased temperature relative to the previous polymerisation step may lead to further curing or further conversion rate or completion of the polymerisation. This can be beneficial in terms of the product performance and stability, in particular in that in the product the amount of residual unreacted monomer is minimized.

The optional thermal treatment step following polymerisation is preferably performed for a period of time in the range from 5 minutes to 240 minutes, more preferably from 10 minutes to 120 minutes and in particular from 20 minutes to 60 minutes. The thermal treatment preferably uses a temperature in the range from 85° C. to 200° C., more preferably from 110° C. to 190° C. and in particular from 140° C. to 180° C.

In a particularly preferred embodiment the DC electric field is applied and maintained substantially over the whole process time, in particular over the whole process time, spanning the optional pre-heating before polymerisation, the polymerisation and the optional thermal treatment step after polymerisation.

It is also possible to perform pre-treatment steps on the substrates used, for example surface treatment methods such as a UV-ozone treatment or a plasma treatment, which can improve alignment and wetting behaviour over larger areas and contribute to an improved homogeneity as well as a favourable reduction of unwanted haze in the clear state.

The method described herein is advantageously useful to produce a switching element with favourable durability, colour neutrality, a low haze clear state, i.e. a superior clear state, and a scattering state giving good privacy, even in the case where only a single switching layer is used in the device.

In the present invention and especially in the following Examples, the structures of the mesogenic compounds are indicated by means of abbreviations, also called acronyms. In these acronyms, the chemical formulae are abbreviated as follows using Tables A to C below. All groups $C_nH_{2n+1}$, $C_mH_{2m+1}$ and $C_lH_{2l+1}$ or $C_nH_{2n-1}$, $C_mH_{2m-1}$ and $C_lH_{2l-1}$ denote straight-chain alkyl or alkenyl, preferably 1-E-alkenyl, each having n, m and l C atoms respectively. Table A lists the codes used for the ring elements of the core structures of the compounds, while Table B shows the linking groups. Table C gives the meanings of the codes for the left-hand or right-hand end groups. The acronyms are composed of the codes for the ring elements with optional linking groups, followed by a first hyphen and the codes for the left-hand end group, and a second hyphen and the codes for the right-hand end group. Table D shows illustrative structures of compounds together with their respective abbreviations.

TABLE A

Ring elements

| Code | Structure | Code | Structure |
|------|-----------|------|-----------|
| C | (cyclohexane ring) | | |
| P | (phenyl ring) | | |
| D | (1,3-dioxane ring) | DI | (1,3-dioxane ring, inverted) |
| A | (tetrahydropyran ring) | AI | (tetrahydropyran ring, inverted) |
| G | (fluorophenyl ring) | GI | (fluorophenyl ring, inverted) |
| U | (difluorophenyl ring) | UI | (difluorophenyl ring, inverted) |
| Y | (difluorophenyl ring) | | |
| M | (pyrimidine ring) | MI | (pyrimidine ring, inverted) |

TABLE A-continued

Ring elements

| Code | Structure | Code | Structure |
|---|---|---|---|
| N | pyridine (2,5-linked) | NI | pyridine (2,5-linked, reversed) |
| Np | naphthalene (2,6-linked) | dH | decahydronaphthalene (2,6-linked) |
| N3f | trifluoronaphthalene | N3fI | trifluoronaphthalene (reversed) |
| tH | tetrahydronaphthalene | tHI | tetrahydronaphthalene (reversed) |
| tH2f | difluoro-tetrahydronaphthalene | tH2fI | difluoro-tetrahydronaphthalene (reversed) |
| K | trifluoroindane | KI | trifluoroindane (reversed) |
| L | cyclohexene | LI | cyclohexene (reversed) |
| F | fluoro-cyclohexene | FI | fluoro-cyclohexene (reversed) |
| Nf | fluoropyridine | NfI | fluoropyridine (reversed) |

TABLE B

Linking groups

| | | | |
|---|---|---|---|
| E | —CH$_2$CH$_2$— | Z | —CO—O— |
| V | —CH=CH— | ZI | —O—CO— |
| X | —CF=CH— | O | —CH$_2$—O— |
| XI | —CH=CF— | OI | —O—CH$_2$— |
| B | —CF=CF— | Q | —CF$_2$—O— |
| T | —C≡C— | QI | —O—CF$_2$— |
| W | —CF$_2$CF$_2$— | | |

TABLE C

End groups

| Left-hand side | | Right-hand side | |
|---|---|---|---|
| Used alone | | | |
| —n— | C$_n$H$_{2n+1}$— | —n | —C$_n$H$_{2n+1}$ |
| —nO— | C$_n$H$_{2n+1}$—O— | —On | —O—C$_n$H$_{2n+1}$ |
| —V— | CH$_2$=CH— | —V | —CH=CH$_2$ |
| —nV— | C$_n$H$_{2n+1}$—CH=CH— | —nV | —C$_n$H$_{2n}$—CH=CH$_2$ |

TABLE C-continued

End groups

| Left-hand side | | Right-hand side | |
|---|---|---|---|
| —Vn— | $CH_2$=CH—$C_nH_{2n+1}$— | —Vn | —CH=CH—$C_nH_{2n+1}$ |
| —nVm— | $C_nH_{2n+1}$—CH=CH—$C_mH_{2m}$— | —nVm | —$C_nH_{2n}$—CH=CH—$C_mH_{2m+1}$ |
| —N— | N≡C— | —N | —C≡N |
| —S— | S=C=N— | —S | —N=C=S |
| —F— | F— | —F | —F |
| —CI— | CI— | —CI | —CI |
| —M— | $CFH_2$— | —M | —$CFH_2$ |
| —D— | $CF_2H$— | —D | —$CF_2H$ |
| —T— | $CF_3$— | —T | —$CF_3$ |
| —MO— | $CFH_2O$— | —OM | —$OCFH_2$ |
| —DO— | $CF_2HO$— | —OD | —$OCF_2H$ |
| —TO— | $CF_3O$— | —OT | —$OCF_3$ |
| —FXO— | $CF_2$=CH—O— | —OXF | —O—CH=$CF_2$ |
| —A— | H—C≡C— | —A | —C≡C—H |
| —nA— | $C_nH_{2n+1}$—C≡C— | —An | —C≡C—$C_nH_{2n+1}$ |
| —NA— | N≡C—C≡C— | —AN | —C≡C—C≡N |

Used together with one another and with others

| | | | |
|---|---|---|---|
| —...A...— | —C≡C— | —...A... | —C≡C— |
| —...V...— | CH=CH— | —...V... | —CH=CH— |
| —...Z...— | —CO—O— | —...Z... | —CO—O— |
| —...ZI...— | —O—CO— | —...ZI... | —O—CO— |
| —...K...— | —CO— | —...K... | —CO— |
| —...W...— | —CF=CF— | —...W... | —CF=CF— | wherein n and m each denote integers, and the three dots " . . . " are place-holders for other abbreviations from this table.

The following table shows illustrative structures together with their respective abbreviations. These are shown in order to illustrate the meaning of the rules for the abbreviations. They furthermore represent compounds which may be preferably used.

TABLE D

Illustrative structures $C_nH_{2n+1}$—[Cy]—[Cy]—$C_mH_{2m+1}$

CC-n-m $C_nH_{2n+1}$—[Cy]—[Cy]—O—$C_mH_{2m+1}$

CC-n-Om $C_nH_{2n+1}$—[Cy]—[Cy]—CH=$CH_2$

CC-n-V $C_nH_{2n+1}$—[Cy]—[Cy]—CH=CH—$C_mH_{2m+1}$

CC-n-Vm $C_nH_{2n+1}$—[Cy]—[Cy]—$(CH_2)_m$—CH=$CH_2$

CC-n-mV

TABLE D-continued

Illustrative structures $C_nH_{2n+1}$—[Cy]—[Cy]—$(CH_2)_m$CH=CH—$C_lH_{2l+1}$ CC-n-mVl $C_nH_{2n+1}$—[Cy]—[Ph]—$C_mH_{2m+1}$ CP-n-m $C_nH_{2n+1}O$—[Cy]—[Ph]—$C_mH_{2m+1}$ CP-nO-m $CH_2$=CH—[Cy]—[Ph]—$C_mH_{2m+1}$ CP-V-m $CH_2$=CH—$(CH_2)_n$—[Cy]—[Ph]—$C_mH_{2m+1}$ CP-Vn-m $C_nH_{2n+1}$—[Ph]—[Ph]—$C_mH_{2m+1}$ PP-n-m $C_nH_{2n+1}O$—[Ph]—[Ph]—$C_mH_{2m+1}$ PP-nO-m $C_nH_{2n+1}$—[Ph]—[Ph]—$OC_mH_{2m+1}$ PP-n-Om $C_nH_{2n+1}$—[Ph]—[Ph]—CH=$CH_2$ PP-n-V $C_nH_{2n+1}$—[Ph]—[Ph]—CH=CH—$C_mH_{2m+1}$ PP-n-Vm $C_nH_{2n+1}$—[Ph]—[Ph]—$(C_mH_{2m})$—CH=$CH_2$ PP-n-mV TABLE D-continued Illustrative structures $C_nH_{2n+1}$—[Cy]—[Cy]—[Ph]—$C_mH_{2m+1}$
CCP-n-m $C_nH_{2n+1}O$—[Cy]—[Cy]—[Ph]—$C_mH_{2m+1}$
CCP-nO-m $C_nH_{2n+1}$—[Cy]—[Cy]—[Ph]—$OC_mH_{2m+1}$
CCP-n-Om $C_nH_{2n+1}$—[Cy]—[Cy]—[Ph]—$CH=CH_2$
CCP-n-V $C_nH_{2n+1}$—[Cy]—[Cy]—[Ph]—$CH=CH-C_mH_{2m+1}$
CCP-n-Vm $C_nH_{2n+1}$—[Cy]—[Cy]—[Ph]—$(C_mH_{2m})-CH=CH_2$
CCP-n-mV $C_nH_{2n+1}$—[Cy]—[Ph]—[Ph]—$C_mH_{2m+1}$
CPP-n-m $C_nH_{2n+1}$—[Cy]—[Ph]—[Ph(F)]—$C_mH_{2m+1}$
CPG-n-m $C_nH_{2n+1}$—[Cy]—[Ph(F)]—[Ph]—$C_mH_{2m+1}$
CGP-n-m $C_nH_{2n+1}O$—[Cy]—[Ph]—[Ph]—$C_mH_{2m+1}$
CPP-nO-m $C_nH_{2n+1}$—[Cy]—[Ph]—[Ph]—$OC_mH_{2m+1}$
CPP-n-Om $H_2C=CH$—[Cy]—[Ph]—[Ph]—$C_mH_{2m+1}$
CPP-V-m $C_nH_{2n+1}$—$CH=CH$—[Cy]—[Ph]—[Ph]—$C_mH_{2m+1}$
CPP-nV-m $CH_2=CH-(C_nH_{2n})$—[Cy]—[Ph]—[Ph]—$C_mH_{2m+1}$
CPP-Vn-m $C_nH_{2n+1}$—[Ph]—[Ph(F)]—[Ph]—$C_mH_{2m+1}$
PGP-n-m $C_nH_{2n+1}$—[Ph]—[Ph(F)]—[Ph]—$CH=CH_2$
PGP-n-V $C_nH_{2n+1}$—[Ph]—[Ph(F)]—[Ph]—$CH=CH-C_mH_{2m+1}$
PGP-n-Vm $C_nH_{2n+1}$—[Ph]—[Ph(F)]—[Ph]—$(CH_2)_m-CH=CH_2$
PGP-n-mV $C_nH_{2n+1}$—[Ph]—[Ph(F)]—[Ph]—$(CH_2)_m-CH=CH-C_lH_{2l+1}$
PGP-n-mVl $C_nH_{2n+1}$—[Cy]—[Cy]—$CH_2-CH_2$—[Cy]—$O-C_mH_{2m+1}$
CCEC-n-Om $C_nH_{2n+1}$—[Cy]—[Ph]—[Ph]—[Cy]—$C_mH_{2m+1}$
CPPC-n-m $C_nH_{2n+1}$—[Cy]—[Ph(F)]—[Ph]—[Cy]—$C_mH_{2m+1}$
CGPC-n-m TABLE D-continued
| Illustrative structures | | Illustrative structures |
|---|---|---|
|  CCPC-n-m | |  CCG-n-OT |
|  CCZPC-n-m | |  CCP-n-T |
| 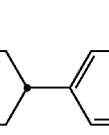 CPGP-n-m | | 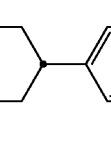 CCG-n-F |
|  CPGP-n-mV | |  CCG-V-F |
|  CPGP-n-mVI | |  CCU-n-F |
| 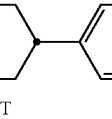 PGIGP-n-m | | 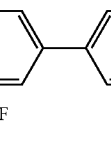 CPG-n-F |
|  CP-n-F | | |
|  CP-n-Cl | | |
| 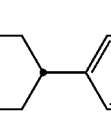 GP-n-F | |  CPU-n-F |
|  GP-n-Cl | |  CGU-n-F |
|  CCP-n-OT | | |

TABLE D-continued
Illustrative structures
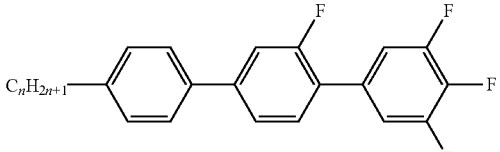
PGU-n-F
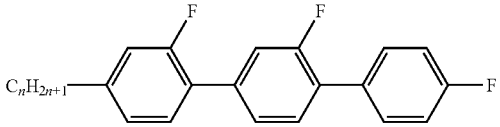
GGP-n-F
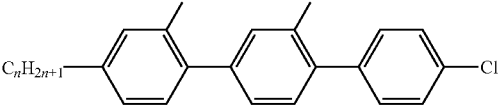
GGP-n-Cl
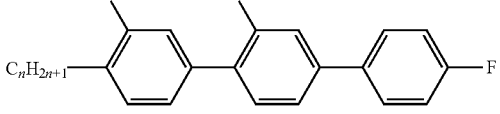
PGIGI-n-F
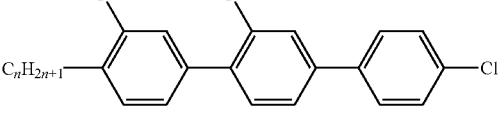
PGIGI-n-Cl
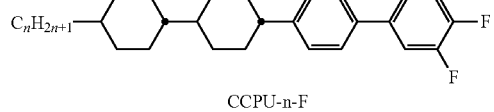
CCPU-n-F
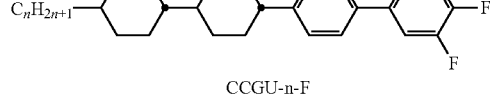
CCGU-n-F
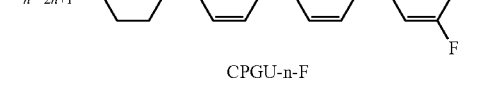
CPGU-n-F
TABLE D-continued
Illustrative structures
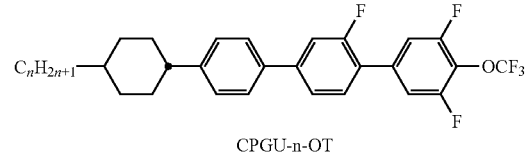
CPGU-n-OT
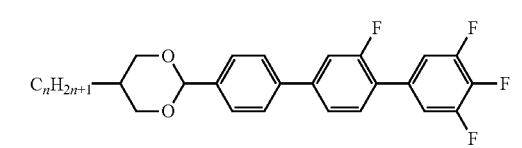
DPGU-n-F
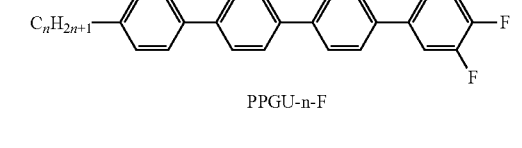
PPGU-n-F
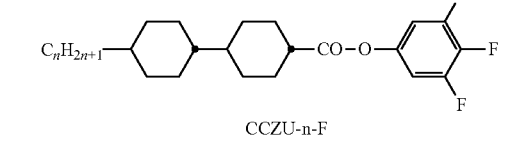
CCZU-n-F
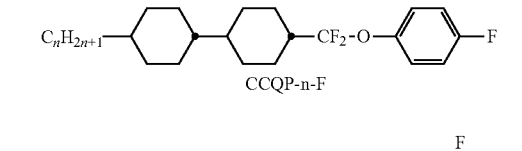
CCQP-n-F
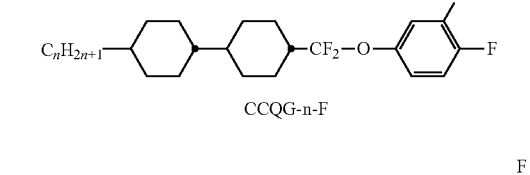
CCQG-n-F
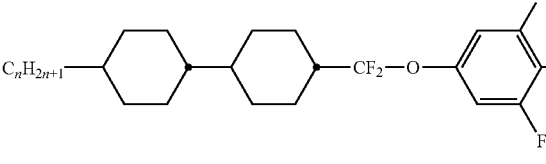
CCQU-n-F
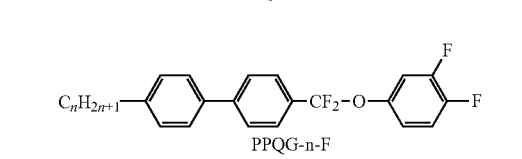
PPQG-n-F
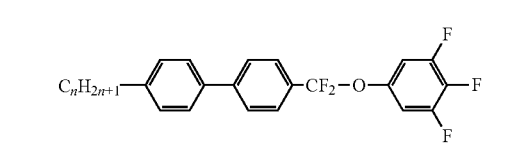
PPQU-n-F TABLE D-continued Illustrative structures PGQU-n-F GGQU-n-F PUQU-n-F MUQU-n-F NUQU-n-F CPUQU-n-F CGUQU-n-F PGPQP-n-F PGPQG-n-F PGPQU-n-F TABLE D-continued Illustrative structures PGUQU-n-F APUQU-n-F DGUQU-n-F CY-n-Om CY-V-Om CVC-n-m CEY-V-m CCP-V-m CCY-n-m TABLE D-continued
Illustrative structures
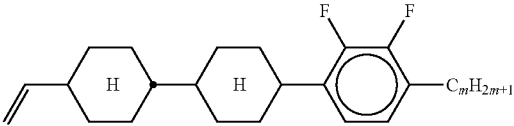
CCY-V-m
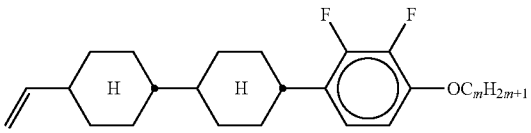
CCY-V-Om
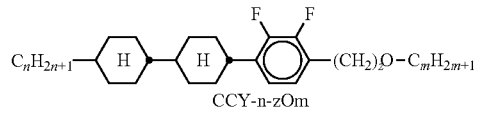
CCY-n-zOm
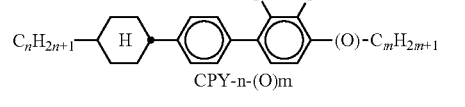
CPY-n-(O)m
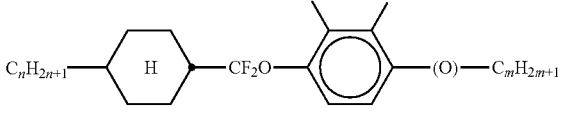
CQY-n-(O)m
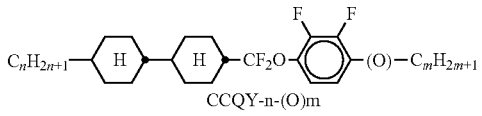
CCQY-n-(O)m
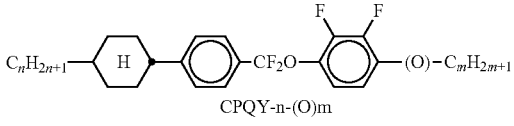
CPQY-n-(O)m
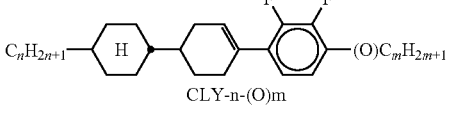
CLY-n-(O)m
LYLI-n-m
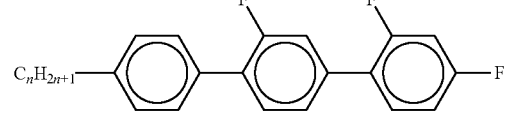
PGIGI-n-F
TABLE D-continued
Illustrative structures
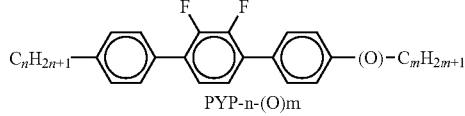
PYP-n-(O)m
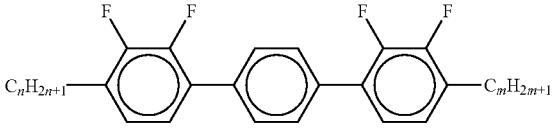
YPY-n-m
BCH-nm
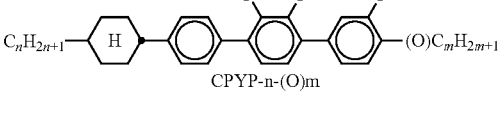
CPYP-n-(O)m
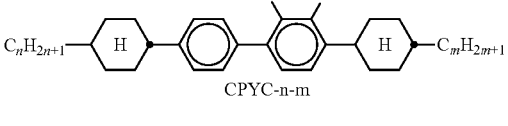
CPYC-n-m
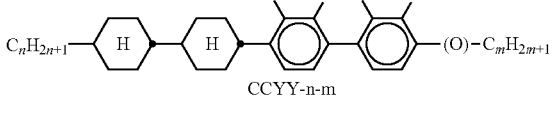
CCYY-n-m
CBC-nm
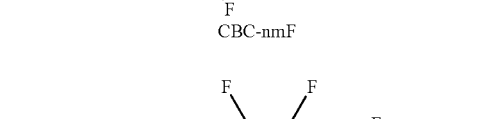
CBC-nmF
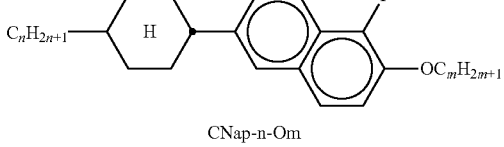
CNap-n-Om
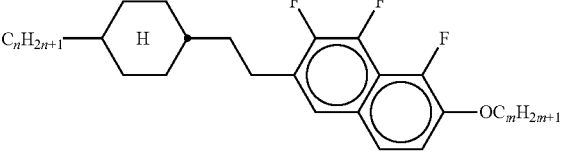
CENap-n-Om

TABLE D-continued

Illustrative structures

CETNap-n-Om

DFDBC-n(O)-(O)m

PPTUI-n-m

PTP-nOm

PCH-n

PCH-nOm

BCH-nF.F.F

BCH-7F.F.F

BCH-nF.F wherein n, m and l preferably, independently of one another, denote 1 to 9, more preferably 1 to 7.

The following table shows illustrative compounds which can be used as stabilizers in the media according to the present invention.

TABLE E

Table E shows possible stabilizers which can be added to the LC media according to the invention, wherein n denotes an integer from 1 to 12, preferably 1, 2, 3, 4, 5, 6, 7 or 8, terminal methyl groups are not shown.

TABLE E-continued

Table E shows possible stabilizers which can be added to the LC media according to the invention, wherein n denotes an integer from 1 to 12, preferably 1, 2, 3, 4, 5, 6, 7 or 8, terminal methyl groups are not shown.

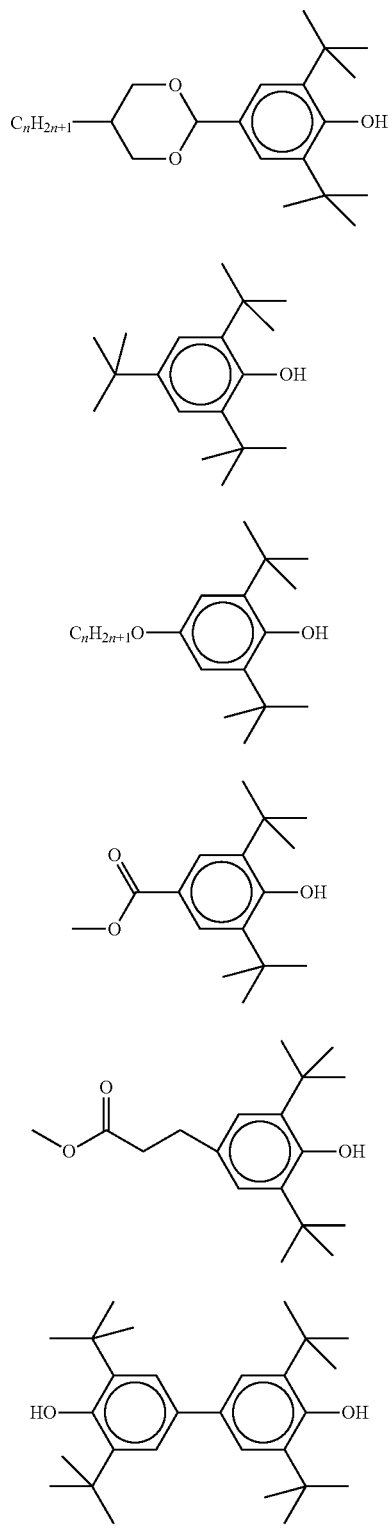

TABLE E-continued

Table E shows possible stabilizers which can be added to the LC media according to the invention, wherein n denotes an integer from 1 to 12, preferably 1, 2, 3, 4, 5, 6, 7 or 8, terminal methyl groups are not shown.

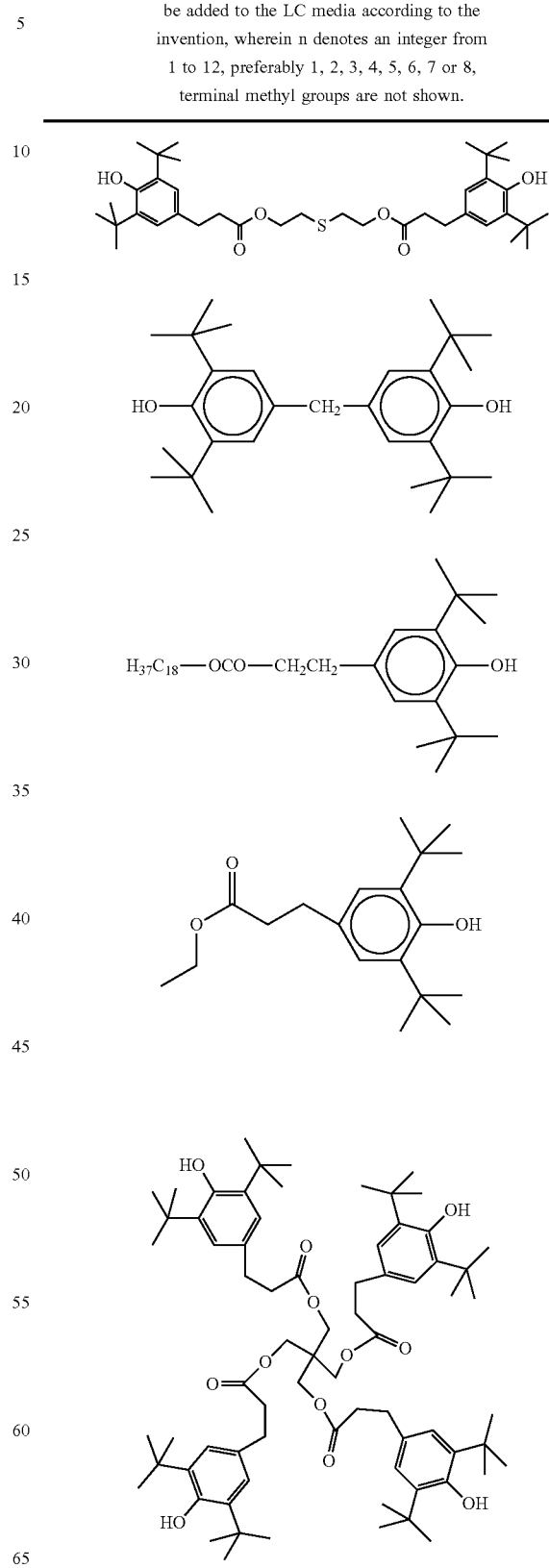

TABLE E-continued
Table E shows possible stabilizers which can be added to the LC media according to the invention, wherein n denotes an integer from 1 to 12, preferably 1, 2, 3, 4, 5, 6, 7 or 8, terminal methyl groups are not shown.
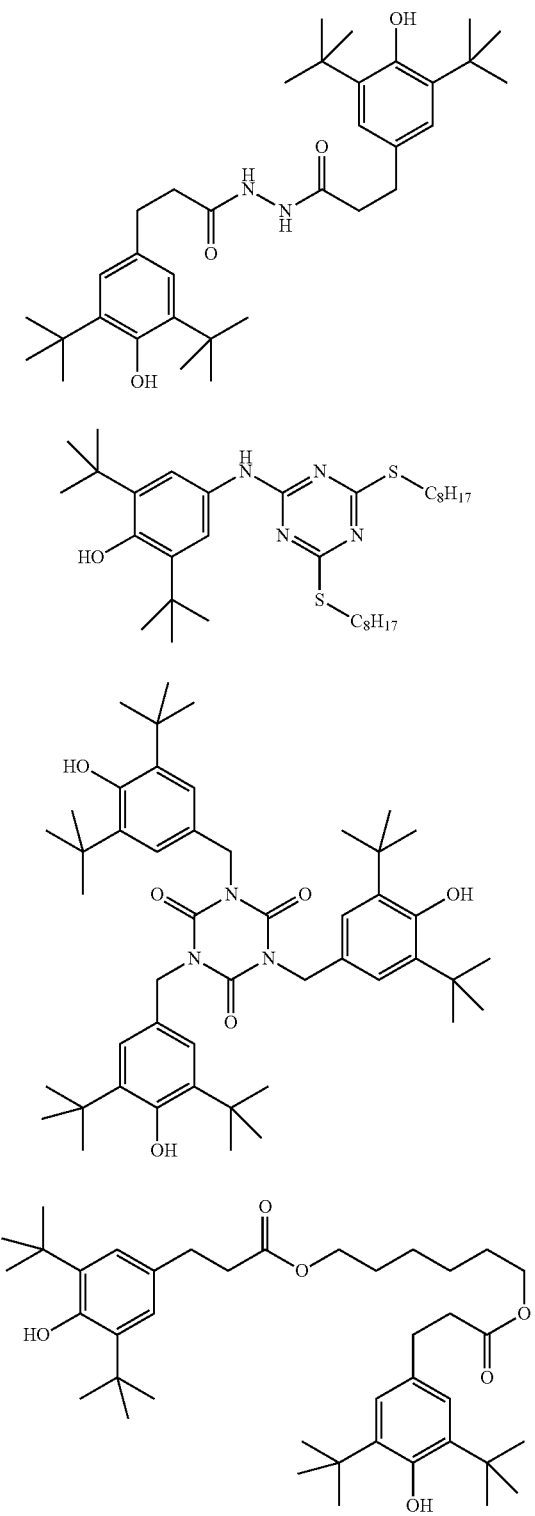
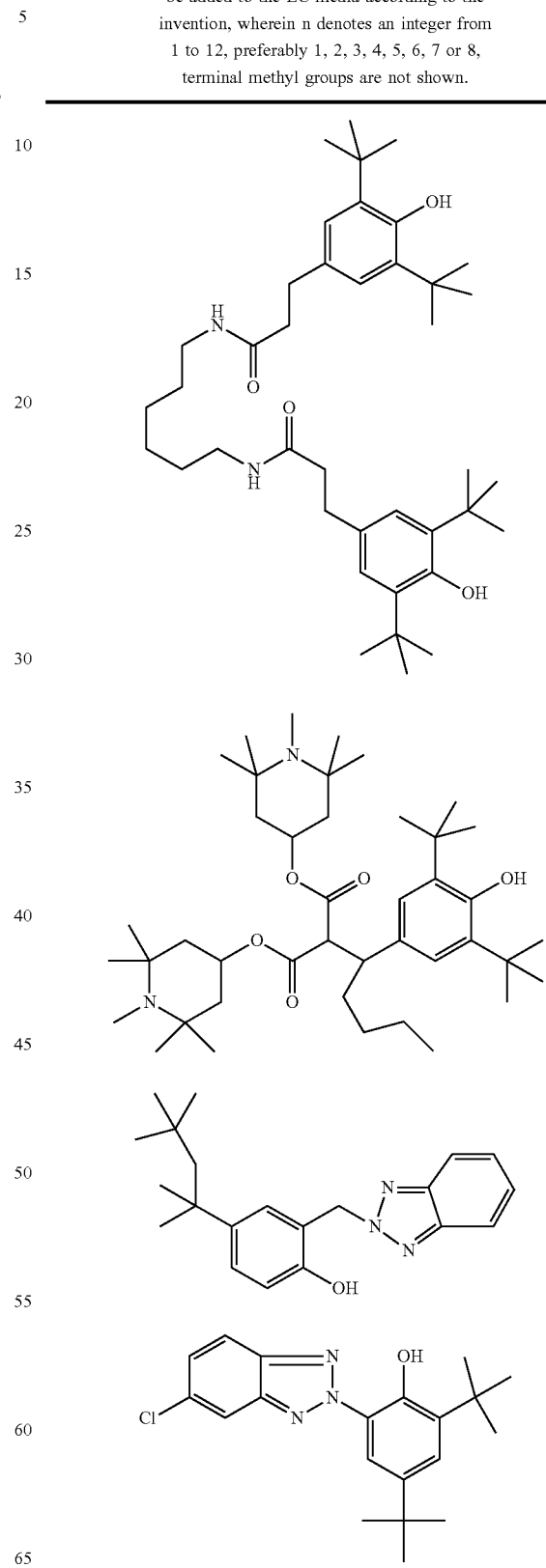

TABLE E-continued

Table E shows possible stabilizers which can be added to the LC media according to the invention, wherein n denotes an integer from 1 to 12, preferably 1, 2, 3, 4, 5, 6, 7 or 8, terminal methyl groups are not shown.

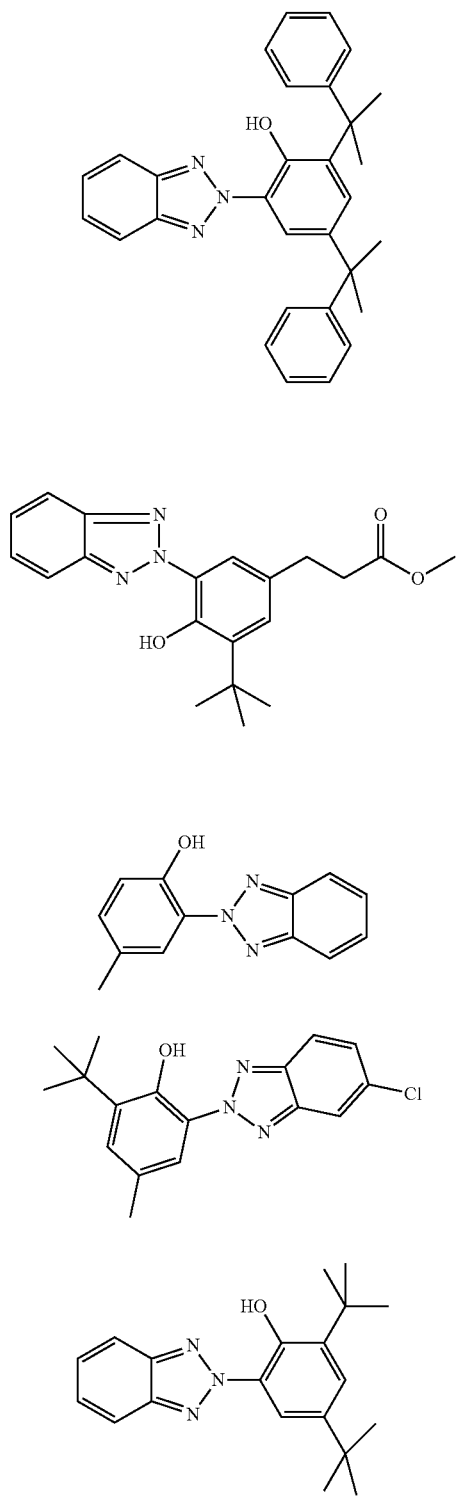

TABLE E-continued

Table E shows possible stabilizers which can be added to the LC media according to the invention, wherein n denotes an integer from 1 to 12, preferably 1, 2, 3, 4, 5, 6, 7 or 8, terminal methyl groups are not shown.

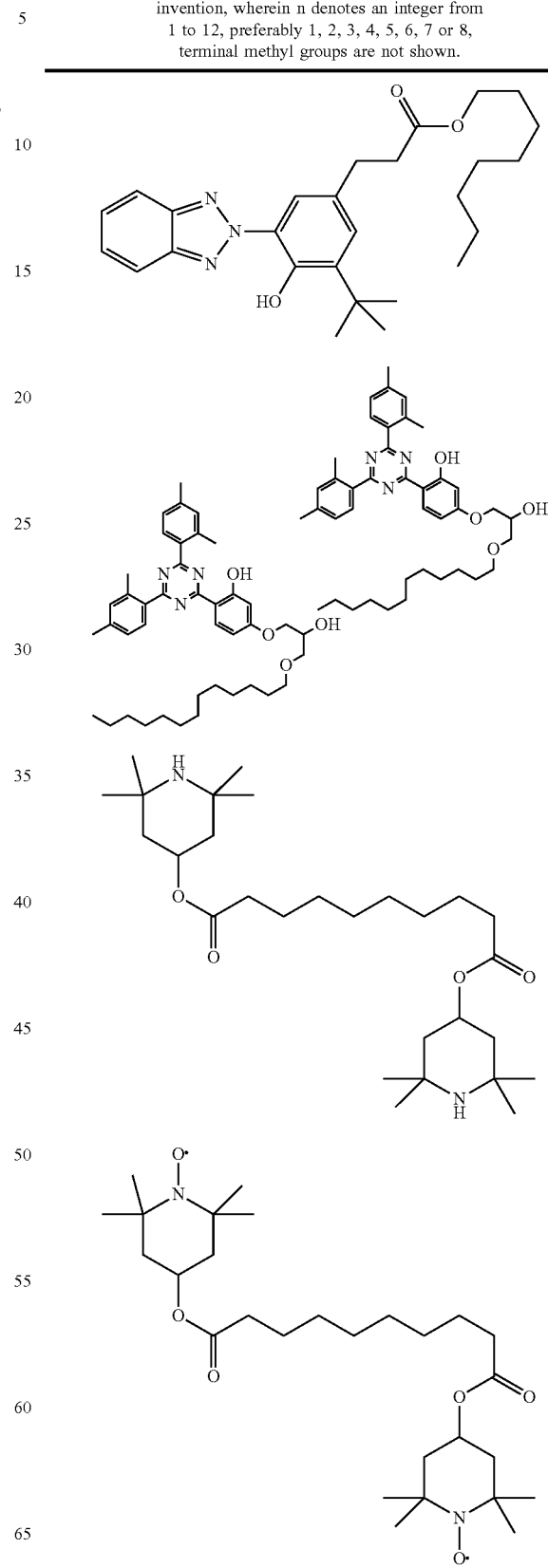

TABLE E-continued

Table E shows possible stabilizers which can be added to the LC media according to the invention, wherein n denotes an integer from 1 to 12, preferably 1, 2, 3, 4, 5, 6, 7 or 8, terminal methyl groups are not shown.

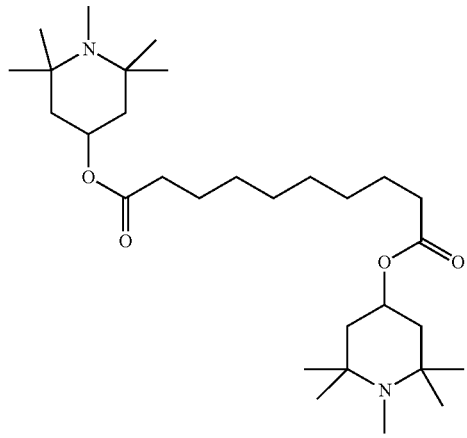

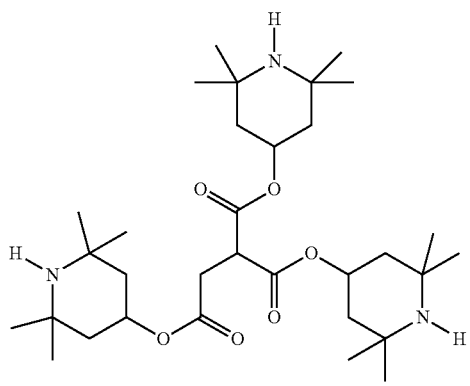

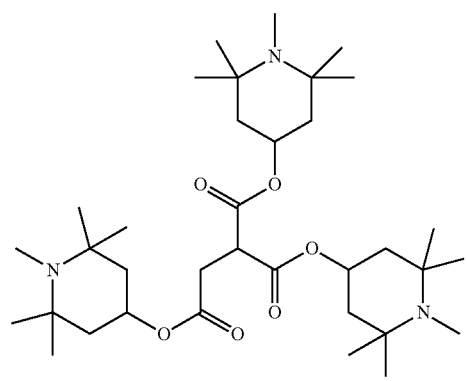

TABLE E-continued

Table E shows possible stabilizers which can be added to the LC media according to the invention, wherein n denotes an integer from 1 to 12, preferably 1, 2, 3, 4, 5, 6, 7 or 8, terminal methyl groups are not shown.

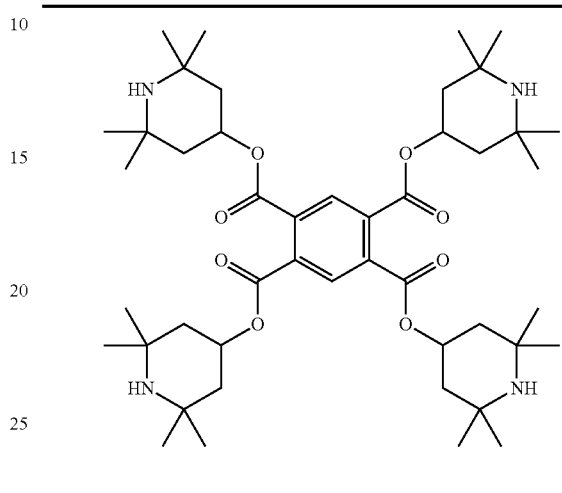

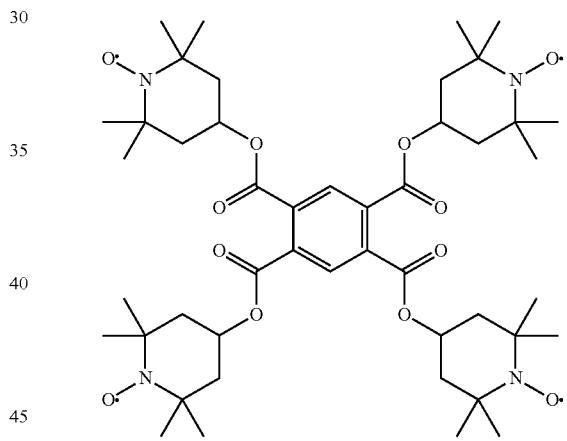

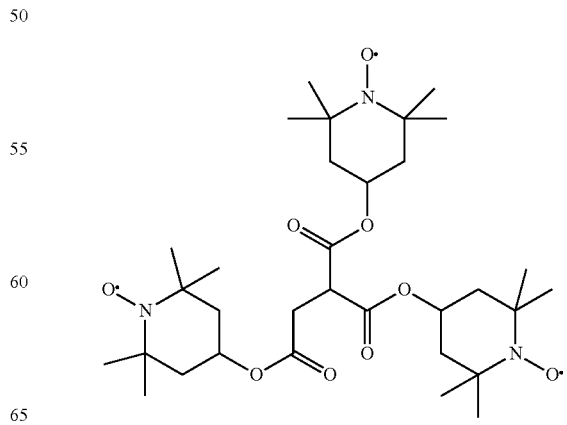

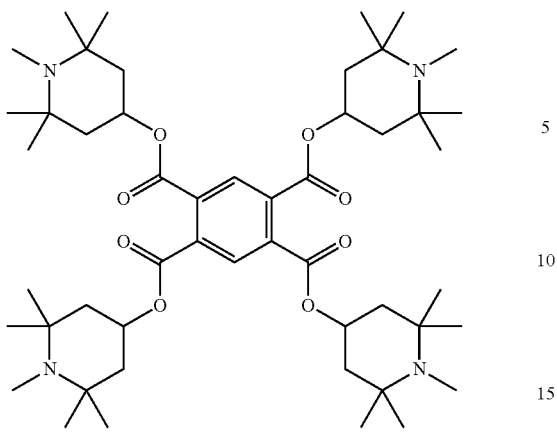
The LC media preferably comprise 0 to 10% by weight, in particular 1 ppm to 5% by weight, particularly preferably 1 ppm to 1% by weight, of stabilizers.
Table F below shows illustrative compounds which can preferably be used as chiral dopants in the mesogenic media according to the present invention.
TABLE F
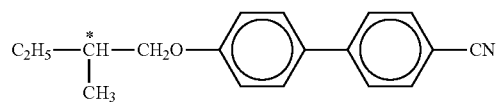
C 15
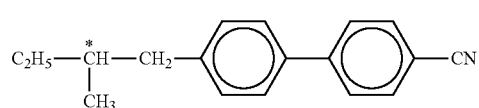
CB 15
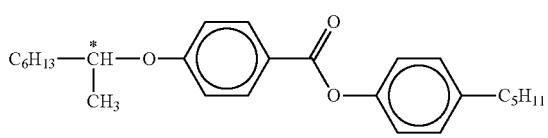
CM 21
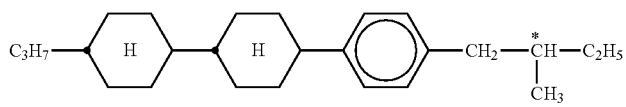
CM 44
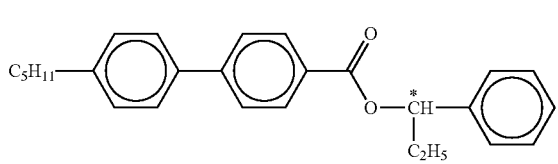
CM 45
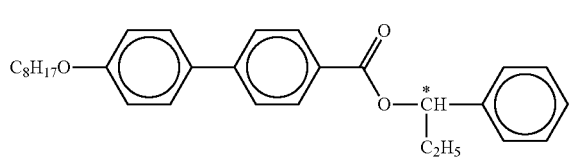
CM 47

TABLE F-continued
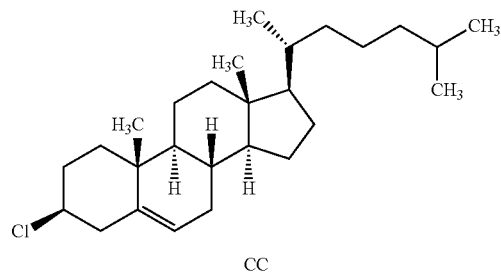
CC
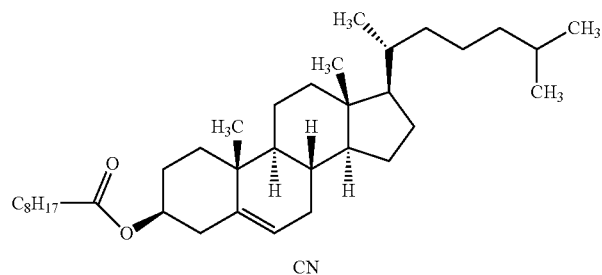
CN
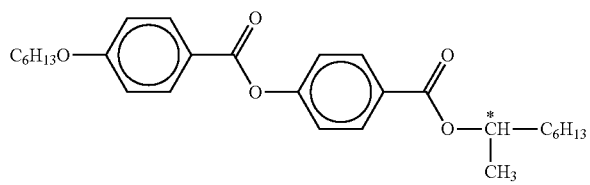
R/S-811
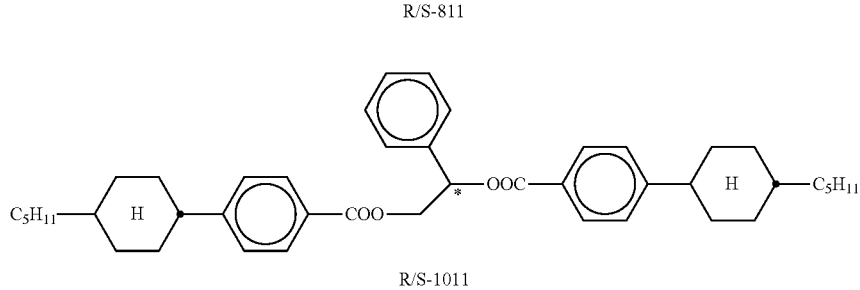
R/S-1011
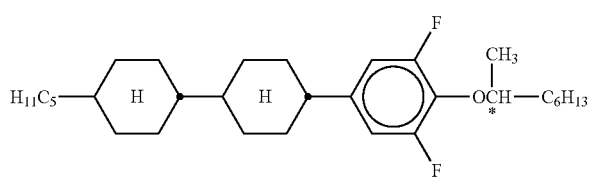
R/S-2011
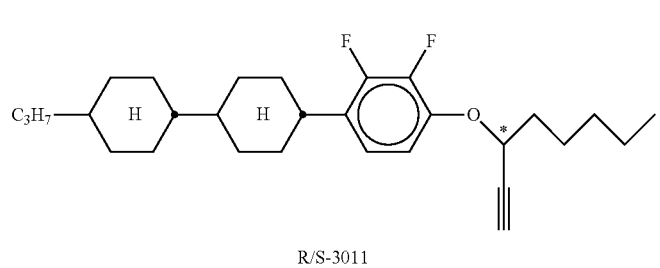
R/S-3011

TABLE F-continued

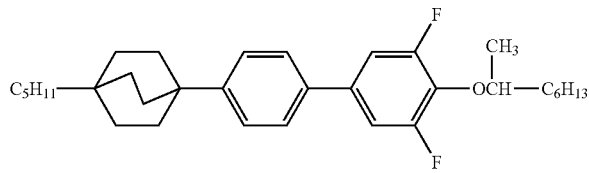

R/S-4011

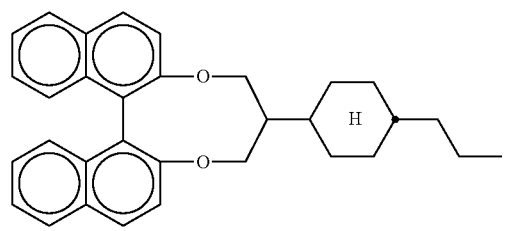

R/S-5011

In a preferred embodiment of the present invention, the mesogenic media comprise one or more compounds selected from the compounds shown in Table F.

The mesogenic media according to the present invention preferably comprise two or more, preferably four or more, compounds selected from the compounds shown in the above tables D to F.

In an embodiment the LC media according to the present invention preferably comprise three or more, more preferably five or more compounds shown in Table D.

TABLE G

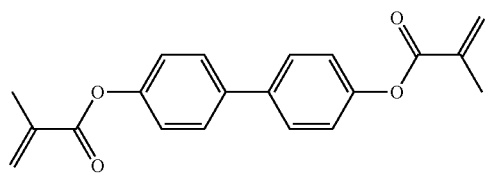 [SMILES: C=C(C)C(=O)Oc1ccc(-c2ccc(OC(=O)C(=C)C)cc2)cc1]

RM-1

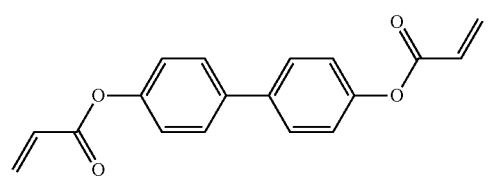 [SMILES: C=CC(=O)Oc1ccc(-c2ccc(OC(=O)C=C)cc2)cc1]

RM-2

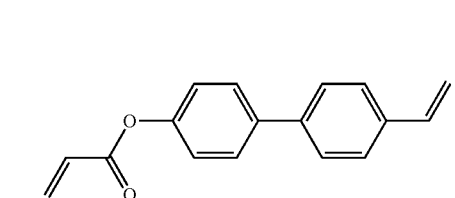

RM-3

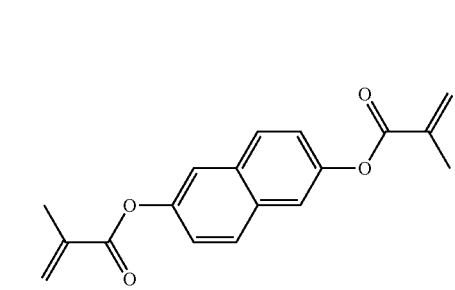 [SMILES: C=C(C)C(=O)Oc1ccc2cc(OC(=O)C(=C)C)ccc2c1]

RM-4

TABLE G-continued
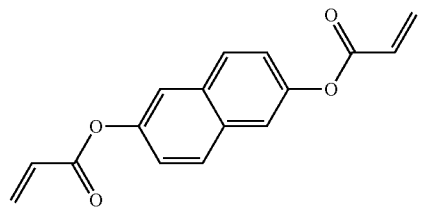 [SMILES: C=CC(=O)Oc1ccc2cc(OC(=O)C=C)ccc2c1]
RM-5
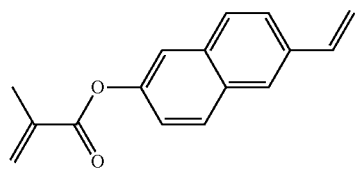 [SMILES: C=Cc1ccc2cc(OC(=O)C(=C)C)ccc2c1]
RM-6
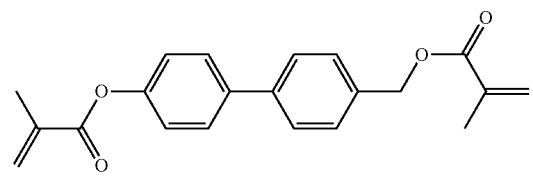
RM-7
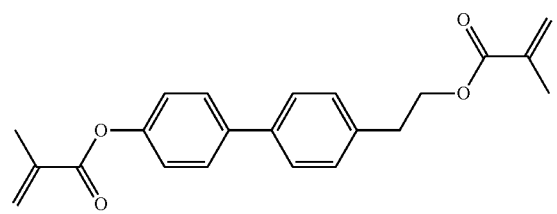 [SMILES: C=C(C)C(=O)OCCc1ccc(-c2ccc(OC(=O)C(=C)C)cc2)cc1]
RM-8
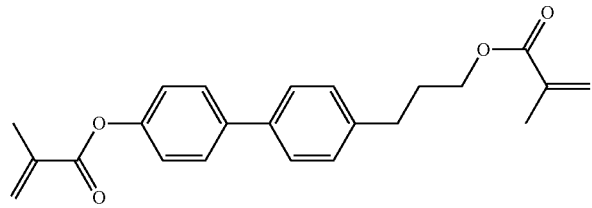 [SMILES: C=C(C)C(=O)OCCCc1ccc(-c2ccc(OC(=O)C(=C)C)cc2)cc1]
RM-9
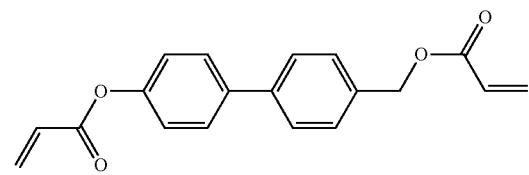 [SMILES: C=CC(=O)OCc1ccc(-c2ccc(OC(=O)C=C)cc2)cc1]
RM-10
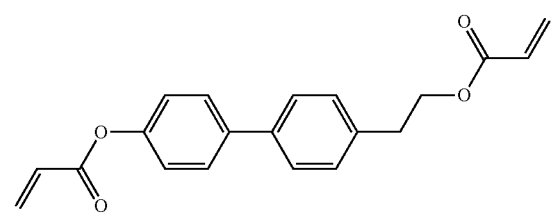 [SMILES: C=CC(=O)OCCc1ccc(-c2ccc(OC(=O)C=C)cc2)cc1]
RM-11
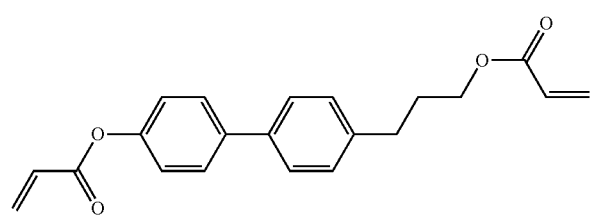 [SMILES: C=CC(=O)OCCCc1ccc(-c2ccc(OC(=O)C=C)cc2)cc1]
RM-12

TABLE G-continued
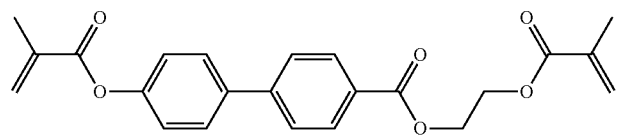 [SMILES: C=C(C)C(=O)OCCOC(=O)c1ccc(-c2ccc(OC(=O)C(=C)C)cc2)cc1] RM-13
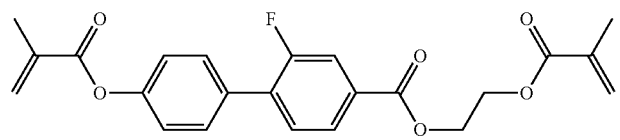 [SMILES: C=C(C)C(=O)OCCOC(=O)c1ccc(-c2ccc(OC(=O)C(=C)C)cc2)c(F)c1] RM-14
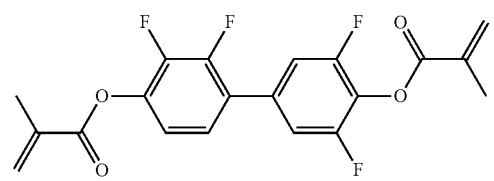 RM-15
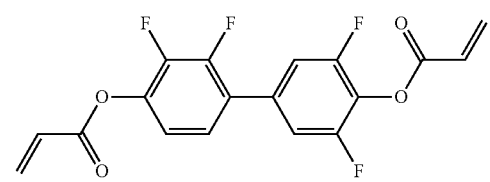 RM-16
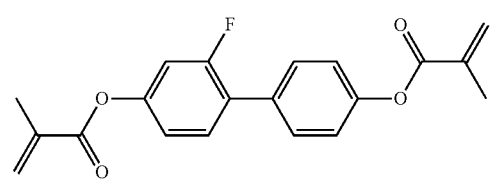 RM-17
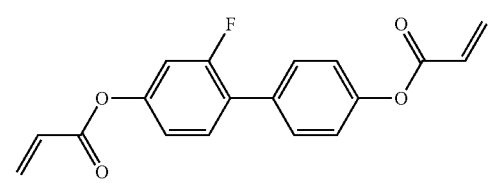 RM-18
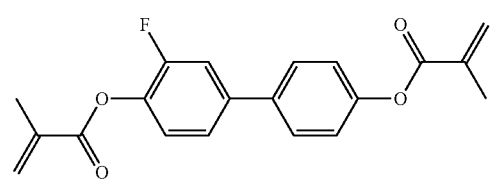 RM-19
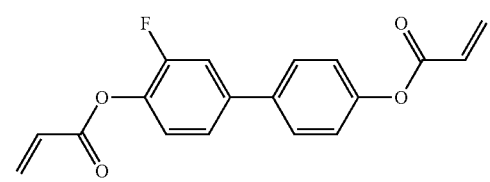 RM-20
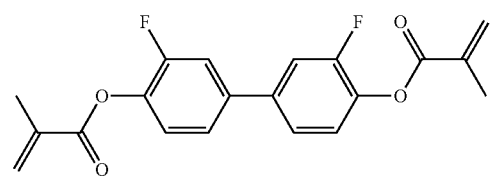 [SMILES: C=C(C)C(=O)Oc1ccc(-c2ccc(OC(=O)C(=C)C)c(F)c2)cc1] RM-21

TABLE G-continued
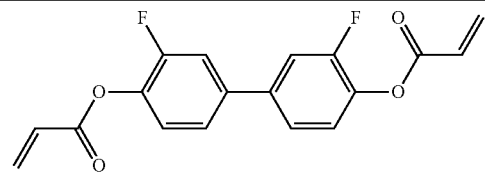
RM-22
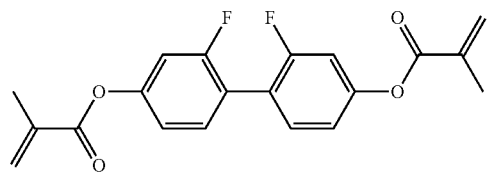
RM-23
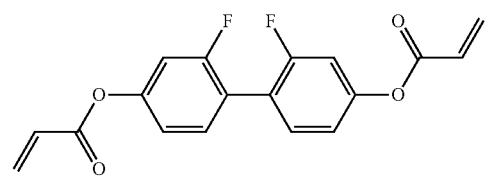 [SMILES: C=CC(=O)Oc1ccc(-c2ccc(OC(=O)C=C)cc2F)c(F)c1]
RM-24
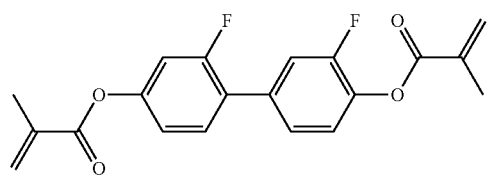 [SMILES: C=C(C)C(=O)Oc1ccc(-c2ccc(OC(=O)C(=C)C)c(F)c2)c(F)c1]
RM-25
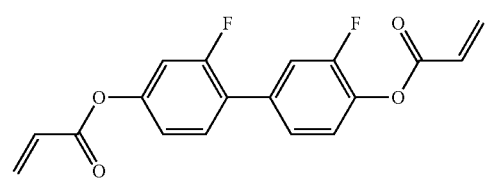
RM-26
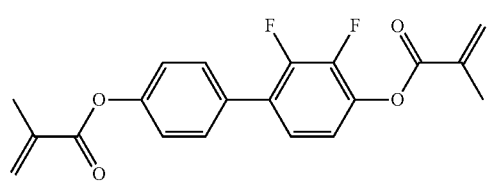 [SMILES: C=C(C)C(=O)Oc1ccc(-c2ccc(OC(=O)C(=C)C)c(F)c2F)c(F)c1]
RM-27
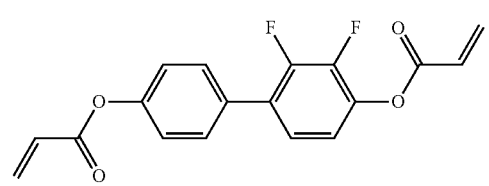
RM-28
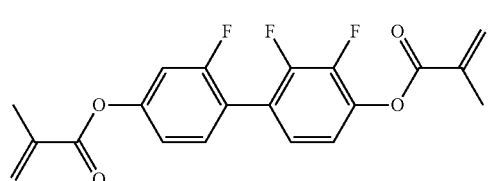
RM-29
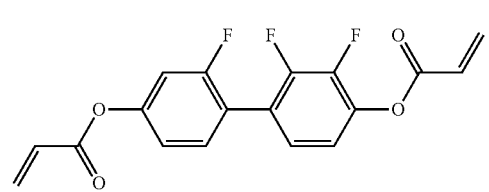 [SMILES: C=CC(=O)Oc1ccc(-c2ccc(OC(=O)C=C)c(F)c2F)c(F)c1]
RM-30

TABLE G-continued
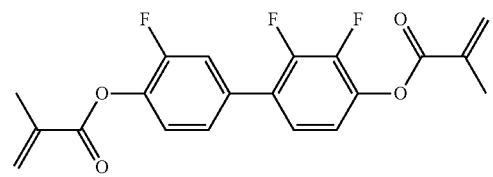 [SMILES: C=C(C)C(=O)Oc1ccc(-c2ccc(OC(=O)C(=C)C)c(F)c2F)c(F)c1F] RM-31
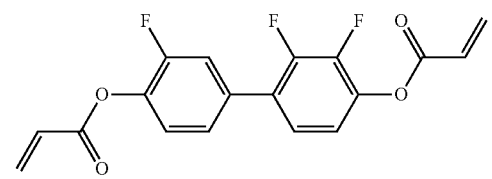 RM-32
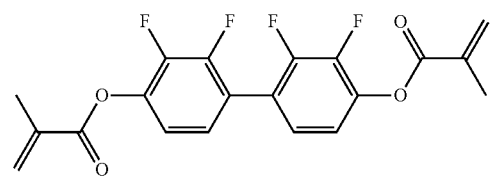 RM-33
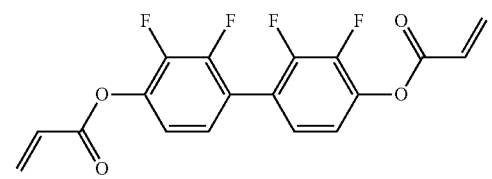 RM-34
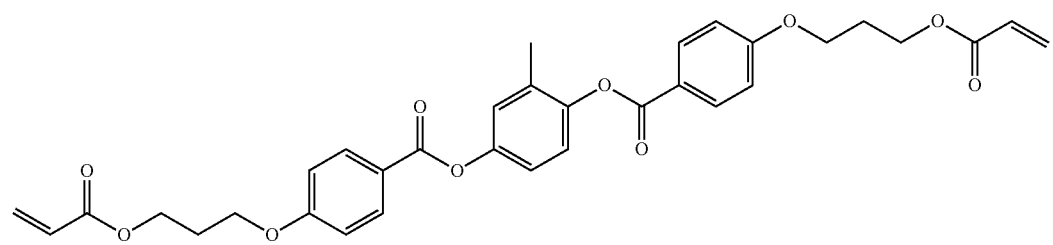 [SMILES: C=CC(=O)OCCCOc1ccc(C(=O)Oc2ccc(OC(=O)c3ccc(OCCCOC(=O)C=C)cc3)c(C)c2)cc1] RM-35
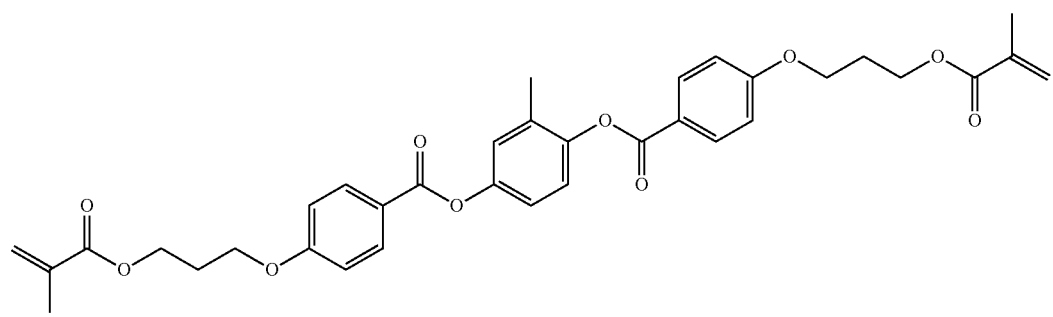 [SMILES: C=C(C)C(=O)OCCCOc1ccc(C(=O)Oc2ccc(OC(=O)c3ccc(OCCCOC(=O)C(=C)C)cc3)c(C)c2)cc1] RM-36
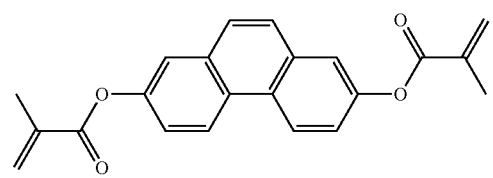 [SMILES: C=C(C)C(=O)Oc1ccc2c(ccc3cc(OC(=O)C(=C)C)ccc32)c1] RM-37

TABLE G-continued
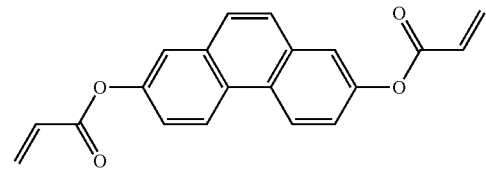 [SMILES: C=CC(=O)Oc1ccc2c(ccc3cc(OC(=O)C=C)ccc32)c1] RM-38
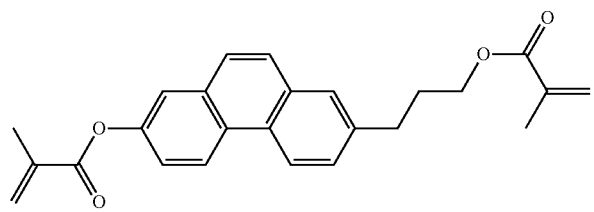 [SMILES: C=C(C)C(=O)OCCCc1ccc2c(ccc3cc(OC(=O)C(=C)C)ccc32)c1] RM-39
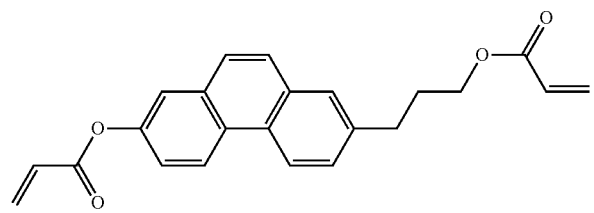 [SMILES: C=CC(=O)OCCCc1ccc2c(ccc3cc(OC(=O)C=C)ccc32)c1] RM-40
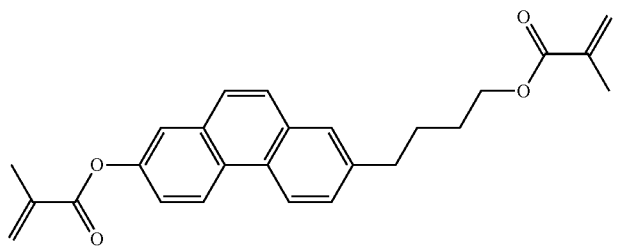 [SMILES: C=C(C)C(=O)OCCCCc1ccc2c(ccc3cc(OC(=O)C(=C)C)ccc32)c1] RM-41
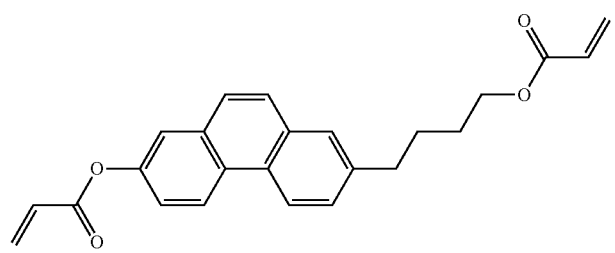 [SMILES: C=CC(=O)OCCCCc1ccc2c(ccc3cc(OC(=O)C=C)ccc32)c1] RM-42
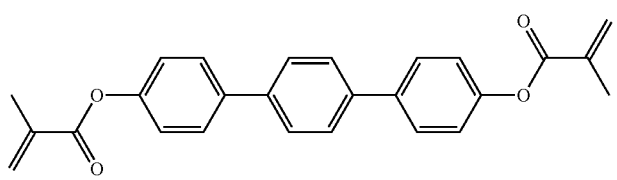 [SMILES: C=C(C)C(=O)Oc1ccc(-c2ccc(-c3ccc(OC(=O)C(=C)C)cc3)cc2)cc1] RM-43
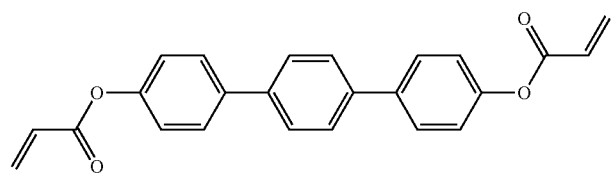 [SMILES: C=CC(=O)Oc1ccc(-c2ccc(-c3ccc(OC(=O)C=C)cc3)cc2)cc1] RM-44

TABLE G-continued
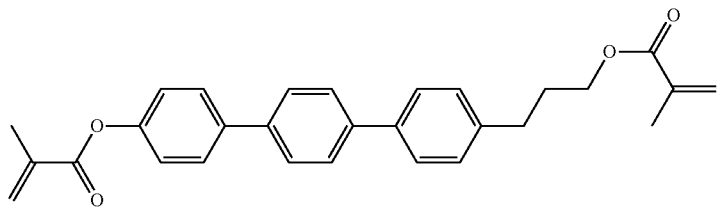 [SMILES: C=C(C)C(=O)OCCCc1ccc(-c2ccc(-c3ccc(OC(=O)C(=C)C)cc3)cc2)cc1] RM-45
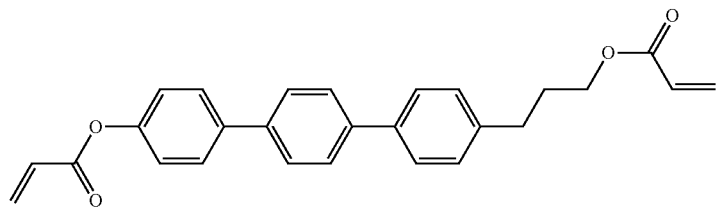 RM-46
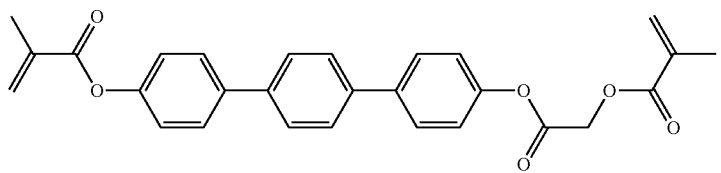 [SMILES: C=C(C)C(=O)OCC(=O)Oc1ccc(-c2ccc(-c3ccc(OC(=O)C(=C)C)cc3)cc2)cc1] RM-47
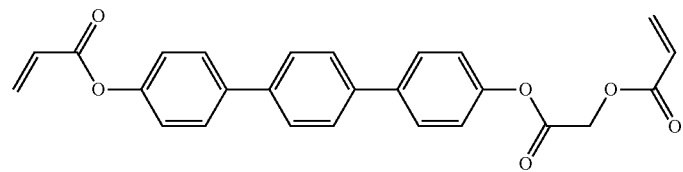 [SMILES: C=CC(=O)OCC(=O)Oc1ccc(-c2ccc(-c3ccc(OC(=O)C=C)cc3)cc2)cc1] RM-48
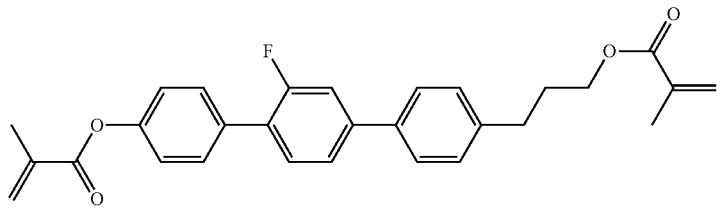 RM-49
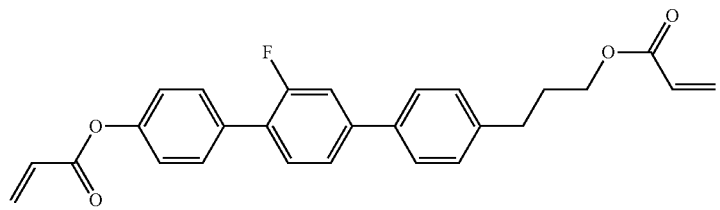 [SMILES: C=CC(=O)OCCCc1ccc(-c2ccc(-c3ccc(OC(=O)C=C)cc3)c(F)c2)cc1] RM-50
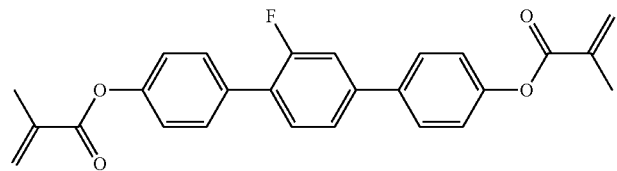 RM-51
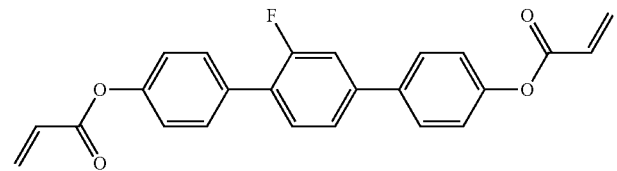 RM-52

TABLE G-continued
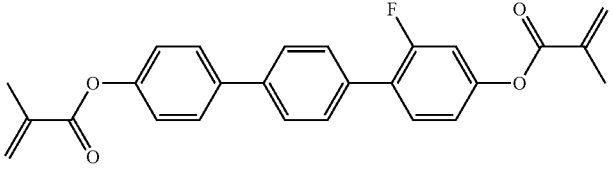 [SMILES: C=C(C)C(=O)Oc1ccc(-c2ccc(-c3ccc(OC(=O)C(=C)C)cc3F)cc2)cc1] RM-53
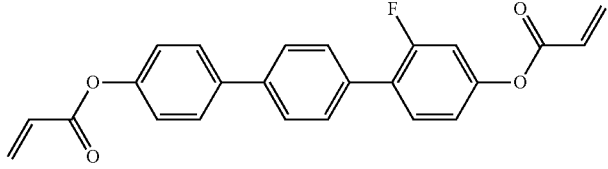 RM-54
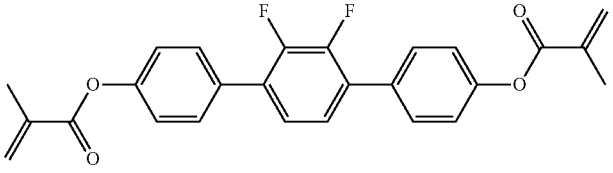 [SMILES: C=C(C)C(=O)Oc1ccc(-c2ccc(-c3ccc(OC(=O)C(=C)C)cc3)c(F)c2F)cc1] RM-55
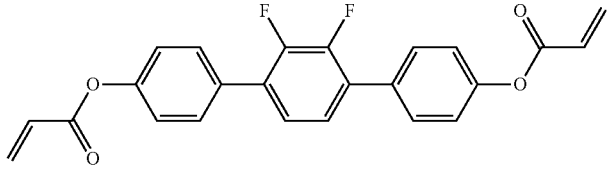 [SMILES: C=CC(=O)Oc1ccc(-c2ccc(-c3ccc(OC(=O)C=C)cc3)c(F)c2F)cc1] RM-56
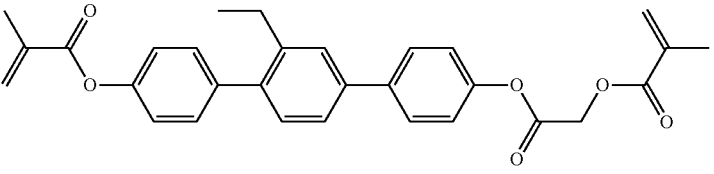 [SMILES: C=C(C)C(=O)OCC(=O)Oc1ccc(-c2ccc(-c3ccc(OC(=O)C(=C)C)cc3)c(CC)c2)cc1] RM-57
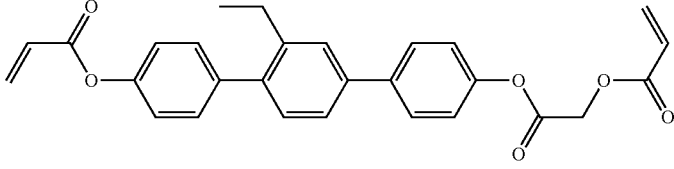 [SMILES: C=CC(=O)OCC(=O)Oc1ccc(-c2ccc(-c3ccc(OC(=O)C=C)cc3)c(CC)c2)cc1] RM-58
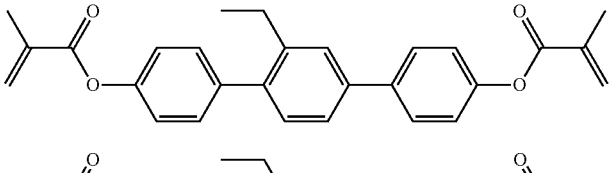 RM-59
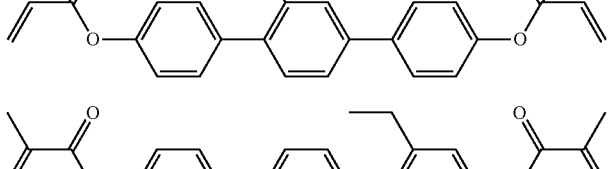 RM-60
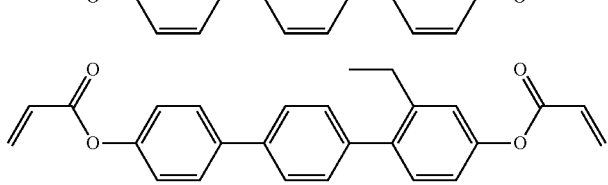 RM-61
 RM-62

TABLE G-continued
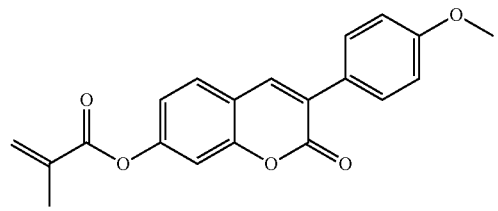 [SMILES: C=C(C)C(=O)Oc1ccc2cc(-c3ccc(OC)cc3)c(=O)oc2c1]
RM-63
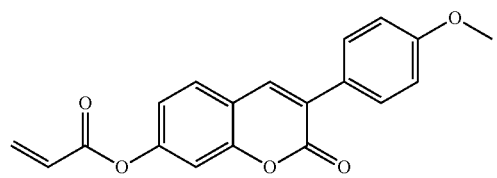 [SMILES: C=CC(=O)Oc1ccc2cc(-c3ccc(OC)cc3)c(=O)oc2c1]
RM-64
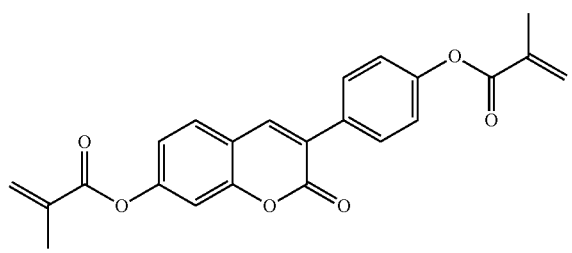 [SMILES: C=C(C)C(=O)Oc1ccc(-c2cc3ccc(OC(=O)C(=C)C)cc3oc2=O)cc1]
RM-65
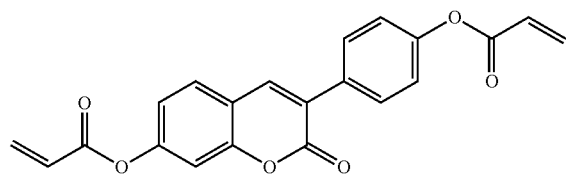 [SMILES: C=CC(=O)Oc1ccc(-c2cc3ccc(OC(=O)C=C)cc3oc2=O)cc1]
RM-66
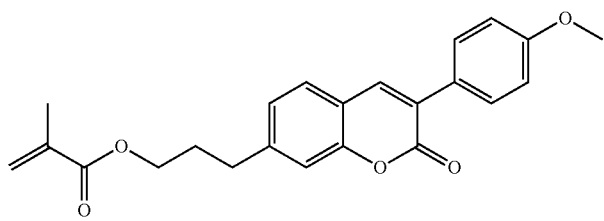 [SMILES: C=C(C)C(=O)OCCCc1ccc2cc(-c3ccc(OC)cc3)c(=O)oc2c1]
RM-67
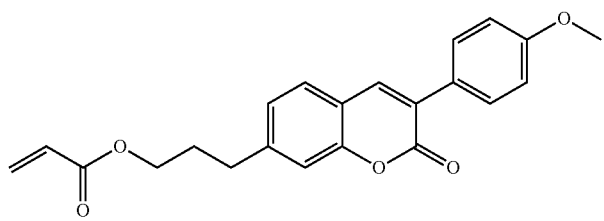 [SMILES: C=CC(=O)OCCCc1ccc2cc(-c3ccc(OC)cc3)c(=O)oc2c1]
RM-68
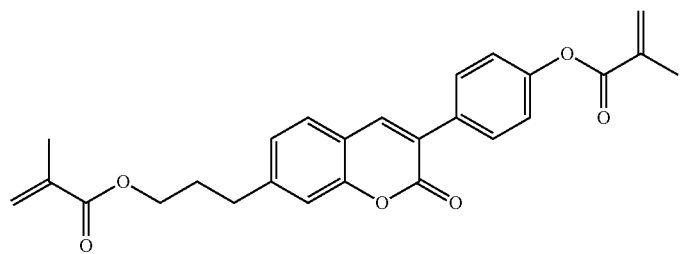 [SMILES: C=C(C)C(=O)OCCCc1ccc2cc(-c3ccc(OC(=O)C(=C)C)cc3)c(=O)oc2c1]
RM-69

TABLE G-continued
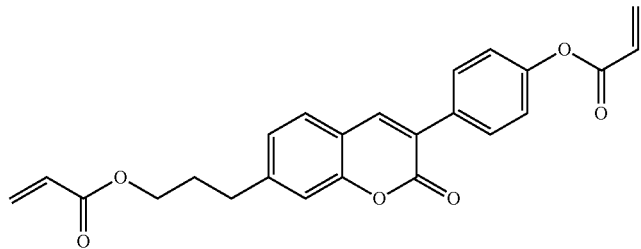 [SMILES: C=CC(=O)OCCCc1ccc2cc(-c3ccc(OC(=O)C=C)cc3)c(=O)oc2c1]
RM-70
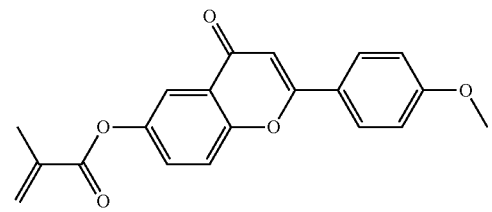 [SMILES: C=C(C)C(=O)Oc1ccc2oc(-c3ccc(OC)cc3)cc(=O)c2c1]
RM-71
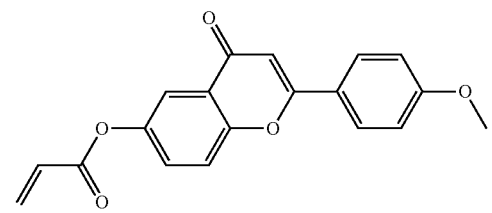 [SMILES: C=CC(=O)Oc1ccc2oc(-c3ccc(OC)cc3)cc(=O)c2c1]
RM-72
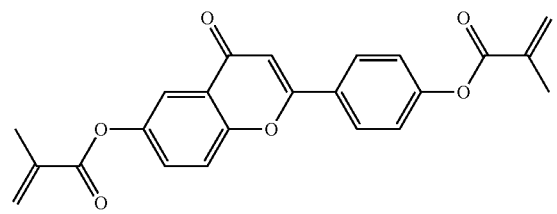 [SMILES: C=C(C)C(=O)Oc1ccc(-c2cc(=O)c3cc(OC(=O)C(=C)C)ccc3o2)cc1]
RM-73
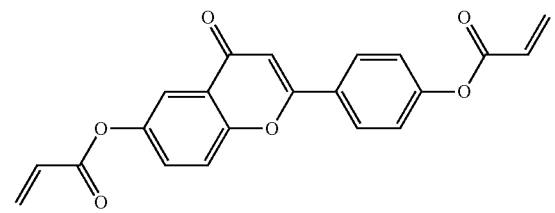 [SMILES: C=CC(=O)Oc1ccc(-c2cc(=O)c3cc(OC(=O)C=C)ccc3o2)cc1]
RM-74
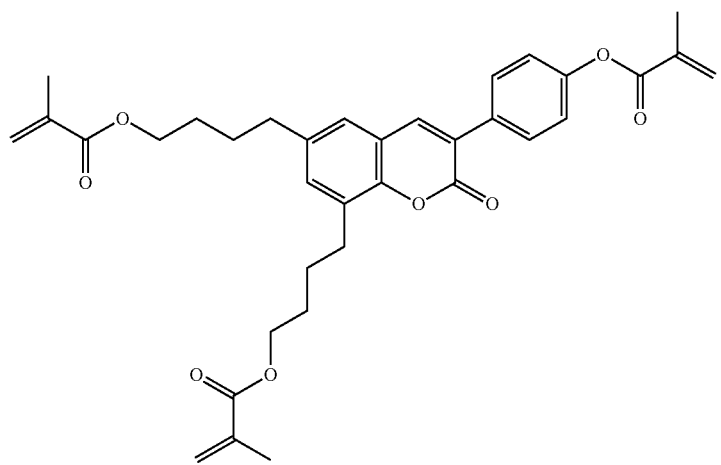 [SMILES: C=C(C)C(=O)OCCCCc1cc(CCCCOC(=O)C(=C)C)c2oc(=O)c(-c3ccc(OC(=O)C(=C)C)cc3)cc2c1]
RM-75

TABLE G-continued
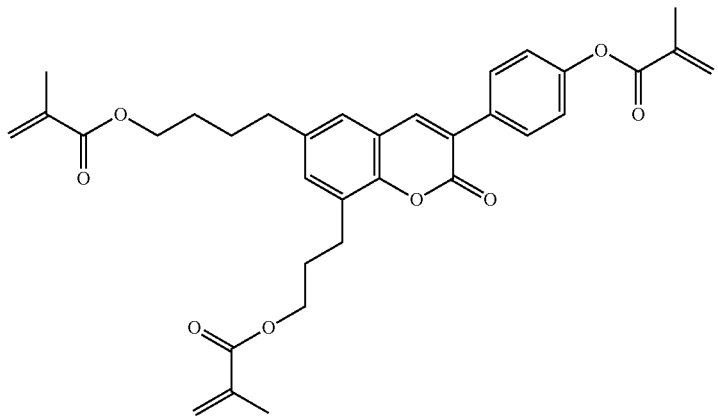 [SMILES: C=C(C)C(=O)OCCCCc1cc(CCCOC(=O)C(=C)C)c2oc(=O)c(-c3ccc(OC(=O)C(=C)C)cc3)cc2c1]
RM-76
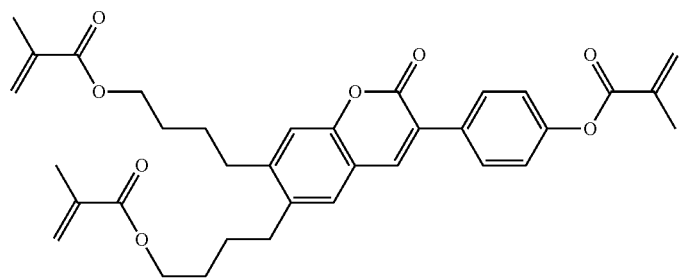 [SMILES: C=C(C)C(=O)OCCCCc1cc2cc(-c3ccc(OC(=O)C(=C)C)cc3)c(=O)oc2cc1CCCCOC(=O)C(=C)C]
RM-77
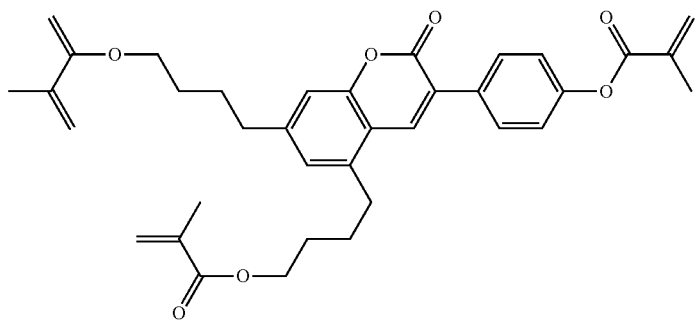 [SMILES: C=C(C)C(=C)OCCCCc1cc(CCCCOC(=O)C(=C)C)c2cc(-c3ccc(OC(=O)C(=C)C)cc3)c(=O)oc2c1]
RM-78
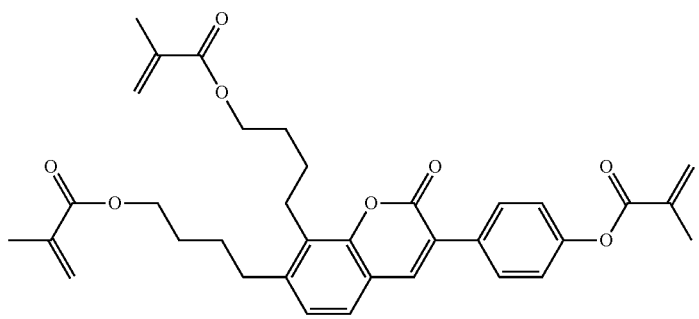 [SMILES: C=C(C)C(=O)OCCCCc1ccc2cc(-c3ccc(OC(=O)C(=C)C)cc3)c(=O)oc2c1CCCCOC(=O)C(=C)C]
RM-79
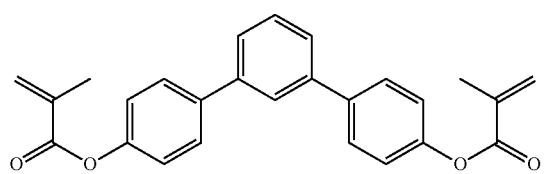 [SMILES: C=C(C)C(=O)Oc1ccc(-c2cccc(-c3ccc(OC(=O)C(=C)C)cc3)c2)cc1]
RM-80

TABLE G-continued
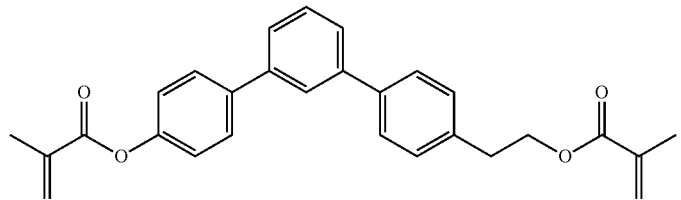 [SMILES: C=C(C)C(=O)OCCc1ccc(-c2cccc(-c3ccc(OC(=O)C(=C)C)cc3)c2)cc1]
RM-81
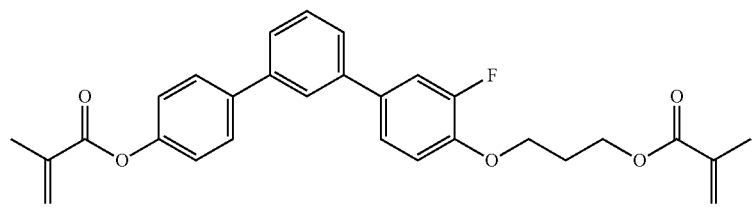 [SMILES: C=C(C)C(=O)OCCCOc1ccc(-c2cccc(-c3ccc(OC(=O)C(=C)C)cc3)c2)cc1F]
RM-82
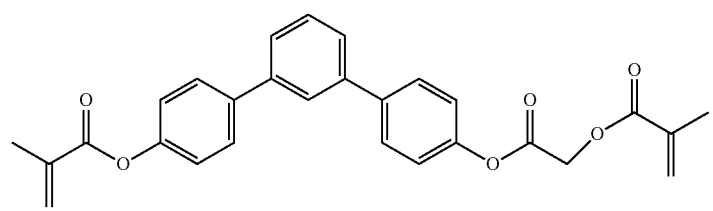 [SMILES: C=C(C)C(=O)OCC(=O)Oc1ccc(-c2cccc(-c3ccc(OC(=O)C(=C)C)cc3)c2)cc1]
RM-83
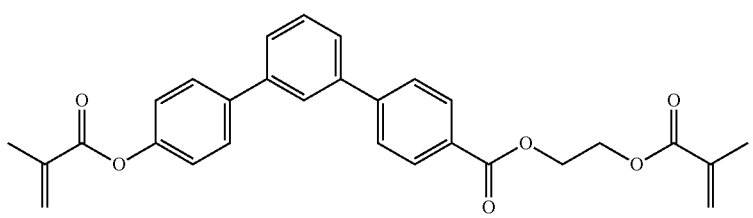 [SMILES: C=C(C)C(=O)OCCOC(=O)c1ccc(-c2cccc(-c3ccc(OC(=O)C(=C)C)cc3)c2)cc1]
RM-84
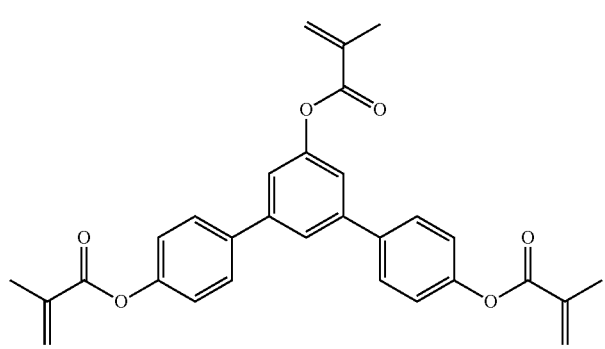 [SMILES: C=C(C)C(=O)Oc1ccc(-c2cc(OC(=O)C(=C)C)cc(-c3ccc(OC(=O)C(=C)C)cc3)c2)cc1]
RM-85
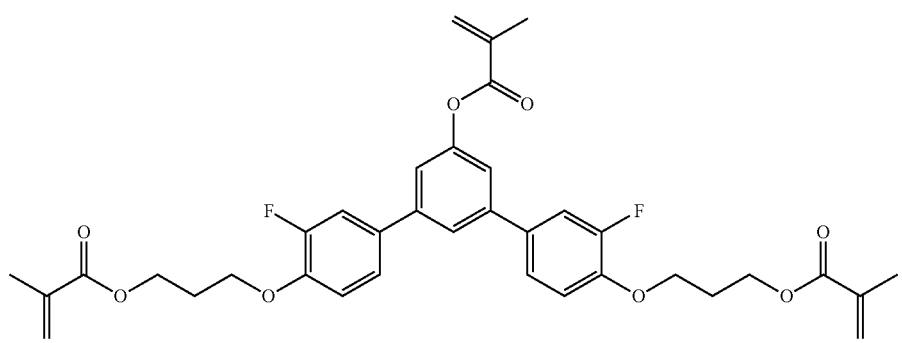 [SMILES: C=C(C)C(=O)OCCCOc1ccc(-c2cc(OC(=O)C(=C)C)cc(-c3ccc(OCCCOC(=O)C(=C)C)c(F)c3)c2)cc1F]
RM-86

TABLE G-continued
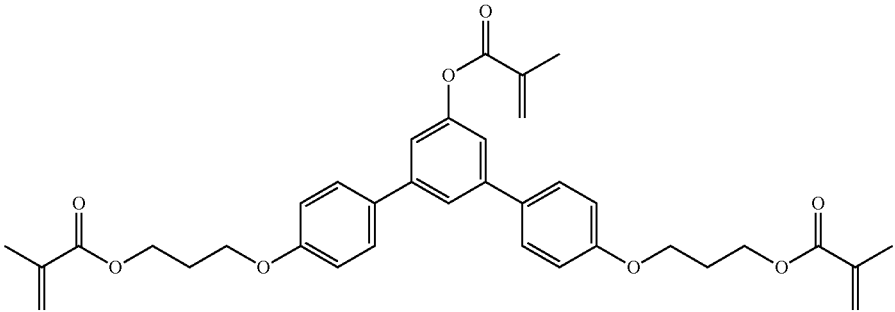 [SMILES: C=C(C)C(=O)OCCCOc1ccc(-c2cc(OC(=O)C(=C)C)cc(-c3ccc(OCCCOC(=O)C(=C)C)cc3)c2)cc1]
RM-87
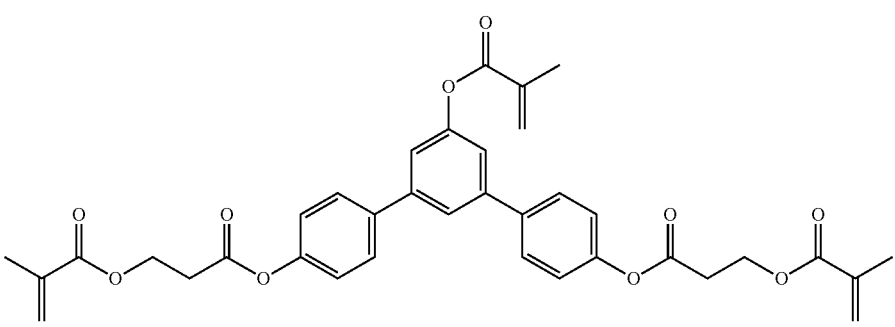 [SMILES: C=C(C)C(=O)OCCC(=O)Oc1ccc(-c2cc(OC(=O)C(=C)C)cc(-c3ccc(OC(=O)CCOC(=O)C(=C)C)cc3)c2)cc1]
RM-88
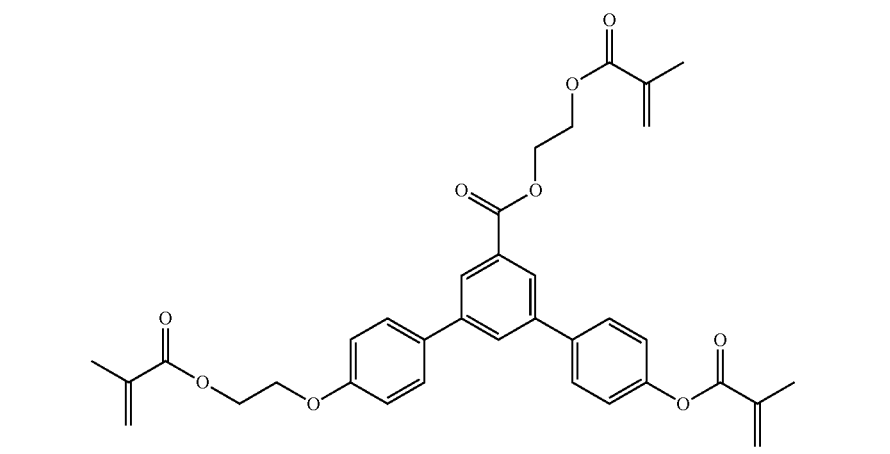 [SMILES: C=C(C)C(=O)OCCOC(=O)c1cc(-c2ccc(OCCOC(=O)C(=C)C)cc2)cc(-c2ccc(OC(=O)C(=C)C)cc2)c1]
RM-89
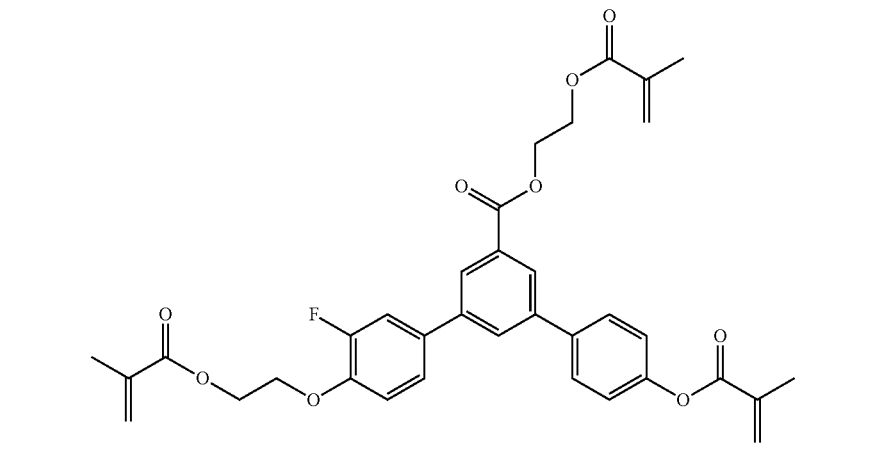 [SMILES: C=C(C)C(=O)OCCOC(=O)c1cc(-c2ccc(OC(=O)C(=C)C)cc2)cc(-c2ccc(OCCOC(=O)C(=C)C)c(F)c2)c1]
RM-90

TABLE G-continued
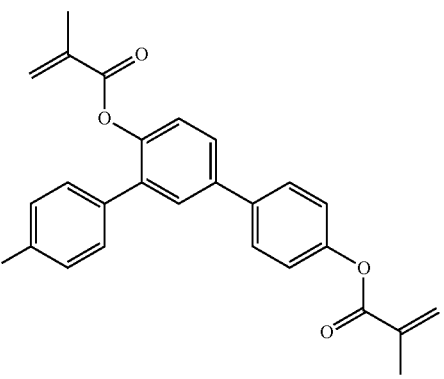
RM-91
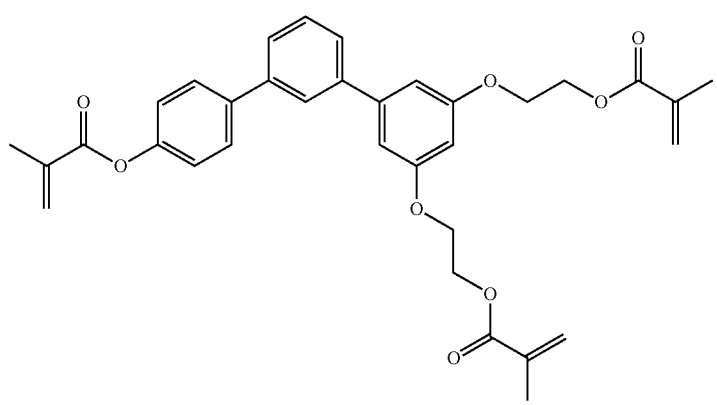 [SMILES: C=C(C)C(=O)OCCOc1cc(OCCOC(=O)C(=C)C)cc(-c2cccc(-c3ccc(OC(=O)C(=C)C)cc3)c2)c1]
RM-92
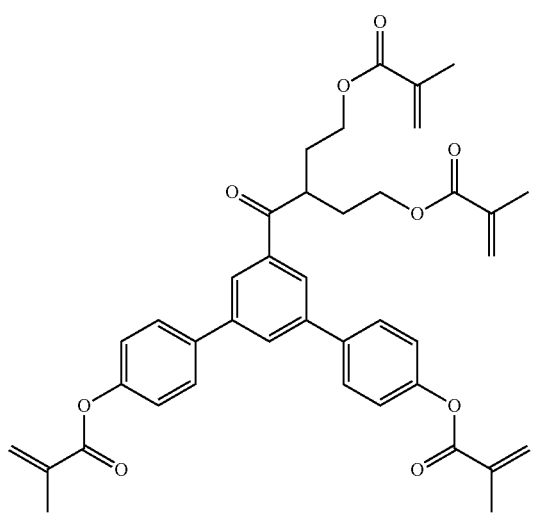 [SMILES: C=C(C)C(=O)OCCC(CCOC(=O)C(=C)C)C(=O)c1cc(-c2ccc(OC(=O)C(=C)C)cc2)cc(-c2ccc(OC(=O)C(=C)C)cc2)c1]
RM-93
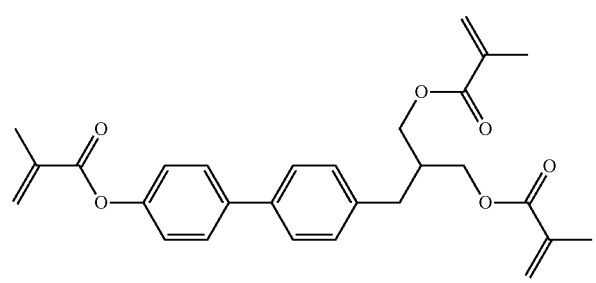 [SMILES: C=C(C)C(=O)OCC(COC(=O)C(=C)C)Cc1ccc(-c2ccc(OC(=O)C(=C)C)cc2)cc1]
RM-94

TABLE G-continued
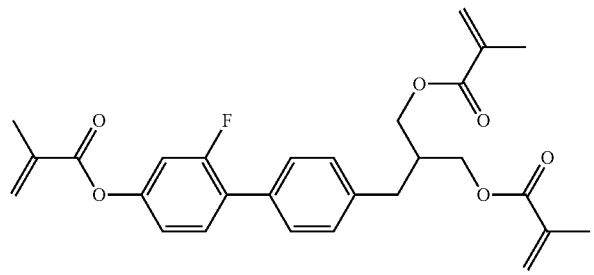 [SMILES: C=C(C)C(=O)OCC(COC(=O)C(=C)C)Cc1ccc(-c2ccc(OC(=O)C(=C)C)cc2F)cc1]
RM-95
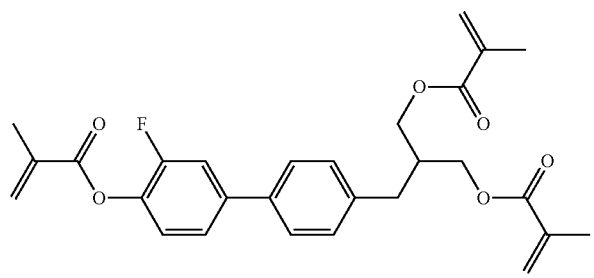
RM-96
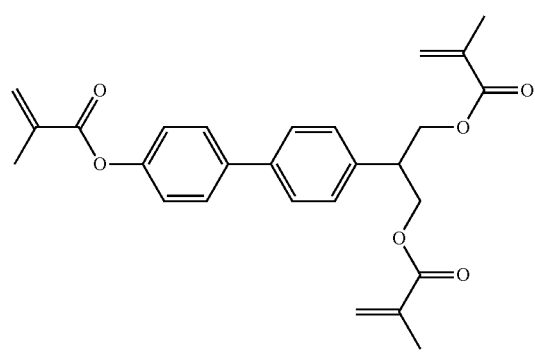 [SMILES: C=C(C)C(=O)OCC(COC(=O)C(=C)C)c1ccc(-c2ccc(OC(=O)C(=C)C)cc2)cc1]
RM-97
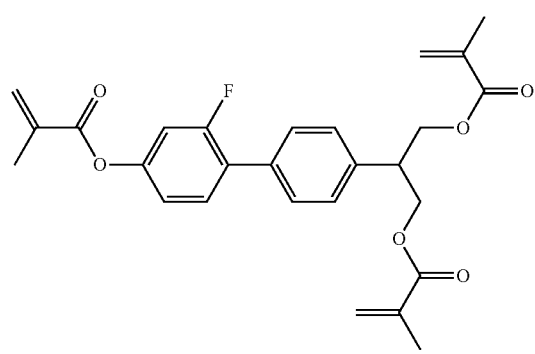 [SMILES: C=C(C)C(=O)OCC(COC(=O)C(=C)C)c1ccc(-c2ccc(OC(=O)C(=C)C)cc2F)cc1]
RM-98
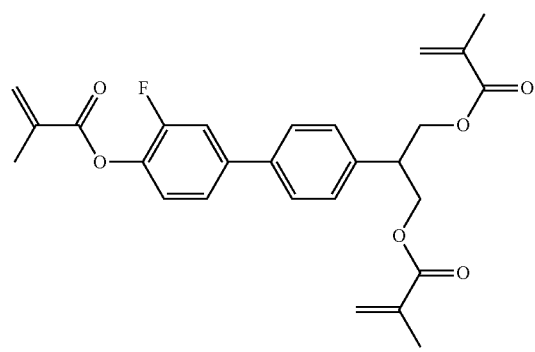 [SMILES: C=C(C)C(=O)OCC(COC(=O)C(=C)C)c1ccc(-c2ccc(OC(=O)C(=C)C)c(F)c2)cc1]
RM-99

TABLE G-continued
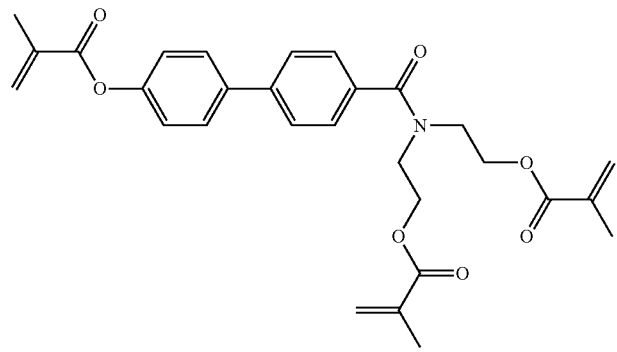 [SMILES: C=C(C)C(=O)OCCN(CCOC(=O)C(=C)C)C(=O)c1ccc(-c2ccc(OC(=O)C(=C)C)cc2)cc1]
RM-100
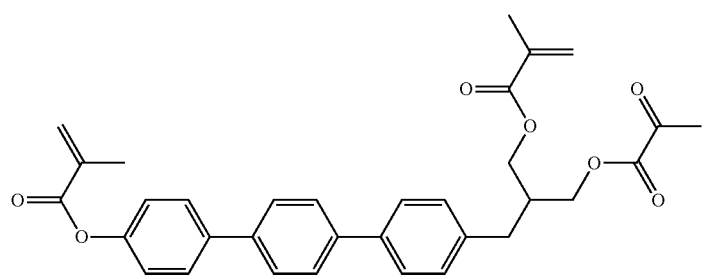 [SMILES: C=C(C)C(=O)OCC(COC(=O)C(C)=O)Cc1ccc(-c2ccc(-c3ccc(OC(=O)C(=C)C)cc3)cc2)cc1]
RM-101
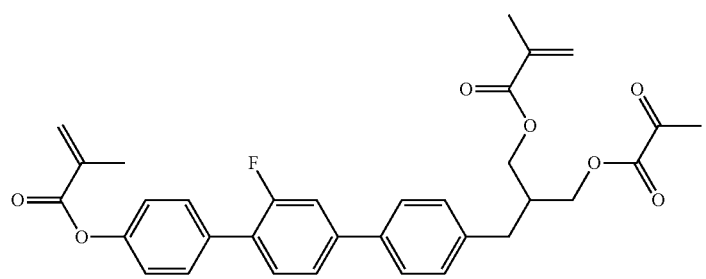
RM-102
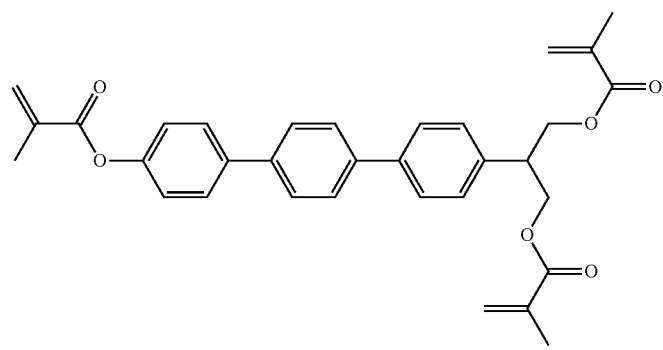 [SMILES: C=C(C)C(=O)OCC(COC(=O)C(=C)C)c1ccc(-c2ccc(-c3ccc(OC(=O)C(=C)C)cc3)cc2)cc1]
RM-103
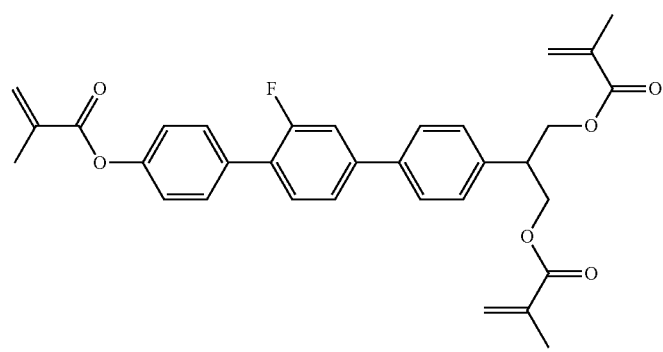 [SMILES: C=C(C)C(=O)OCC(COC(=O)C(=C)C)c1ccc(-c2ccc(-c3ccc(OC(=O)C(=C)C)cc3)c(F)c2)cc1]
RM-104

TABLE G-continued
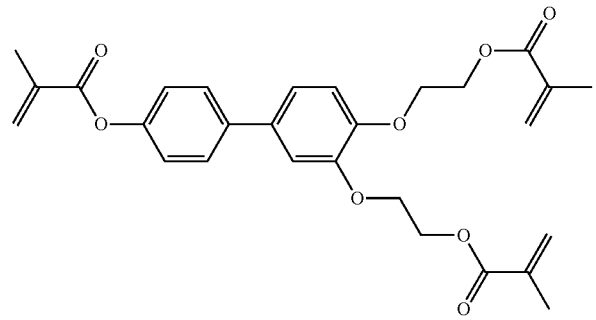 [SMILES: C=C(C)C(=O)OCCOc1ccc(-c2ccc(OC(=O)C(=C)C)cc2)cc1OCCOC(=O)C(=C)C]
RM-105
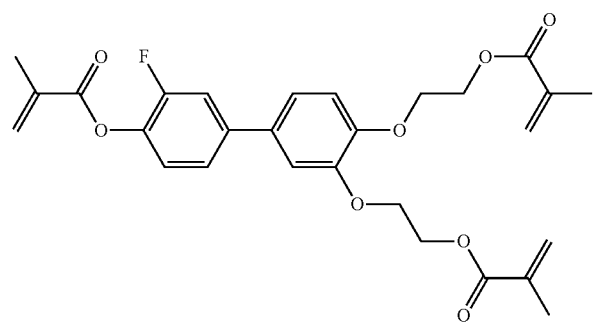 [SMILES: C=C(C)C(=O)OCCOc1ccc(-c2ccc(OC(=O)C(=C)C)c(F)c2)cc1OCCOC(=O)C(=C)C]
RM-106
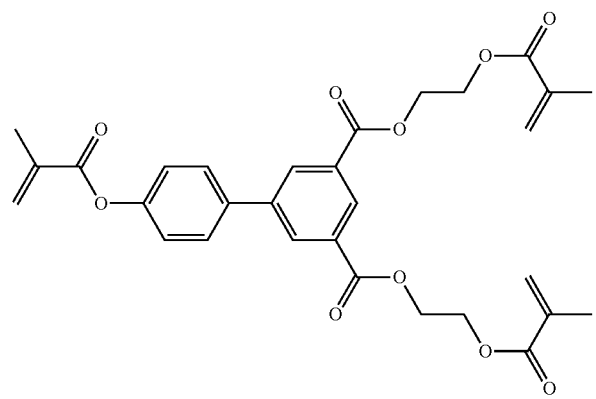 [SMILES: C=C(C)C(=O)OCCOC(=O)c1cc(C(=O)OCCOC(=O)C(=C)C)cc(-c2ccc(OC(=O)C(=C)C)cc2)c1]
RM-107
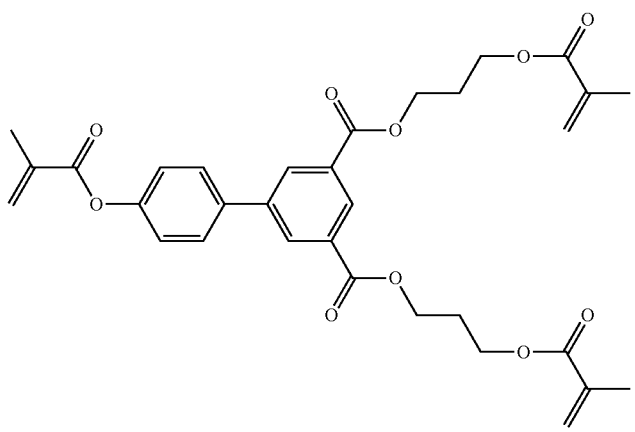 [SMILES: C=C(C)C(=O)OCCCOC(=O)c1cc(C(=O)OCCCOC(=O)C(=C)C)cc(-c2ccc(OC(=O)C(=C)C)cc2)c1]
RM-108

TABLE G-continued
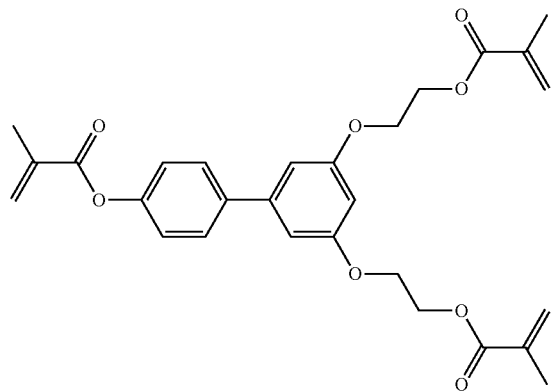 [SMILES: C=C(C)C(=O)OCCOc1cc(OCCOC(=O)C(=C)C)cc(-c2ccc(OC(=O)C(=C)C)cc2)c1]
RM-109
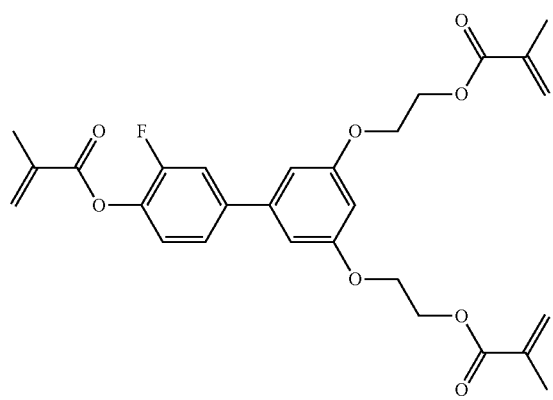 [SMILES: C=C(C)C(=O)OCCOc1cc(OCCOC(=O)C(=C)C)cc(-c2ccc(OC(=O)C(=C)C)c(F)c2)c1]
RM-110
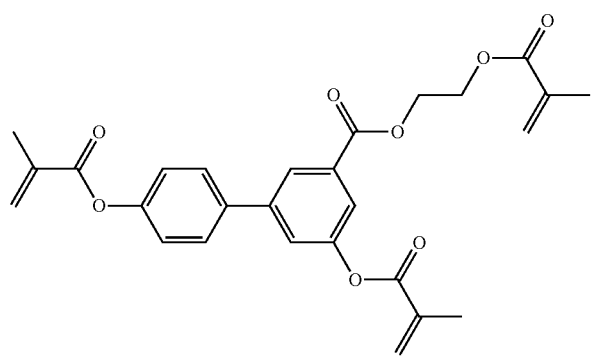 [SMILES: C=C(C)C(=O)OCCOC(=O)c1cc(OC(=O)C(=C)C)cc(-c2ccc(OC(=O)C(=C)C)cc2)c1]
RM-111
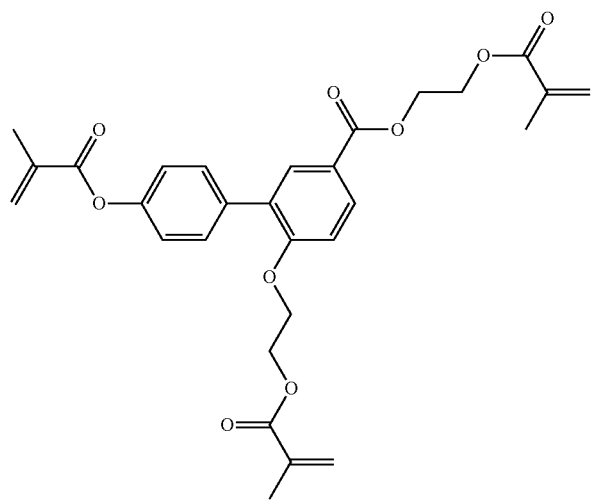 [SMILES: C=C(C)C(=O)OCCOC(=O)c1ccc(OCCOC(=O)C(=C)C)c(-c2ccc(OC(=O)C(=C)C)cc2)c1]
RM-112

TABLE G-continued
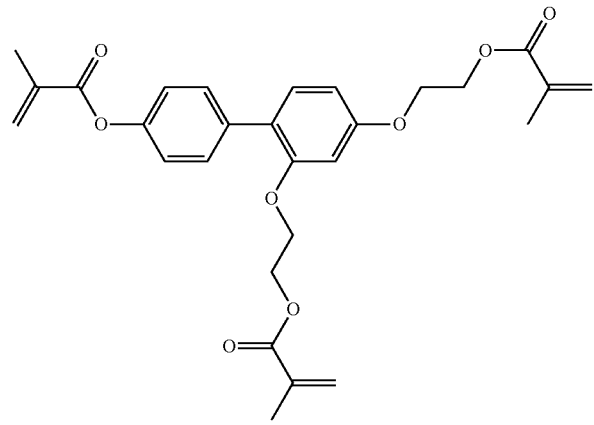 [SMILES: C=C(C)C(=O)OCCOc1ccc(-c2ccc(OC(=O)C(=C)C)cc2)c(OCCOC(=O)C(=C)C)c1]
RM-113
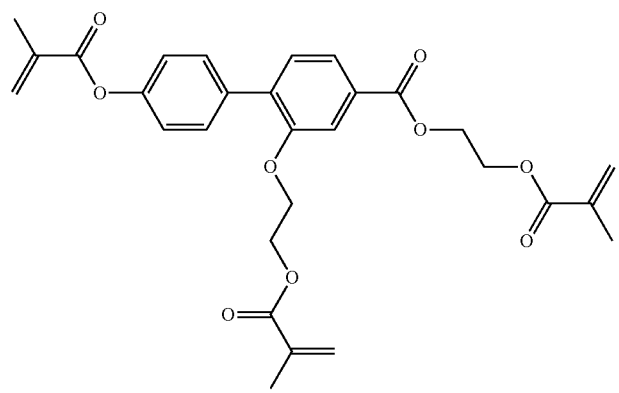 [SMILES: C=C(C)C(=O)OCCOC(=O)c1ccc(-c2ccc(OC(=O)C(=C)C)cc2)c(OCCOC(=O)C(=C)C)c1]
RM-114
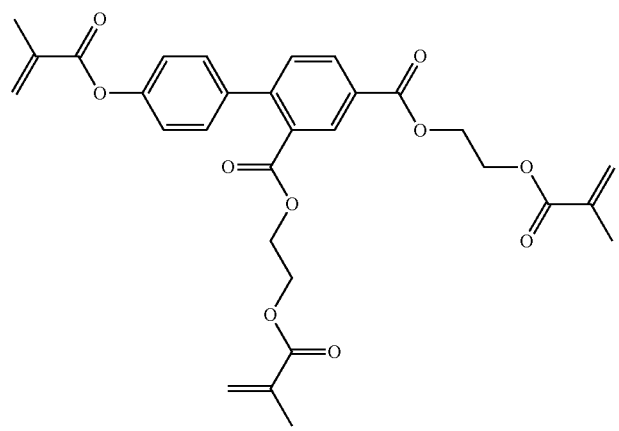 [SMILES: C=C(C)C(=O)OCCOC(=O)c1ccc(-c2ccc(OC(=O)C(=C)C)cc2)c(C(=O)OCCOC(=O)C(=C)C)c1]
RM-115
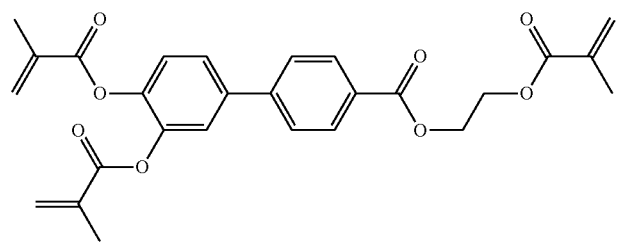 [SMILES: C=C(C)C(=O)OCCOC(=O)c1ccc(-c2ccc(OC(=O)C(=C)C)c(OC(=O)C(=C)C)c2)cc1]
RM-116

TABLE G-continued
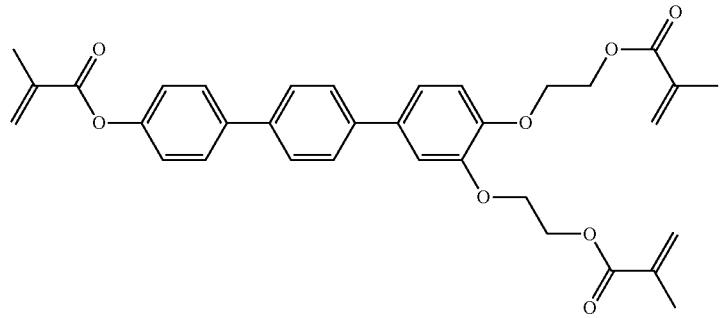
RM-117
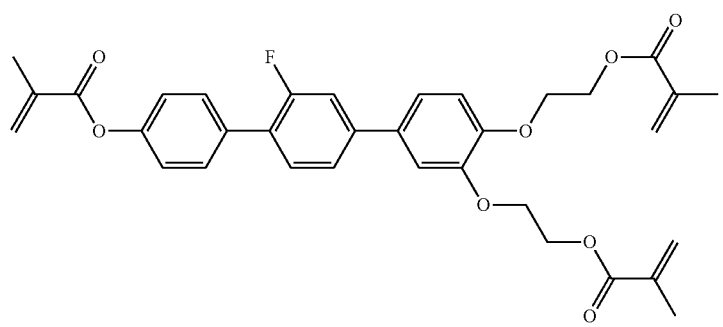 [SMILES: C=C(C)C(=O)OCCOc1ccc(-c2ccc(-c3ccc(OC(=O)C(=C)C)cc3)c(F)c2)cc1OCCOC(=O)C(=C)C]
RM-118
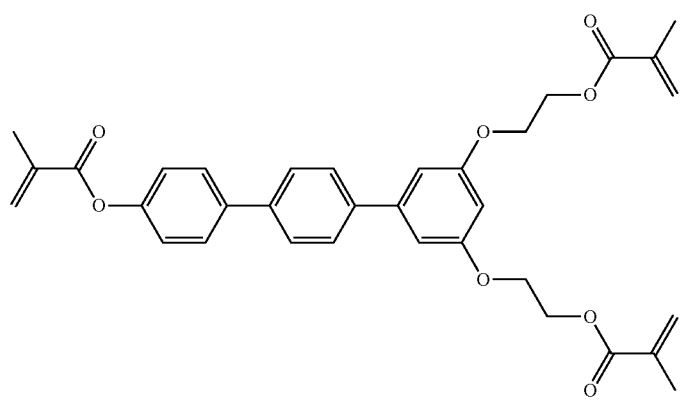 [SMILES: C=C(C)C(=O)OCCOc1cc(OCCOC(=O)C(=C)C)cc(-c2ccc(-c3ccc(OC(=O)C(=C)C)cc3)cc2)c1]
RM-119
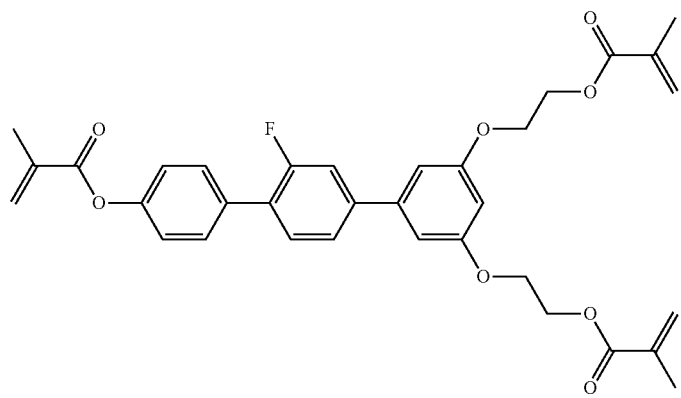 [SMILES: C=C(C)C(=O)OCCOc1cc(OCCOC(=O)C(=C)C)cc(-c2ccc(-c3ccc(OC(=O)C(=C)C)cc3)c(F)c2)c1]
RM-120

TABLE G-continued

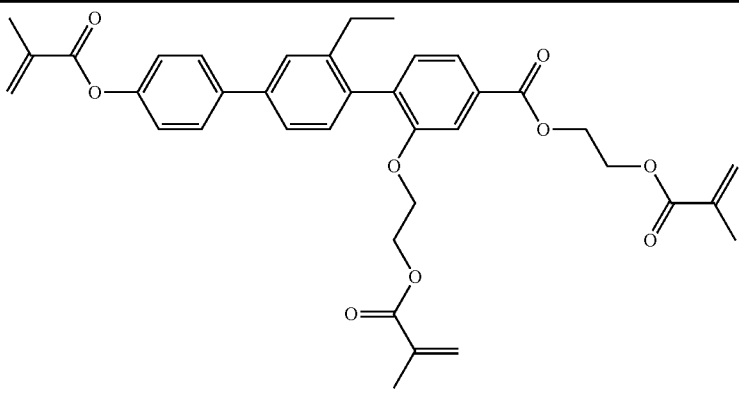
RM-121

Table G collates example compounds which can be used in the LC media according to the present invention, preferably as reactive mesogenic compounds. Preferably an initiator or a mixture of two or more initiators is added for the polymerisation. The initiator or initiator mixture is preferably added in amounts of 0.001% to 2% by weight, based on the mixture. A suitable initiator is, for example, Irgacure ®651 (from BASF).

In a preferred embodiment of the present invention, the mesogenic media comprise one or more compounds selected from the group of the compounds from Table G.

The liquid crystalline media according to the present invention comprise preferably four or more, more preferably six or more, even more preferably seven or more, and particularly preferably eight or more compounds selected from the group of compounds of table D, preferably compounds of three or more different formulae selected from the group of formulae of table D. It is particularly preferred that the medium additionally contains one, two or more compounds selected from the group of formulae of table E. Even more preferably the medium further contains one, two or more compounds selected from the group of formulae of table G.

The following examples are merely illustrative of the present invention and they should not be considered as limiting the scope of the invention in any way. The examples and modifications or other equivalents thereof will become apparent to those skilled in the art in the light of the present disclosure.

However, the physical properties and compositions shown in the following illustrate which properties can be achieved and in which ranges they can be modified. Especially the combination of the various properties, which can be preferably achieved, is thus well defined.

EXAMPLES

Liquid crystal mixtures and composite systems are realized with the compositions and properties as given in the following. Their properties and optical performance are investigated.

Reference Example 1

A liquid-crystal base mixture B-1 is prepared and characterized with respect to its general physical properties, having the composition and properties as indicated in the following table.

| | | | |
|---|---|---|---|
| PGIGI-3-F | 10.00% | Clearing point: | 105.0° C. |
| CPG-2-F | 6.00% | Δn [589 nm, 20° C.]: | 0.160 |
| CPG-3-F | 7.00% | $n_e$ [589 nm, 20° C.]: | 1.663 |
| CPG-5-F | 5.00% | Δε [1 kHz, 20° C.]: | 11.4 |
| CPU-5-F | 10.00% | $\varepsilon_\parallel$ [1 kHz, 20° C.]: | 15.7 |
| CPU-7-F | 10.00% | | |
| PGU-3-F | 4.00% | | |
| PGU-5-F | 7.00% | | |
| CCGU-3-F | 8.00% | | |
| CPP-3-2 | 4.00% | | |
| CGPC-3-3 | 3.00% | | |
| CGPC-5-3 | 3.00% | | |
| CGPC-5-5 | 3.00% | | |
| CPGU-3-OT | 5.00% | | |
| CP-5-N | 15.00% | | |
| Σ | 100.00% | | |

Reference Example 2

A liquid-crystal base mixture B-2 is prepared and characterized with respect to its general physical properties, having the composition and properties as indicated in the following table.

| | |
|---|---|
| PGIGI-3-F | 10.00% |
| CPG-2-F | 6.00% |
| CPG-3-F | 7.00% |
| CPG-5-F | 5.00% |
| CPU-5-F | 10.00% |
| CPU-7-F | 10.00% |
| PGU-3-F | 4.00% |
| PGU-5-F | 7.00% |
| CCGU-3-F | 8.00% |
| CPP-3-2 | 4.00% |
| CGPC-3-3 | 3.00% |
| CGPC-5-3 | 3.00% |
| CGPC-5-5 | 3.00% |
| CPGU-3-OT | 5.00% |
| CP-7-N | 15.00% |
| Σ | 100.00% |

Reference Example 3

A liquid-crystal base mixture B-3 is prepared and characterized with respect to its general physical properties, having the composition and properties as indicated in the following table.

| | | | |
|---|---|---|---|
| APUQU-3-F | 8.00% | Clearing point: | 127.8° C. |
| CPU-3-F | 15.00% | Δn [589 nm, 20° C.]: | 0.206 |
| CCGU-3-F | 8.00% | $n_e$ [589 nm, 20° C.]: | 1.711 |
| CPGP-5-2 | 4.00% | Δε [1 kHz, 20° C.]: | 42.7 |
| CPGP-5-3 | 4.00% | $\varepsilon_\parallel$ [1 kHz, 20° C.]: | 48.2 |
| CPGU-3-OT | 8.00% | | |
| DPGU-4-F | 4.00% | | |
| PGU-2-F | 10.00% | | |
| PGU-3-F | 11.00% | | |
| PGUQU-3-F | 8.00% | | |
| PGUQU-4-F | 10.00% | | |
| PGUQU-5-F | 10.00% | | |
| Σ | 100.00% | | |

Reference Example 4

A liquid-crystal base mixture B-4 is prepared and characterized with respect to its general physical properties, having the composition and properties as indicated in the following table.

| | | | |
|---|---|---|---|
| CP-3-N | 14.00% | Clearing point: | 119.3° C. |
| PTP-1-O2 | 8.00% | Δn [589 nm, 20° C.]: | 0.236 |
| PTP-3-O1 | 6.00% | $n_e$ [589 nm, 20° C.]: | 1.752 |
| CP-3-O1 | 8.50% | Δε [1 kHz, 20° C.]: | 7.2 |
| PGP-2-2V | 8.00% | $\varepsilon_\parallel$ [1 kHz, 20° C.]: | 11.0 |
| CPGP-4-3 | 5.00% | | |
| CPGP-5-2 | 5.00% | | |
| PGP-2-3 | 5.00% | | |
| PGP-2-4 | 5.00% | | |
| PGP-2-5 | 10.00% | | |
| CPTP-3-O1 | 6.00% | | |
| CPTP-3-O2 | 6.00% | | |
| PGUQU-3-F | 7.50% | | |
| PGUQU-4-F | 2.00% | | |
| PP-1-2V1 | 4.00% | | |
| Σ | 100.00% | | |

Reference Example 5

A liquid-crystal base mixture B-5 is prepared and characterized with respect to its general physical properties, having the composition and properties as indicated in the following table.

| | | | |
|---|---|---|---|
| CP-1V-N | 16.00% | Clearing point: | 110.1° C. |
| PP-2-N | 7.00% | Δn [589 nm, 20° C.]: | 0.218 |
| PGUQU-3-F | 10.00% | $n_e$ [589 nm, 20° C.]: | 1.737 |
| CPG-2-F | 10.00% | Δε [1 kHz, 20° C.]: | 11.1 |
| PP-1-2V1 | 10.00% | $\varepsilon_\parallel$ [1 kHz, 20° C.]: | 15.3 |
| PGIGI-3-F | 12.00% | | |
| CPGP-5-2 | 8.00% | | |
| CPGP-5-3 | 8.00% | | |
| PGP-2-3 | 7.00% | | |
| PGP-2-4 | 6.00% | | |
| PGP-2-5 | 6.00% | | |
| Σ | 100.00% | | |

Reference Example 6

A liquid-crystal base mixture B-6 is prepared and characterized with respect to its general physical properties, having the composition and properties as indicated in the following table.

| | | | |
|---|---|---|---|
| PGUQU-3-F | 6.00% | Clearing point: | 101.0° C. |
| PGUQU-4-F | 10.00% | Δn [589 nm, 20° C.]: | 0.194 |
| PGUQU-5-F | 10.00% | $n_e$ [589 nm, 20° C.]: | 1.699 |
| PUQU-3-F | 17.00% | Δε [1 kHz, 20° C.]: | 37.0 |
| PGU-2-F | 10.00% | $\varepsilon_\parallel$ [1 kHz, 20° C.]: | 42.9 |
| PGU-3-F | 11.00% | | |
| CPGU-3-OT | 8.00% | | |
| CCGU-3-F | 8.00% | | |
| CPU-3-F | 12.00% | | |
| CPGP-5-2 | 4.00% | | |
| CPGP-5-3 | 4.00% | | |
| Σ | 100.00% | | |

Reference Example 7

A liquid-crystal base mixture B-7 is prepared and characterized with respect to its general physical properties, having the composition and properties as indicated in the following table.

| | | | |
|---|---|---|---|
| BCH-3F.F | 8.00% | Clearing point: | 110.0° C. |
| BCH-5F.F | 8.00% | Δn [589 nm, 20° C.]: | 0.153 |
| BCH-5F.F.F | 11.00% | $n_e$ [589 nm, 20° C.]: | 1.650 |
| CPU-7-F | 11.00% | Δε [1 kHz, 20° C.]: | 7.8 |
| PCH-3O2 | 18.00% | $\varepsilon_\parallel$ [1 kHz, 20° C.]: | 11.4 |
| PCH-7 | 13.00% | | |
| CCGU-3-F | 7.00% | | |
| CBC-33F | 4.00% | | |
| CBC-53F | 4.00% | | |
| CBC-55F | 3.00% | | |
| CCZPC-3-3 | 3.00% | | |
| PPTUI-3-2 | 5.00% | | |
| PPTUI-3-4 | 5.00% | | |
| Σ | 100.00% | | |

Reference Example 8

A liquid-crystal base mixture B-8 is prepared and characterized with respect to its general physical properties, having the composition and properties as indicated in the following table.

| | | | |
|---|---|---|---|
| BCH-3F.F | 8.00% | Clearing point: | 108.0° C. |
| BCH-5F.F | 8.00% | Δn [589 nm, 20° C.]: | 0.171 |
| BCH-5F.F.F | 11.00% | $n_e$ [589 nm, 20° C.]: | 1.670 |
| CPU-7-F | 9.00% | Δε [1 kHz, 20° C.]: | 8.1 |
| PCH-3O2 | 18.00% | $\varepsilon_\parallel$ [1 kHz, 20° C.]: | 11.6 |
| PCH-7 | 13.00% | | |
| CCGU-3-F | 7.00% | | |
| CBC-33F | 4.00% | | |
| CBC-53F | 4.00% | | |
| PPTUI-3-2 | 8.00% | | |
| PPTUI-3-4 | 10.00% | | |
| Σ | 100.00% | | |

Example 1

A cholesteric mixture C-1 is prepared by mixing 98.78% of mixture B-1 as described in Reference Example 1 above with 0.44% of chiral dopant R-5011 available from Merck KGaA, Darmstadt, Germany, 0.75% of compound of formula RM-A

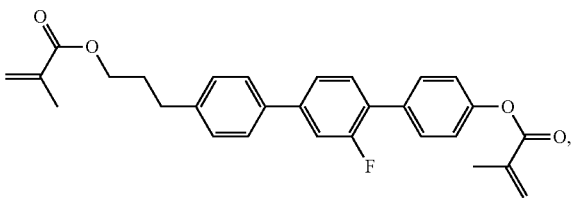

RM-A and 0.03% of compound of formula A-1

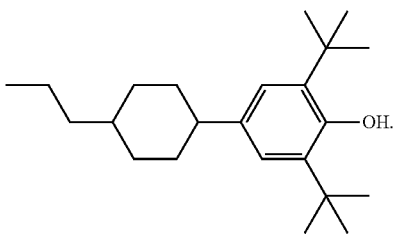

A-1

The mixture C-1 is filled into an electro-optical cell having glass substrates (405 mm×400 mm) with ITO electrodes as well as polyimide alignment layers (AL-1254, TN-rubbed), wherein the cell gap is 25 µm.

The cell is preheated at 40° C. for 15 minutes.

Subsequently polymerisation is carried out at 40° C. by irradiating the cell with UV light (Philips iSOLde CLEO Performance 80 W with cut-off filter, 4 mW/cm² light intensity) for 60 minutes while a DC voltage (70 V) is applied.

After the photopolymerisation the cell is subjected to a thermal treatment at 150° C. for 30 minutes where no voltage is applied.

The haze of the obtained cell is determined using hazegard i from BYK-Gardner.

The obtained cell has a clear state which has 4.2% haze and a privacy (scattering) state with 95.8% haze.

The cell exhibits favourably homogeneous clear and scattering states and favourable switching and electro-optical performance. In addition, the cell exhibits a favourably low pressure sensitivity.

Comparative Example 1

A cholesteric mixture C-1 is prepared as described in Example 1 above. The mixture C-1 is filled into an electro-optical cell having glass substrates (405 mm×400 mm) with ITO electrodes as well as polyimide alignment layers (AL-1254, TN-rubbed), wherein the cell gap is 25 µm.

The cell is preheated at 40° C. for 15 minutes.

Subsequently polymerisation is carried out at 40° C. by irradiating the cell with UV light (Philips iSOLde CLEO Performance 80 W with cut-off filter, 4 mW/cm² light intensity) for 30 minutes while a square-wave voltage (70 V (peak-to-peak), 20 Hz) is applied.

After the photopolymerisation the cell is subjected to a thermal treatment at 150° C. for 30 minutes where no voltage is applied.

The haze of the obtained cell is determined using hazegard i from BYK-Gardner.

The obtained cell has a clear state which has 8.9% haze and a privacy (scattering) state with 96.9% haze.

The cell exhibits a comparatively larger residual haze in the clear state, discernible as a white cloudy appearance.

Example 2

A cholesteric mixture C-1 is prepared as described in Example 1 above. The mixture C-1 is filled into an electro-optical cell having glass substrates with ITO electrodes as well as polyimide alignment layers (AL-1254, TN-rubbed), wherein the cell gap is 25 µm.

The cell is preheated at 40° C. for 15 minutes.

Subsequently polymerisation is carried out at 40° C. by irradiating the cell with UV light (Philips iSOLde CLEO Performance 80 W with cut-off filter, 4 mW/cm² light intensity) for 30 minutes while a DC voltage (70 V) is applied.

After the photopolymerisation the cell is subjected to a thermal treatment at 150° C. for 30 minutes where a DC voltage (70 V) is applied.

The haze of the obtained cell is determined using hazegard i from BYK-Gardner.

The obtained cell has a clear state which has 2.2% haze and a privacy (scattering) state with 95.8% haze.

The cell exhibits favourably homogeneous clear and scattering states and favourable switching and electro-optical performance. In addition, the cell exhibits a favourably low pressure sensitivity.

Comparative Example 2

A cholesteric mixture C-1 is prepared as described in Example 1 above. The mixture C-1 is filled into an electro-optical cell having glass substrates (405 mm×400 mm) with ITO electrodes as well as polyimide alignment layers (AL-1254, TN-rubbed), wherein the cell gap is 25 µm.

The cell is preheated at 40° C. for 15 minutes.

Subsequently polymerisation is carried out at 40° C. by irradiating the cell with UV light (Philips iSOLde CLEO Performance 80 W with cut-off filter, 4 mW/cm² light intensity) for 30 minutes while a square-wave voltage (70 V, 20 Hz) is applied.

After the photopolymerisation the cell is subjected to a thermal treatment at 150° C. for 30 minutes where a square-wave voltage (70 V, 20 Hz) is applied.

The haze of the obtained cell is determined using hazegard i from BYK-Gardner.

The obtained cell has a clear state which has 6.2% haze and a privacy (scattering) state with 96.0% haze.

The cell exhibits a comparatively larger residual haze in the clear state, discernible as a white cloudy appearance.

Example 3

A cholesteric mixture C-2 is prepared by mixing 98.89% of mixture B-1 as described in Reference Example 1 above with 0.33% of chiral dopant R-5011 available from Merck KGaA, Darmstadt, Germany, 0.75% of compound of formula RM-A as shown in Example 1 above and 0.03% of compound of formula A-1 as shown in Example 1 above.

The mixture C-2 is filled into an electro-optical cell having glass substrates (triangular shape, side length 1200 mm) with ITO electrodes as well as polyimide alignment layers (AL-1254, TN-rubbed), wherein the cell gap is 25 µm.

The cell is preheated at 40° C. for 15 minutes.

Subsequently polymerisation is carried out at 40° C. by irradiating the cell with UV light (Philips iSOLde CLEO Performance 80 W with cut-off filter, 4 mW/cm² light intensity) for 60 minutes while a DC voltage (70 V) is applied.

After the photopolymerisation the cell is subjected to a thermal treatment at 150° C. for 30 minutes where no voltage is applied.

The cell exhibits uniform privacy and clear states, wherein in the clear state no undesirable residual haze is discernible. In addition, the cell exhibits a favourably low pressure sensitivity.

Comparative Example 3

A cholesteric mixture C-1 is prepared as described in Example 1 above. The mixture C-1 is filled into an electro-optical cell having glass substrates (405 mm×400 mm) with ITO electrodes as well as polyimide alignment layers (AL-1254, TN-rubbed), wherein the cell gap is 25 μm.

The cell is preheated at 40° C. for 15 minutes.

Subsequently polymerisation is carried out at 40° C. by irradiating the cell with UV light (Philips iSOLde CLEO Performance 80 W with cut-off filter, 4 mW/cm² light intensity) for 30 minutes while a square-wave voltage (70 V, 0.2 Hz) is applied.

After the photopolymerisation the cell is subjected to a thermal treatment at 150° C. for 30 minutes where no voltage is applied.

The obtained cell exhibits a non-uniform appearance in both the clear state and the privacy state.

Comparative Example 4

A cholesteric mixture C-1 is prepared as described in Example 1 above. The mixture C-1 is filled into an electro-optical cell having glass substrates (405 mm×400 mm) with ITO electrodes as well as polyimide alignment layers (AL-1254, TN-rubbed), wherein the cell gap is 25 μm.

The cell is preheated at 40° C. for 15 minutes.

Subsequently polymerisation is carried out at 40° C. by irradiating the cell with UV light (Philips iSOLde CLEO Performance 80 W with cut-off filter, 4 mW/cm² light intensity) for 30 minutes while a square-wave voltage (70 V, dynamic frequency: non-linear logarithmic shape starting at 0.1 Hz and ramping up to 40 Hz over 5 minutes, then starting over again) is applied.

After the photopolymerisation the cell is subjected to a thermal treatment at 150° C. for 30 minutes where no voltage is applied.

The obtained cell exhibits a non-uniform appearance in both the clear state and the privacy state.

Example 4

A cholesteric mixture C-3 is prepared by mixing 98.89% of mixture B-2 as described in Reference Example 2 above with 0.33% of chiral dopant R-5011 available from Merck KGaA, Darmstadt, Germany, 0.75% of compound of formula RM-A as shown in Example 1 above and 0.03% of compound of formula A-1 as shown in Example 1 above.

The mixture C-3 is treated according to Example 1 to obtain an electro-optical cell.

The cell exhibits favourably homogeneous clear and scattering states and favourable switching and electro-optical performance. In addition, the cell exhibits a favourably low pressure sensitivity.

Example 5

A cholesteric mixture C-4 is prepared by mixing 98.64% of mixture B-1 as described in Reference Example 1 above with 0.42% of chiral dopant R-5011 available from Merck KGaA, Darmstadt, Germany, 0.45% of compound of formula RM-B

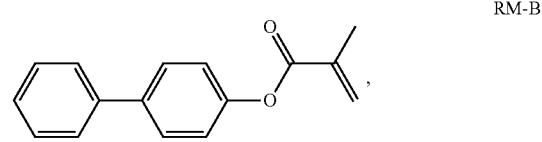 [SMILES: C=C(C)C(=O)Oc1ccc(-c2ccccc2)cc1]

0.45% of compound of formula RM-C

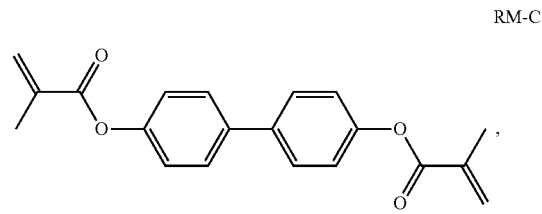 [SMILES: C=C(C)C(=O)Oc1ccc(-c2ccc(OC(=O)C(=C)C)cc2)cc1]

and 0.04% of the photoinitiator Irgacure® 651 (in the following abbreviated as IRG-651)

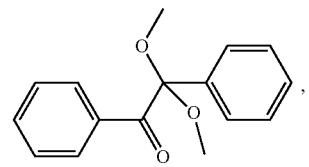 [SMILES: COC(OC)(C(=O)c1ccccc1)c1ccccc1]

available from Ciba, Switzerland.

The mixture C-4 is treated according to Example 1 to obtain an electro-optical cell.

The cell exhibits favourably homogeneous clear and scattering states and favourable switching and electro-optical performance. In addition, the cell exhibits a favourably low pressure sensitivity.

Example 6

A cholesteric mixture C-5 is prepared by mixing mixture B-3 as described in Reference Example 3 above with chiral dopant S-1011 available from Merck KGaA, Darmstadt, Germany such that a pitch of 2 μm is obtained, wherein 99.25% of this mixture is further mixed with 0.75% of compound of formula RM-A as shown in Example 1 above to obtain mixture C-5.

The mixture C-5 is further treated as described in Example 1.

The cell exhibits favourable clear and scattering states and favourable switching and electro-optical performance. In addition, the cell exhibits a favourably low pressure sensitivity.

Example 7

A cholesteric mixture C-6 is prepared by mixing 98.28% of mixture B-4 as described in Reference Example 4 with 0.42% of chiral dopant R-5011 available from Merck KGaA, Darmstadt, Germany, 0.63% of compound of formula RM-B as shown in Example 5 above, 0.63% of compound of formula RM-C as shown in Example 5 above and 0.04% of IRG-651.

The mixture C-6 is further treated as described in Example 1.

The cell exhibits favourable clear and scattering states and favourable switching and electro-optical performance. In addition, the cell exhibits a favourably low pressure sensitivity.

Examples 8 to 11

Cholesteric mixtures C-7, C-8, C-9 and C-10 are prepared as described for C-1 in Example 1 above, wherein instead of B-1 respectively the mixtures B-5, B-6, B-7 and B-8 as described in Reference Examples 5, 6, 7 and 8 are used.

The mixtures C-7, C-8, C-9 and C-10 are further treated as described in Example 2.

The cells exhibit favourable clear and scattering states and favourable switching and electro-optical performance. In addition, the cells exhibit a favourably low pressure sensitivity.

Example 12

A cholesteric mixture C-11 is prepared by mixing 98.60% of mixture B-2 as described in Reference Example 2 above with 0.65% of chiral dopant R-5011 available from Merck KGaA, Darmstadt, Germany and 0.75% of compound of formula RM-A as shown in Example 1 above.

The mixture C-11 is treated according to Example 1 to obtain an electro-optical cell.

The cell exhibits favourably homogeneous clear and scattering states and favourable switching and electro-optical performance. In addition, the cell exhibits a favourably low pressure sensitivity.

The invention claimed is:

1. A method for the preparation of a window element which is operable in and electrically switchable between an optically clear state and a scattering state, the method comprising the steps of:
   (i) providing a liquid-crystalline medium which comprises one or more mesogenic compounds, one or more chiral compounds and one or more polymerisable mesogenic compounds as a layer interposed between two opposing transparent substrates which are each provided with an electrode,
      wherein the liquid-crystalline medium has a clearing point of 70° C. or more, and
      wherein the one or more polymerisable mesogenic compounds are contained in the medium in an amount, based on the overall contents of the medium, of 4% by weight or less;
   (ii) polymerising the one or more polymerisable mesogenic compounds via photopolymerisation the presence of a direct current electric field in the layer, wherein the direct current electric field has a DC voltage in a range from 30 V to 150 V for a time period of 1 minute to 240 minutes, further comprising polymerising the one or more polymerisable mesogenic compounds in the presence of a direct current electric field in the layer, the applied direct current electric field inducing a homeotropic alignment in the layer comprising the liquid-crystalline medium; and
   after performing step (ii), (iii) performing a thermal treatment of the liquid-crystalline medium in the presence of the direct current electric field.

2. The method according to claim 1, wherein the layer comprising the liquid-crystalline medium preferably has a thickness in the range from 4 µm to 40 µm.

3. The method according to claim 1, wherein the liquid-crystalline medium further comprises one or more photoinitiators.

4. The method according to claim 1, wherein one or more of the one or more polymerisable mesogenic compounds comprise one, two or more acrylate and/or methacrylate groups.

5. The method according to claim 1, wherein polymerising as set forth in step (ii) uses light having an intensity in the range of from 0.1 mW/cm$^2$ to 100 mW/cm$^2$.

6. The method according to claim 1, wherein the electrodes are arranged as transparent conductive layers supported on the substrates and facing the liquid-crystalline medium, wherein optionally alignment layers are further provided which are in direct contact with the liquid-crystalline medium.

7. The method according to claim 1, wherein the liquid-crystalline medium comprises, based on the overall contents of the medium, at least 15% by weight of one or more mesogenic compounds of formula I

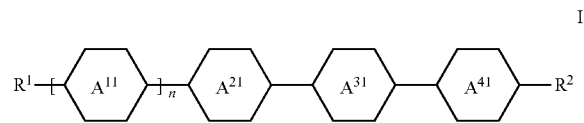

wherein
R$^1$ and R$^2$ denote, independently of one another, a group selected from F, Cl, CF$_3$, OCF$_3$, and straight-chain or branched alkyl or alkoxy having 1 to 15 carbon atoms or straight-chain or branched alkenyl having 2 to 15 carbon atoms which is unsubstituted, monosubstituted by CN or CF$_3$ or mono- or polysubstituted by halogen and wherein one or more CH$_2$ groups may be, in each case independently of one another, replaced by —O—, —S—, —CO—, —COO—, —OCO—, —OCOO— or —C≡C— in such a manner that oxygen atoms are not linked directly to one another,
A$^{11}$ denotes

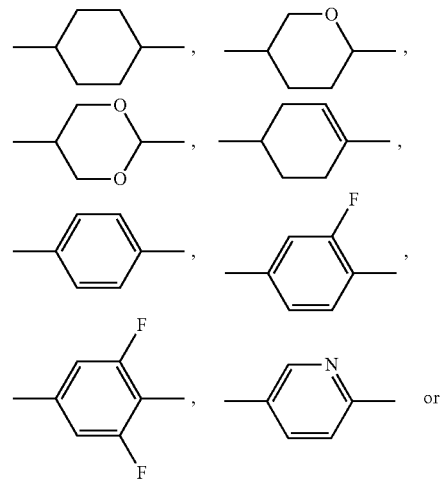

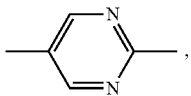

n denotes 0 or 1, and
$A^{21}$, $A^{31}$ and $A^{41}$ denote, independently of one another,

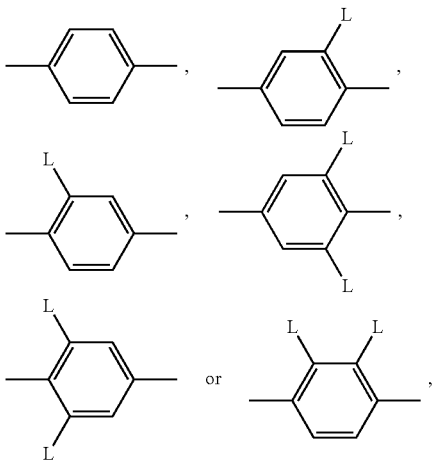

wherein L is on each occurrence, identically or differently, halogen selected from F, Cl and Br.

8. The method according to claim 1, wherein the liquid-crystalline medium further comprises one or more mesogenic compounds selected from the group of compounds of formulae II and III

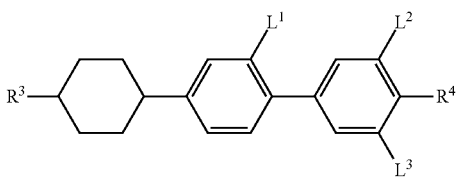

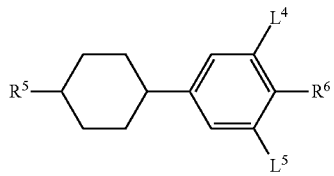

wherein
$R^3$, $R^4$, $R^5$ and $R^6$ denote, independently of one another, a group selected from F, $CF_3$, $OCF_3$, CN, and straight-chain or branched alkyl or alkoxy having 1 to 15 carbon atoms or straight-chain or branched alkenyl having 2 to 15 carbon atoms which is unsubstituted, monosubstituted by CN or $CF_3$ or mono- or polysubstituted by halogen and wherein one or more $CH_2$ groups may be, in each case independently of one another, replaced by —O—, —S—, —CO—, —COO—, —OCO—, —OCOO— or —C≡C— in such a manner that oxygen atoms are not linked directly to one another, and
$L^1$, $L^2$, $L^3$, $L^4$ and $L^5$ denote, independently of one another, H or F.

9. The method according to claim 1, wherein the liquid-crystalline medium exhibits a positive dielectric anisotropy Δε and an optical anisotropy Δn, determined at 20° C. and 589 nm, of 0.13 or more, and wherein the one or more chiral compounds contained in the liquid-crystalline medium have an absolute value of the helical twisting power of 5 μm-1 or more.

10. The method according to claim 2, wherein the applied direct current electric field induces a homeotropic alignment in the layer comprising the liquid crystalline medium, wherein the layer preferably has a thickness in the range from 10 μm to 25 μm.

11. The method of claim 1, wherein the photopolymerisation uses UV light.

12. The method of claim 5, wherein the light comprises UV light.

13. The method of claim 6, wherein the transparent conductive layers are respectively embedded between two transparent dielectric layers.

\* \* \* \* \*

UNITED STATES PATENT AND TRADEMARK OFFICE
CERTIFICATE OF CORRECTION

| | | |
|---|---|---|
| PATENT NO. | : 12,365,838 B2 | Page 1 of 1 |
| APPLICATION NO. | : 17/610812 | |
| DATED | : July 22, 2025 | |
| INVENTOR(S) | : Roel van Raak and Paul Verbunt | |

It is certified that error appears in the above-identified patent and that said Letters Patent is hereby corrected as shown below:

In the Claims

In Column 123, Line 57 in Claim 1, the phrase "the" should read -- in the --.

In Column 126, Line 31 in Claim 9, the phrase "µm-1" should read -- $\mu m^{-1}$ --.

Signed and Sealed this
Thirteenth Day of January, 2026

John A. Squires
*Director of the United States Patent and Trademark Office*